US012555978B2

United States Patent
Sakamoto et al.

(10) Patent No.: US 12,555,978 B2
(45) Date of Patent: Feb. 17, 2026

(54) SEMICONDUCTOR LIGHT-EMITTING DEVICE

(71) Applicant: ROHM CO., LTD., Kyoto (JP)

(72) Inventors: Koki Sakamoto, Kyoto (JP); Kazunori Fuji, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 699 days.

(21) Appl. No.: 17/916,741

(22) PCT Filed: Apr. 1, 2021

(86) PCT No.: PCT/JP2021/014211
§ 371 (c)(1),
(2) Date: Oct. 3, 2022

(87) PCT Pub. No.: WO2021/205989
PCT Pub. Date: Oct. 14, 2021

(65) Prior Publication Data
US 2023/0142319 A1    May 11, 2023

(30) Foreign Application Priority Data
Apr. 8, 2020    (JP) .................... 2020-069817

(51) Int. Cl.
*H01S 3/00*    (2006.01)
*H01S 5/022*    (2021.01)
(Continued)

(52) U.S. Cl.
CPC ............ *H01S 5/0239* (2021.01); *H01S 5/022* (2013.01); *H01S 5/04256* (2019.08);
(Continued)

(58) Field of Classification Search
CPC .... H01S 5/0239; H01S 5/022; H01S 5/04256; H01S 5/0428; H01S 5/02234; H01S 5/02345
See application file for complete search history.

(56) References Cited

U.S. PATENT DOCUMENTS

2015/0340425 A1    11/2015    We et al.
2018/0278011 A1*    9/2018    Galvano ............... G01S 7/4813
(Continued)

FOREIGN PATENT DOCUMENTS

DE    11 2019 006 063 T5    8/2021
JP    2011-75811 A    4/2011
(Continued)

OTHER PUBLICATIONS

Office Action issued in corresponding Chinese Patent application No. 2025041001442790, Apr. 10, 2025, and machine translation (16 pages).
Office Action issued in corresponding Japanese Patent application No. 2022-514446, Mar. 11, 2025, and machine translation (16 pages).
(Continued)

*Primary Examiner* — Kinam Park
(74) *Attorney, Agent, or Firm* — HSML P.C.

(57) ABSTRACT

A semiconductor light-emitting device includes light-emitting element, sealing resin and conductor. The light-emitting element has first and second surfaces spaced apart in a thickness direction with first element electrode on the first surface and with second element electrode on the second surface. The sealing resin covers at least the second surface. The conductor, forming a conduction path to the light-emitting element, includes a first interconnecting portion, an embedded portion, and a second interconnecting portion. The sealing resin has a cavity extending in the thickness direction and connected to the second element electrode. The first interconnecting portion is electrically connected to the first element electrode and extends in a direction crossing the thickness direction. The embedded portion is in the (Continued)

cavity and connected to the second element electrode. The second interconnecting portion is connected to the embedded portion and extends in the direction crossing the thickness direction.

20 Claims, 45 Drawing Sheets

(51) Int. Cl.
  *H01S 5/0239*   (2021.01)
  *H01S 5/042*   (2006.01)
  *G01S 7/481*   (2006.01)
  *H01S 5/02234*   (2021.01)
  *H01S 5/02345*   (2021.01)

(52) U.S. Cl.
  CPC .......... *H01S 5/0428* (2013.01); *G01S 7/4814* (2013.01); *H01S 5/02234* (2021.01); *H01S 5/02345* (2021.01)

(56) References Cited

U.S. PATENT DOCUMENTS

| | | | |
|---|---|---|---|
| 2020/0136347 A1* | 4/2020 | Charlebois | .......... H01S 5/02234 |
| 2022/0285911 A1* | 9/2022 | Yamaguchi | ............. H01L 24/32 |

FOREIGN PATENT DOCUMENTS

| | | |
|---|---|---|
| JP | 2018-128432 A | 8/2018 |
| WO | 2017/198668 A1 | 11/2017 |
| WO | 2019/207938 A1 | 10/2019 |

OTHER PUBLICATIONS

International Search Report issued in PCT/JP2021/014211, Jun. 1, 2021 (2 pages).
Office Action received in the corresponding German Patent application, Jan. 16, 2023, and machine translation (24 pages).
Office Action received in the corresponding German Patent application, May 11, 2023, and machine translation (19 pages).
Office Action received in the corresponding German Patent application, Sep. 18, 2023, and machine translation (15 pages).

* cited by examiner

SEMICONDUCTOR LIGHT-EMITTING DEVICE

TECHNICAL FIELD

The present disclosure relates to a semiconductor light-emitting device.

BACKGROUND ART

A LiDAR (Light Detection and Ranging or Laser Imaging Detection and Ranging) system using a semiconductor light emitting device has been proposed as a means for 3D distance measurement used in automobiles, for example (see e.g., Patent Document 1). Semiconductor laser devices (semiconductor light emitting devices) used as the light source of LiDAR emit pulsed laser beams with pulse widths of tens of nanoseconds or less. Thus, it is necessary to generate pulse waveforms with a high current change rate, and the inductance component of the current path needs to be made smaller as the pulse width is made narrower.

TECHNICAL REFERENCE

Patent Document

Patent Document: JP-A-2018-128432

SUMMARY OF THE INVENTION

Problems to be Solved by the Invention

In light of the above circumstances, an object of the present disclosure is to provide a semiconductor light-emitting device capable of reducing the inductance component.

Means for Solving the Problems

A semiconductor light-emitting device provided according to the present disclosure includes: a semiconductor light-emitting element having a first element surface and a second element surface facing away from each other in a thickness direction, a first element electrode disposed on the first element surface, and a second element electrode disposed on the second element surface; a sealing resin having a first resin surface and a second resin surface, the first resin surface facing in a first sense of the thickness direction in which the first element surface faces, the second resin surface facing in a second sense of the thickness direction in which the second element surface faces, the sealing resin covering at least the second element surface of the semiconductor light-emitting element; and a conductor forming a conduction path to the semiconductor light-emitting element. The sealing resin has a second cavity extending to the second element electrode in the thickness direction. The conductor includes a first interconnecting portion, a second embedded portion, and a second interconnecting portion. The first interconnecting portion is electrically connected to the first element electrode, is offset from the first element surface in the first sense of the thickness direction, and extends along a direction perpendicular to the thickness direction. The second embedded portion is received in the second cavity and connected to the second element electrode. The second interconnecting portion is connected to the second embedded portion, is offset from the second element surface in the second sense of the thickness direction, and extends along the direction perpendicular to the thickness direction.

Advantages of the Invention

The above configuration achieves reduction of the inductance component.

Other features and advantages of the present disclosure will become apparent from the detailed description given below with reference to the accompanying drawings.

MODE FOR CARRYING OUT THE INVENTION

Figure 1:
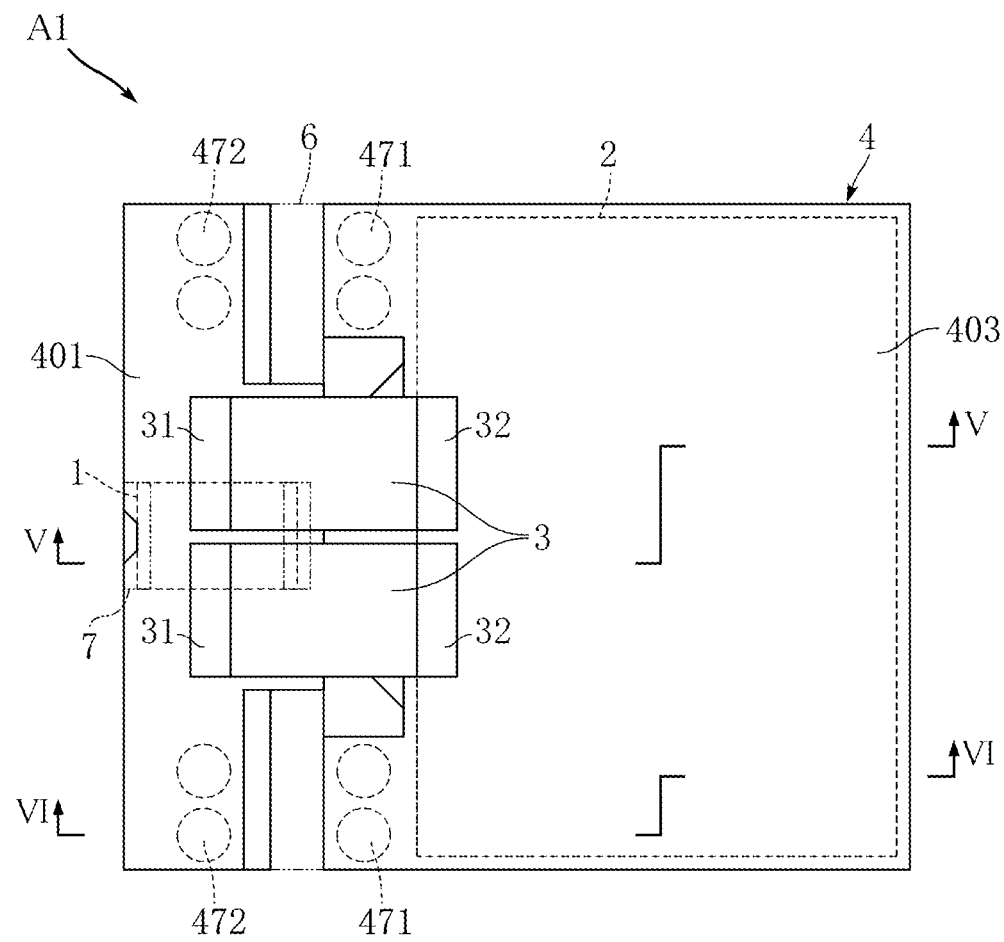
FIG. 1 is a schematic plan view of a semiconductor light-emitting device according to a first embodiment.

Preferred embodiments of the present disclosure are described below with reference to the accompanying drawings.

In the present disclosure, the terms such as "first", "second", and "third" are used merely as labels and are not intended to impose ordinal requirements on the items to which these terms refer.

In the present disclosure, the phrases "an object A is formed in an object B" and "an object A is formed on an object B" include, unless otherwise specified, "an object A is formed directly in/on an object B" and "an object A is formed in/on an object B with another object interposed between the object A and the object B". Similarly, the phrases "an object A is disposed in an object B" and "an object A is disposed on an object B" include, unless otherwise specified, "an object A is disposed directly in/on an object B" and "an object A is disposed in/on an object B with another object interposed between the object A and the object B". Similarly, the phrase "an object A is located on an object B" includes, unless otherwise specified, "an object A is located on an object B in contact with the object B" and "an object A is located on an object B with another object interposed between the object A and the object B". Also, the phrase "an object A overlaps with an object B as viewed in a certain direction" includes, unless otherwise specified, "the object A overlaps with the entirety of the object B" and "the object A overlaps with a portion of the object B".

FIGS. 1 to 8 show a semiconductor light-emitting device A1 according to a first embodiment of the present disclosure. The semiconductor light-emitting device A1 according to the present embodiment includes a semiconductor light-emitting element 1, a switching element 2, capacitors 3, a conductor 4, a sealing resin 6, and a light-transmittable resin 7. The semiconductor light-emitting device A1 may be used as a pulse laser light source of a lidar system, which is an example of a means for 3D distance measurement. However, the use of the semiconductor light-emitting device A1 according to the present disclosure is not particularly limited.

Figure 2:
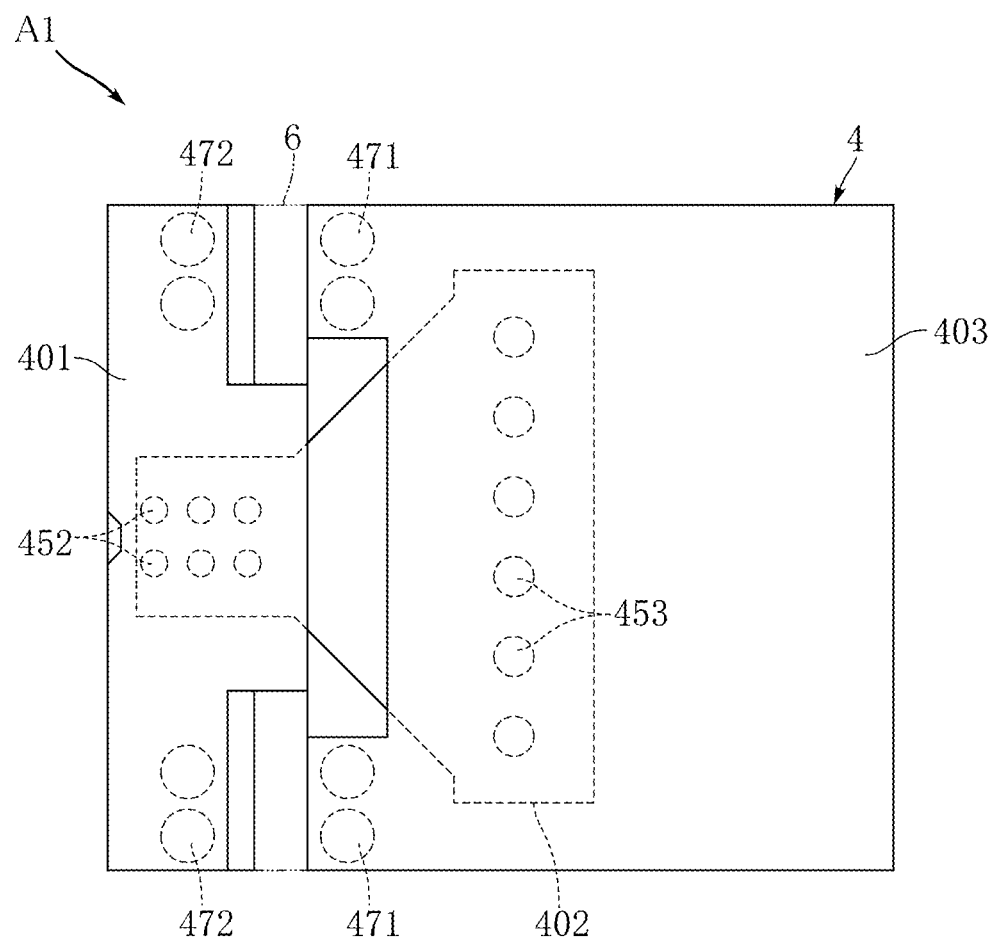
FIG. 2 is a plan view of the semiconductor light-emitting device of FIG. 1, in which a capacitor is omitted.
Figure 3:
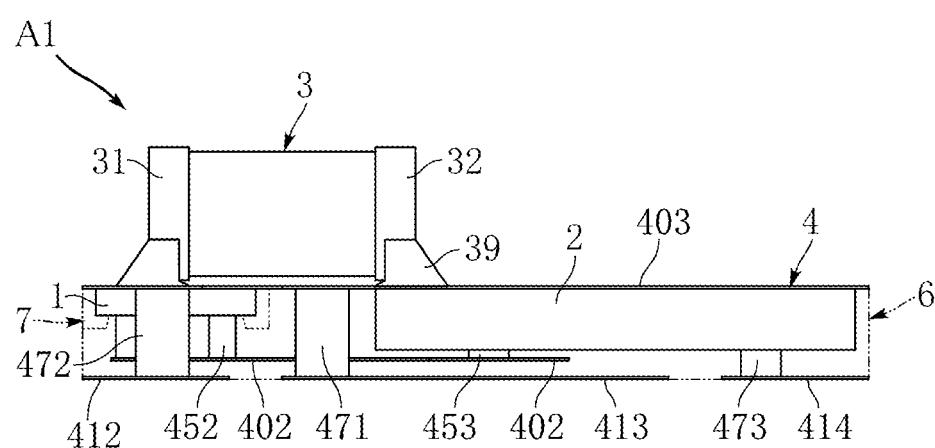
FIG. 3 is a front view of the semiconductor light-emitting device of FIG. 1.
Figure 3:
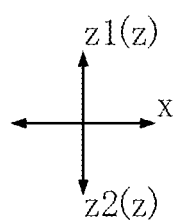
Figure 4:
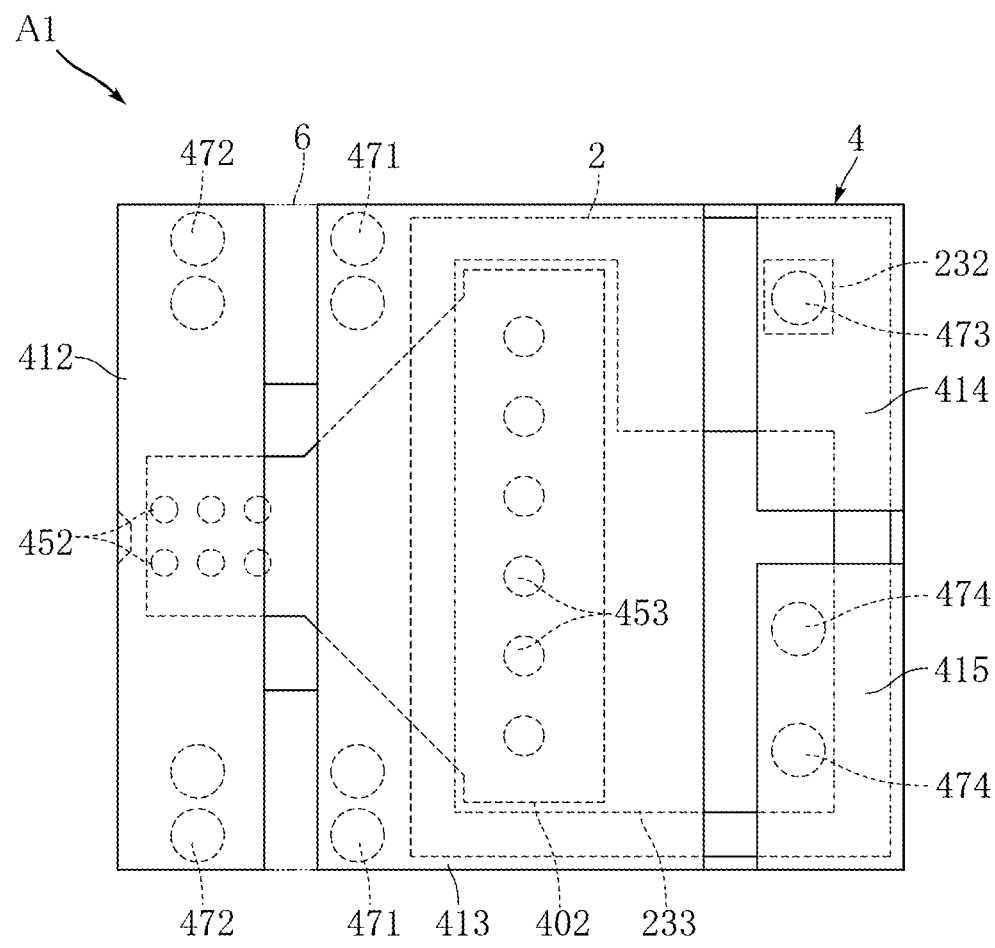
FIG. 4 is a bottom view of the semiconductor light-emitting device of FIG. 1.
Figure 5:
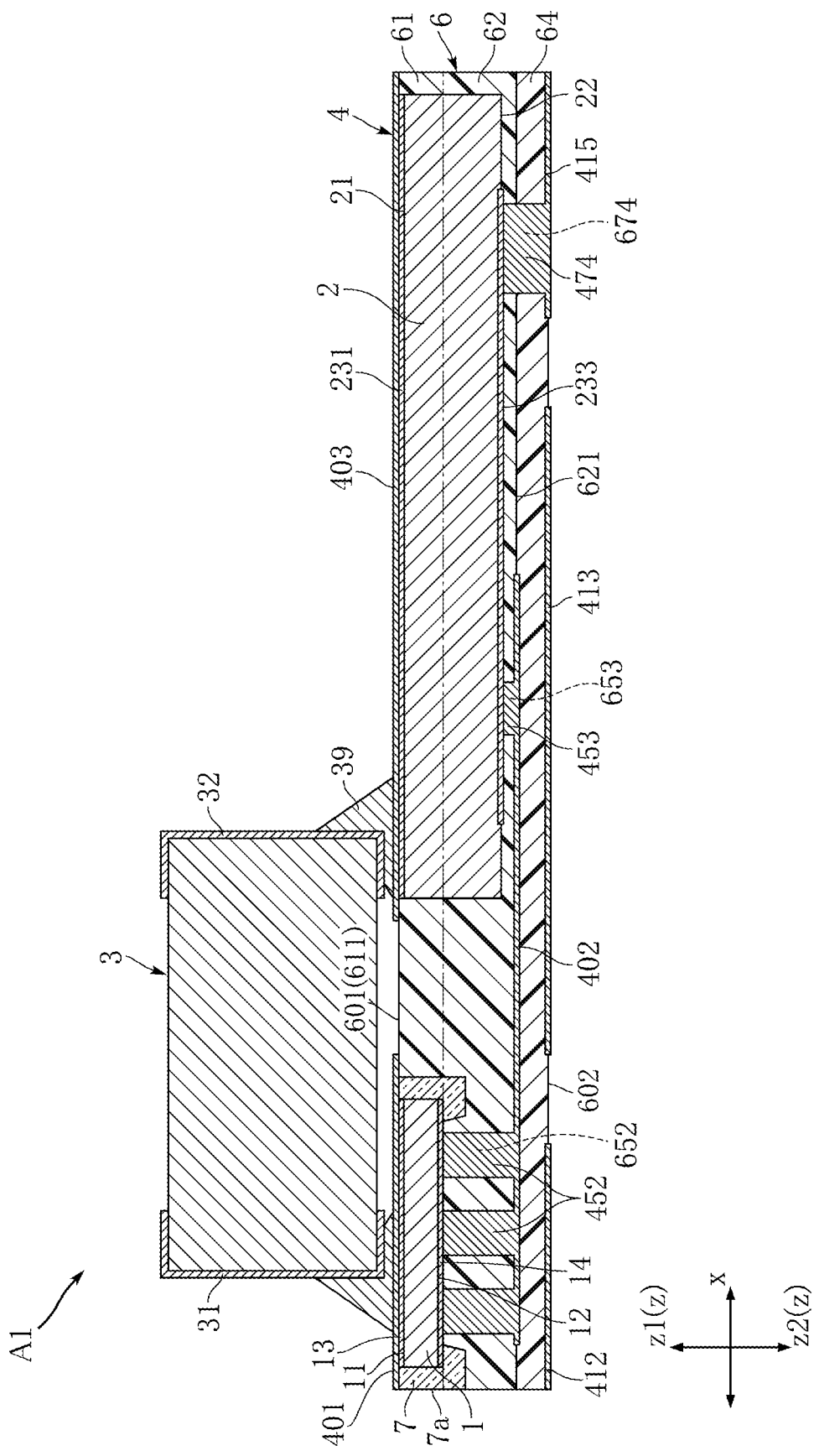
FIG. 5 is a sectional view taken along line V-V in FIG. 1.
Figure 6:
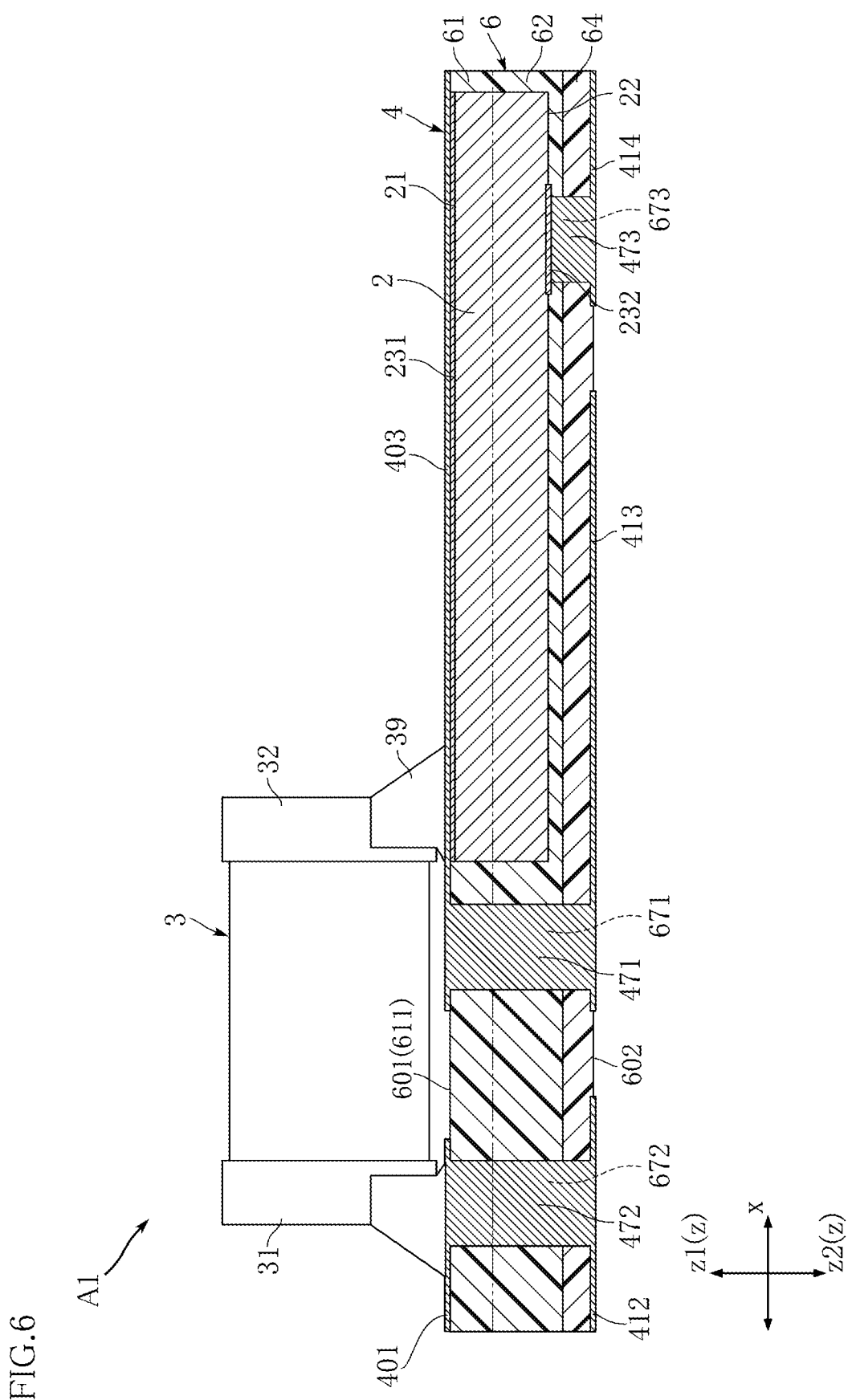
FIG. 6 is a sectional view taken along line VI-VI in FIG. 1.
Figure 7:
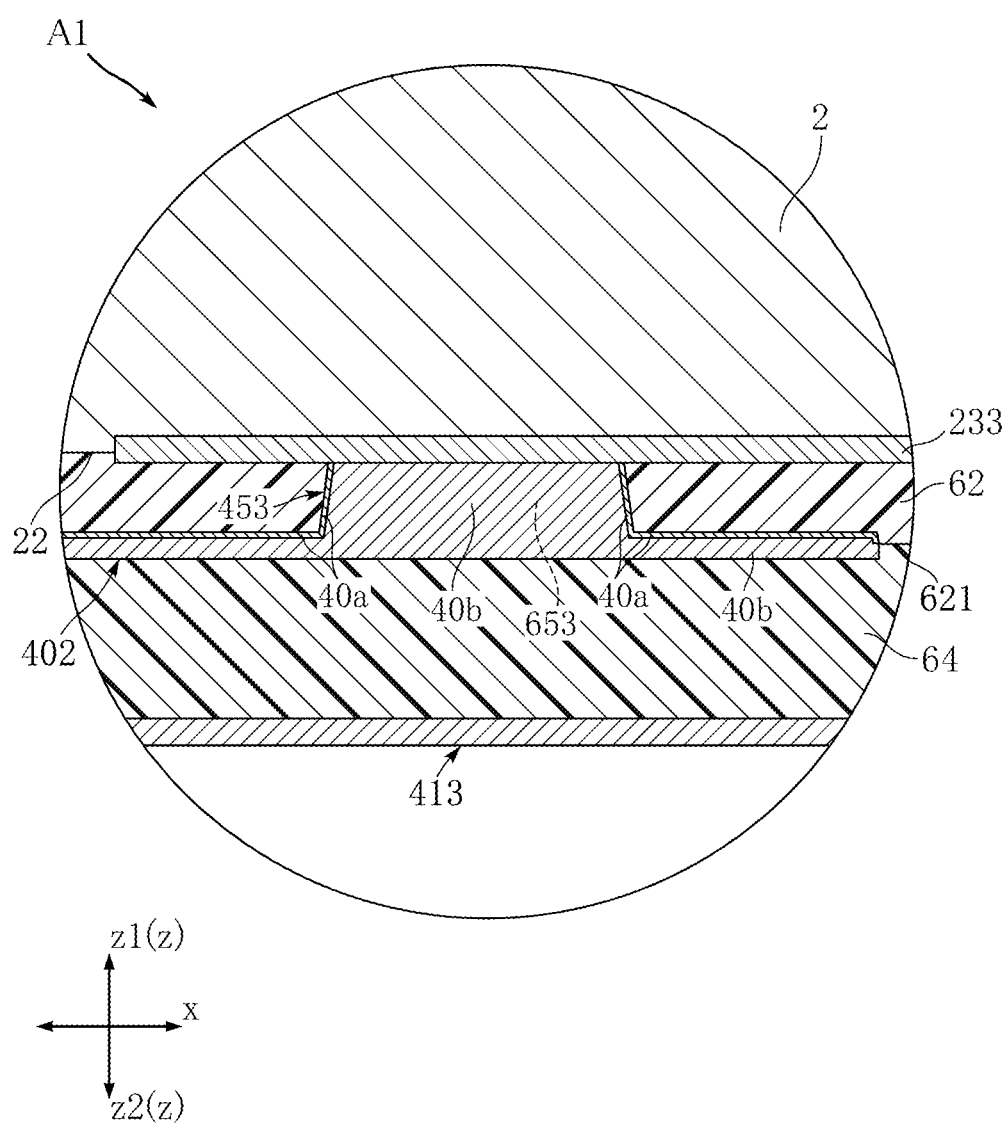
FIG. 7 is an enlarged view of a portion of FIG. 5.
Figure 8:
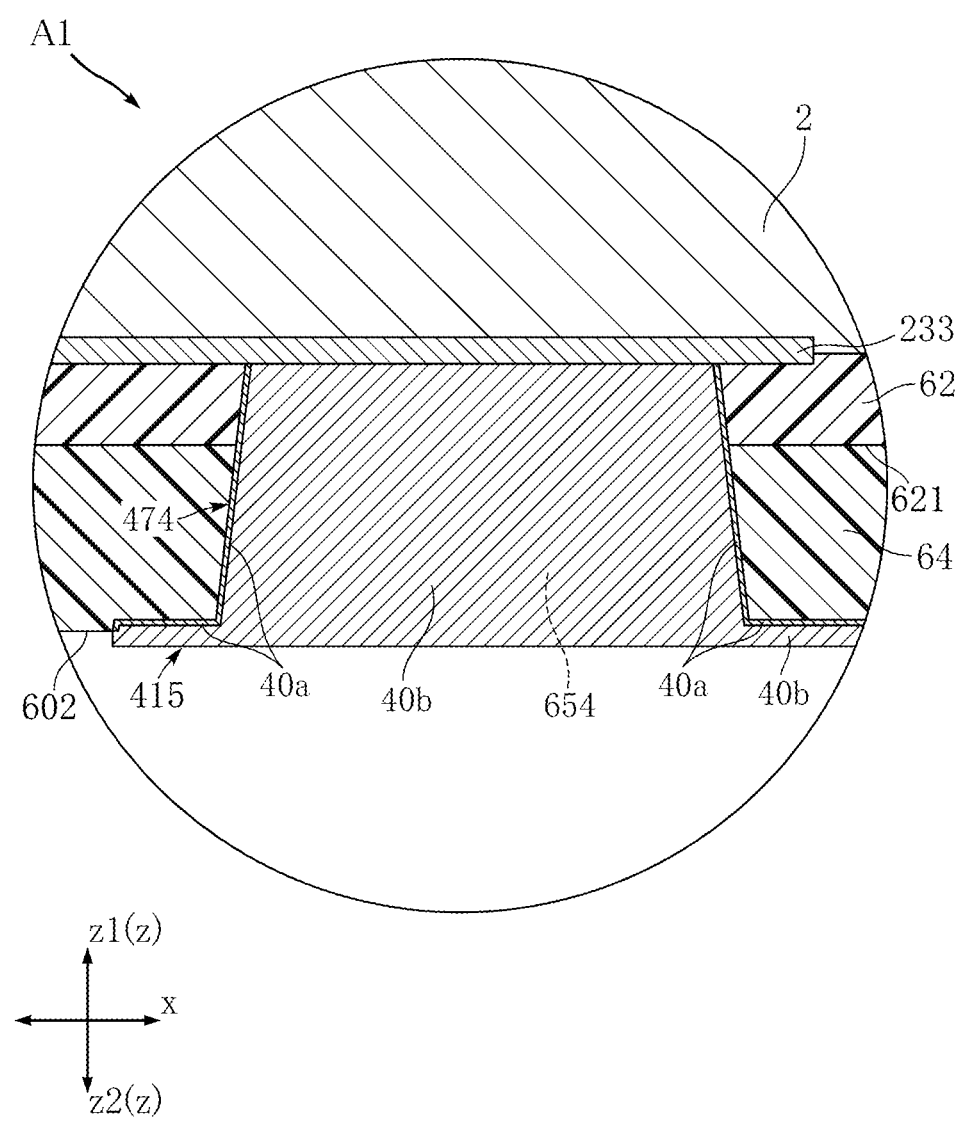
FIG. 8 is an enlarged view of a portion of FIG. 5.

FIG. 1 is a schematic plan view of the semiconductor light-emitting device A1. FIG. 2 is a plan view of the semiconductor light-emitting device A1, in which the capacitors 3 are omitted. FIG. 3 is a front view of the semiconductor light-emitting device A1. FIG. 4 is a bottom view of the semiconductor light-emitting device A1. FIG. 5 is a sectional view taken along line V-V in FIG. 1. FIG. 6 is a sectional view taken along line VI-VI in FIG. 1. FIG. 7 is an enlarged view of a portion of FIG. 5. FIG. 8 is an enlarged view of a portion of FIG. 5. For convenience of description, in FIGS. 1 to 4, the sealing resin 6 and the light-transmittable resin 7 are illustrated as transparent, and the outlines of the sealing resin 6 and the light-transmittable resin 7 are shown by imaginary lines, as appropriate.

The semiconductor light-emitting device A1 is generally rectangular as viewed in the thickness direction (i.e., in plan view). For convenience of description, the thickness direction (plan-view direction) of the semiconductor light-emitting device A1 is referred to as "z direction", the direction (the horizontal direction in FIGS. 1 to 8) that is orthogonal to the z direction and along one side of the semiconductor light-emitting device A1 is referred to as "x direction", and the direction (the vertical direction in FIGS. 1, 2 and 4) that is orthogonal to the z direction and the x direction is referred to as "y direction". The z direction is an example of the "thickness direction". The size of the semiconductor light-emitting device A1 is not particularly limited. The terms such as "up" or "down" in the description below are merely used for convenience of description and is not intended to limit the orientation of the semiconductor light-emitting device A1 of the present disclosure.

The semiconductor light-emitting element 1 is the light source of the semiconductor light-emitting device A1 and includes semiconductor layers, such as an active layer. The semiconductor light-emitting element 1, which is in the form of a rectangular plate as viewed in the z direction, has a first element surface 11, a second element surface 12, a first element electrode 13, and a second element electrode 14. The first element surface 11 faces in a first sense of the z direction. The second element surface 12 faces in a second sense of the z direction, facing away from the first element surface 11. The first element electrode 13 is disposed on the first element surface 11. In the semiconductor light-emitting device A1, the semiconductor light-emitting element 1 is disposed at or near a first end in the x direction (the left end in FIGS. 1, 3 and 5) and approximately in the center in the y direction. Also, the semiconductor light-emitting element 1 is offset in the first sense of the z direction. In the present embodiment, the semiconductor light-emitting element 1 emits laser light in a first sense of the x direction (leftward in FIGS. 1, 3 and 5). In the figures, the first sense of the z direction is indicated by the arrow z1, and the second sense of the z direction is indicated by the arrow z2. The type, arrangement, etc. of the semiconductor light-emitting element 1 are not limited to the above.

The light-transmittable resin 7 covers portions of the semiconductor light-emitting element 1. In the present embodiment, the light-transmittable resin 7 covers opposite ends of the semiconductor light-emitting element 1 in the x direction. The shape of the light-transmittable resin 7 is not particularly limited. The light-transmittable resin 7 is made of a material that transmits laser light from the semiconductor light-emitting element 1 and may be made of a transparent epoxy resin or silicone resin, for example. The translucent resin 7 may have a laser light transmittance of 80% or higher. The end surface 71 (left end surface) of the light-transmittable resin 7 on the emission side of the laser light from the semiconductor light-emitting element 1 is not covered with the sealing resin 6, so that the semiconductor light-emitting device A1 can emit laser light to the outside through this end surface of the light-transmittable resin 7.

The switching element 2 is an element for turning on and off the current to the semiconductor light-emitting element 1. The switching element 2 is a transistor, such as a FET made of Si, SiC or GaN, for example. In the present embodiment, a switching element 2 as an Si-MOSFET is described as an example.

As shown in FIGS. 4 to 6, the switching element 2, which is in the form of a rectangular plate as viewed in the z direction, has a first switching element surface 21, a second switching element surface 22, a drain electrode 231, a gate electrode 232, and a source electrode 233. In the semiconductor light-emitting device A1, the switching element 2 is offset in a second sense of the x direction (rightward in FIGS. 1 and 3 to 6) and extends almost entirely along the y direction. The switching element 2 is disposed apart from the semiconductor light-emitting element 1 as viewed in the z direction. Also, the switching element 2 is offset in the first sense of the z direction. The dimension of the switching element 2 in the z direction is larger than that of the semiconductor light-emitting element 1. The type and position of the switching element 2 are not limited to the above.

The first switching element surface 21 faces in the first sense of the z direction. The second switching element surface 22 faces in the second sense of the z direction, facing away from the first switching element surface 21. The drain electrode 231 is disposed on the first switching element surface 21 and covers the first switching element surface 21 almost entirely in the illustrated example. The gate electrode 232 is disposed on the second switching element surface 22. In the illustrated example, the gate electrode 232 is disposed in a region of the second switching element surface 22 that is offset in the second sense of the x direction and also offset in the first sense of the y direction. The source electrode 233 is disposed on the second switching element surface 22. In the illustrated example, the source electrode 233 is L shaped as viewed in the z direction and formed on most region of the second switching element surface 22.

The sealing resin 6 covers at least a portion of each of the semiconductor light-emitting element 1 and the switching element 2. The sealing resin 6 is made of a material including a thermosetting synthetic resin and an additive containing a metal element, which forms a part of the conductor 4. Examples of the synthetic resin include epoxy resin and polyimide resin. The sealing resin 6 has a first resin surface 601 and a second resin surface 602. The first resin surface 601 faces in the first sense of the z direction. The second resin surface 602 faces in the second sense of the z direction, facing away from the first resin surface 601.

The sealing resin 6 includes a first layer 61, a second layer 62, and a fourth layer 64. The first layer 61 has a first surface 611. The first surface 611 faces in the first sense of the z direction. The first layer 61 overlaps with the semiconductor light-emitting element 1 as viewed in a "in-plane direction" (direction along the x-y plane) perpendicular to the z direction. The second layer 62 is disposed on the second side of the first layer 61 in the z direction. The second layer 62 has a second surface 621. The second surface 621 faces in the second sense of the z direction. The fourth layer 64 is disposed on the second side of the second layer 62 in the z direction. In the present embodiment, the fourth layer 64 is located on the second side of the first layer 61 and the second layer 62 in the z direction. Thus, the surface of the fourth layer 64 that faces in second sense of the z direction corresponds to the second resin surface 602. The first layer 61 is located on the first side of the second layer 62 and the fourth layer 64 in the z direction. Thus, the first surface 611 of the first layer 61 corresponds to the first resin surface 601.

The switching element 2 is disposed between the first resin surface 601 and the second resin surface 602 in the z direction (thickness direction). In the present embodiment, the switching element 2 is disposed across the first layer 61 and the second layer 62. The second layer 62 covers the second element surface 12 of the semiconductor light-emitting element 1 and the second switching element surface 22 of the switching element 2.

Note that adjacent ones of the plurality of layers described above (the first layer 61, the second layer 62, and the fourth layer 64) may be formed in different steps followed by lamination or may be formed as one piece in the same step. That is, the first layer 61, the second layer 62, and the fourth layer 64 are not limited to layers laminated with a clear boundary, but may be layers imaginarily defined to describe the relationship between the sealing resin 6 and other structural elements, such as the semiconductor light-emitting element 1 and the switching element 2. In the sectional views shown of FIGS. 5 and 6, the boundary between adjacent layers formed in different steps followed by lamination is shown by a solid line, and the boundary between adjacent layers formed in the same step is shown by an imaginary line. Such relationship between adjacent layers of the sealing resin 6 holds true for the sectional views for the subsequent embodiments.

The sealing resin 6 has a plurality of cavities. The cavities are hollow portions formed along the z direction. Each cavity receives at least one of embedded portions that constitute the conductor 4 described later. In the present embodiment, the sealing resin 6 includes second cavities 652, third cavities 653, cavities 671, cavities 672, a cavity 673, and cavities 674.

The second cavities 652 are disposed at a position overlapping with the semiconductor light-emitting element 1 as viewed in the z direction. The second cavities 652 extend from the second surface 621 of the second layer 62 to the second element electrode 14 of the semiconductor light-emitting element 1 in the z direction, and penetrate the second layer 62 in the z direction in the present embodiment.

The third cavities 653 are disposed at a position overlapping with the source electrode 233 of the switching element 2 as viewed in the z direction. The third cavities 653 extend from the second surface 621 of the second layer 62 to the source electrode 233 of the switching element 2 in the z direction, and penetrates the second layer 62 in the z direction in the present embodiment.

Each of the cavities 671 and 672 penetrates the first layer 61, the second layer 62 and the fourth layer 64 in the z direction. The cavity 673 is disposed at a position overlapping with the gate electrode 232 of the switching element 2 as viewed in the z direction. The cavity 673 penetrates the second layer 62 and the fourth layer 64 in the z direction, extending from the second resin surface 602 to the gate electrode 232. The cavities 674 are disposed at a position overlapping with the source electrode 233 as viewed in the z direction. The cavities 674 penetrate the second layer 62 and the fourth layer 64 in the z direction, extending from the second resin surface 602 to the source electrode 233 of the switching element 2.

The conductor 4 is a part that forms a conduction path to the semiconductor light-emitting element 1, the switching element 2, etc. The conductor 4 includes a plurality of interconnecting portions and a plurality of embedded portions. Each interconnecting portion is in contact with the sealing resin 6 and extends along the x-y plane. Each embedded portion is received in one of the cavities formed in the sealing resin 6 and connected to at least one of the interconnecting portions.

In the present embodiment, the conductor 4 includes a first interconnecting portion 401, a second interconnecting portion 402, a third interconnecting portion 403, an interconnecting portion 412, an interconnecting portion 413, an interconnecting portion 414, an interconnecting portion 415, second embedded portions 452, third embedded portions 453, embedded portions 471, embedded portions 472, an embedded portion 473, and embedded portions 474.

The first interconnecting portion 401 is offset from the first element surface 11 of the semiconductor light-emitting element 1 in the first sense of the z direction. The first interconnecting portion 401 is disposed along the first surface 611 of the first layer 61. In the semiconductor light-emitting device A1, the first interconnecting portion 401 is offset in the first sense of the x direction and extends almost entirely along the y direction. The first interconnecting portion 401 overlaps with the entire semiconductor light-emitting element 1 as viewed in the z direction. The first interconnecting portion 401 is bonded and electrically connected to the first element electrode 13 of the semiconductor light-emitting element 1.

The second interconnecting portion 402 is offset from the second element surface 12 of the semiconductor light-emitting element 1 in the second sense of the z direction. The second interconnecting portion 402 is connected to the second embedded portions 452 and the third embedded portions 453. The second interconnecting portion 402 is disposed along the second surface 621 of the second layer 62. In the present embodiment, the second interconnecting portion 402 is located between the second layer 62 and the fourth layer 64. The second interconnecting portion 402 has a shape adapted to the semiconductor light-emitting element 1 and the switching element 2 as viewed in the z direction. The second interconnecting portion 402 overlaps with a portion of the semiconductor light-emitting element 1 and a portion of the switching element 2, as viewed in the z direction.

The third interconnecting portion 403 is disposed along the first surface 611 of the first layer 61. The third interconnecting portion 403 is disposed apart and offset from the first interconnecting portion 401 in the second sense of the x direction and extends almost entirely along the y direction. The third interconnecting portion 403 is at the same position as the first interconnecting portion 401 in the z direction. The third interconnecting portion 403 overlaps with the entire switching element 2 as viewed in the z direction. The third interconnecting portion 403 is bonded and electrically connected to the drain electrode 231 of the switching element 2.

The interconnecting portion 412 is disposed along the second resin surface 602. In the semiconductor light-emitting device A1, the interconnecting portion 412 is offset in the first sense of the x direction and extends almost entirely along the y direction. The interconnecting portion 413 is disposed along the second resin surface 602. The interconnecting portion 413 is offset from the first interconnecting portion 401 in the second sense of the x direction and extends almost entirely along the y direction. The interconnecting portion 414 is disposed along the second resin surface 602. The interconnecting portion 414 is offset from the interconnecting portion 413 in the second sense of the x direction, and is offset in the first sense of the y direction. The interconnecting portion 415 is disposed along the second resin surface 602. The interconnecting portion 415 is offset from the interconnecting portion 413 in the second sense of the x direction, and is offset in the second sense of the y direction.

The interconnecting portions 412, 413, 414 and 415, which are disposed along the second resin surface 602, are spaced apart from each other. The interconnecting portions 412, 413, 414 and 415 are used as external connection terminals in mounting the semiconductor light-emitting device A1 to a circuit board (not shown), for example.

The second embedded portions 452 are received in the second cavities 652 and connected to the second element electrode 14 of the semiconductor light-emitting element 1. In the present embodiment, a plurality of second embedded portions 452 are provided. In the illustrated example, the plurality of second embedded portions 452 are arranged in a matrix along the x direction and the y direction. The third embedded portions 453 are received in the third cavities 653 and connected to the source electrode 233 of the switching element 2. In the present embodiment, a plurality of third embedded portions 453 are provided. In the illustrated example, the third embedded portions 453 are arranged along the y direction.

The embedded portions 471 are received in the cavities 671 and connected to the third interconnecting portion 403 and the interconnecting portion 413. In the present embodiment, a plurality of embedded portions 471 are provided. In the illustrated example, the embedded portions 471 are arranged along the y direction at each end in the y direction. The embedded portions 472 are received in the cavities 672 and connected to the first interconnecting portion 401 and the interconnecting portion 412. In the present embodiment, a plurality of embedded portions 472 are provided. In the illustrated example, the embedded portions 472 are arranged along the y direction at each end in the y direction. The embedded portion 473 is received in the cavity 673 and connected to the gate electrode 232 of the switching element 2 and the interconnecting portion 414. The embedded portions 474 are received in the cavities 674 and connected to the source electrode 233 of the switching element 2 and the interconnecting portion 415. In the present embodiment, a plurality of embedded portions 474 are provided. In the illustrated example, the embedded portions 474 are arranged along the y direction.

Each of the interconnecting portions and the embedded portions (excluding the first interconnecting portion 401 and the third interconnecting portion 403) includes a base layer and a plating layer. As an example, the third embedded portion 453 and the second interconnecting portion 402 shown in FIG. 7 are described below. The base layer 40a is composed of a metal element contained in the additive included in the sealing resin 6 (the second layer 62) and in contact with the second layer 62. The plating layer 40b is made of a material containing copper (Cu), for example, and in contact with the base layer 40a. The base layer 40a of the third embedded portion 453 is in contact with the second layer 62. The plating layer 40b of the third embedded portion 453 is surrounded by the base layer 40a of the third embedded portion 453. The base layer 40a of the second interconnecting portion 402 is in contact with the second layer 62. The plating layer 40b of the second interconnecting portion 402 covers the base layer 40a of the second interconnecting portion 402 and is enclosed by the base layer 40a of the second interconnecting portion 402 and the fourth layer 64. As shown in FIG. 7, the third embedded portion 453 is tapered, with its side surface inclined with respect to the z direction such that the area of the cross section orthogonal to the z direction becomes smaller as proceeding toward the source electrode 233. The tapered shape of the third embedded portion 453 results from the manufacturing process of the semiconductor light-emitting device A1, which will be described later, and other embedded portions also have a tapered shape.

In the embedded portion 474 and the interconnecting portion 415 shown in FIG. 8, the base layer 40a is composed of a metal element contained in the additive included in the sealing resin 6 (the second layer 62 and the fourth layer 64) and in contact with the second layer 62 and the fourth layer 64. The plating layer 40b is in contact with the base layer 40a. The base layer 40a of the third embedded portion 453 is in contact with the second layer 62. The base layer 40a of the embedded portion 474 is in contact with the second layer 62 and the fourth layer 64. The plating layer 40b of the embedded portion 474 is surrounded by the base layer 40a of the embedded portion 474. The base layer 40a of the interconnecting portion 415 is in contact with fourth layer 64. The plating layer 40b of the interconnecting portion 415 covers the base layer 40a of the interconnecting portion 415 and slightly projects beyond the second resin surface 602 in the second sense of the z direction.

The capacitors 3 function to temporarily store the electric charge which is to become the current for energizing the semiconductor light-emitting element 1. As shown in FIGS. 5 and 6, the capacitors 3 are disposed on the first side of the first resin surface 601 in the z direction and entirely exposed from the sealing resin 6. As shown in FIGS. 1, 5 and 6, in the illustrated example, each capacitor 3 has an electrode 31 and an electrode 32. The electrode 31 is bonded and electrically connected to the first interconnecting portion 401 with a conductive bonding material 39. The electrode 32 is bonded and electrically connected to the third interconnecting portion 403 with a conductive bonding material 39. Thus, the electrode 31 is electrically connected to the first element electrode 13 via the first interconnecting portion 401, and the electrode 32 is electrically connected to the drain electrode 231 via the third interconnecting portion 403. With such a configuration, the capacitors 3 electrically intervenes between the drain electrode 231 and the first element electrode 13. The conductive bonding material 39 may be solder, for example. For convenience of description, the conductive bonding material 39 is omitted in FIG. 1. In the present embodiment, the semiconductor light-emitting device A1 has two capacitors 3. The two capacitors 3 are arranged side by side in the y direction and connected in parallel to each other. The number and position of the capacitors 3 are not limited to the above.

Figure 10:
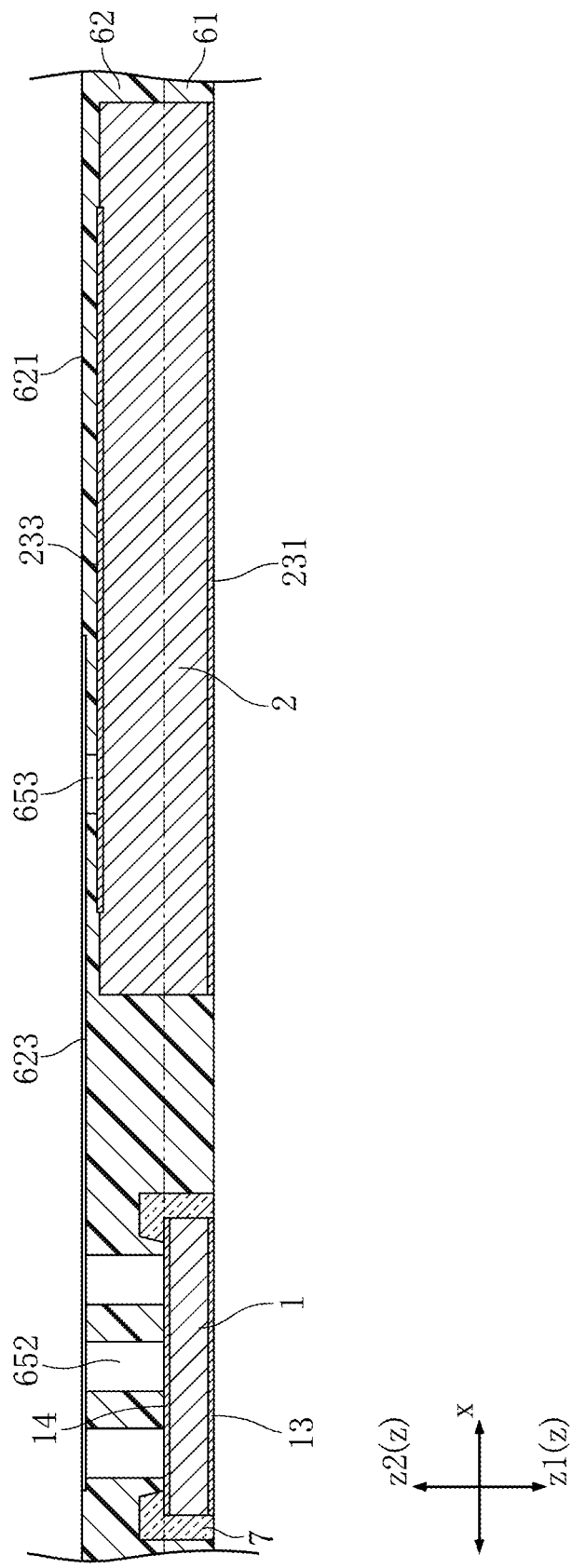
FIG. 10 is a sectional view showing a step subsequent to FIG. 9.
Figure 11:
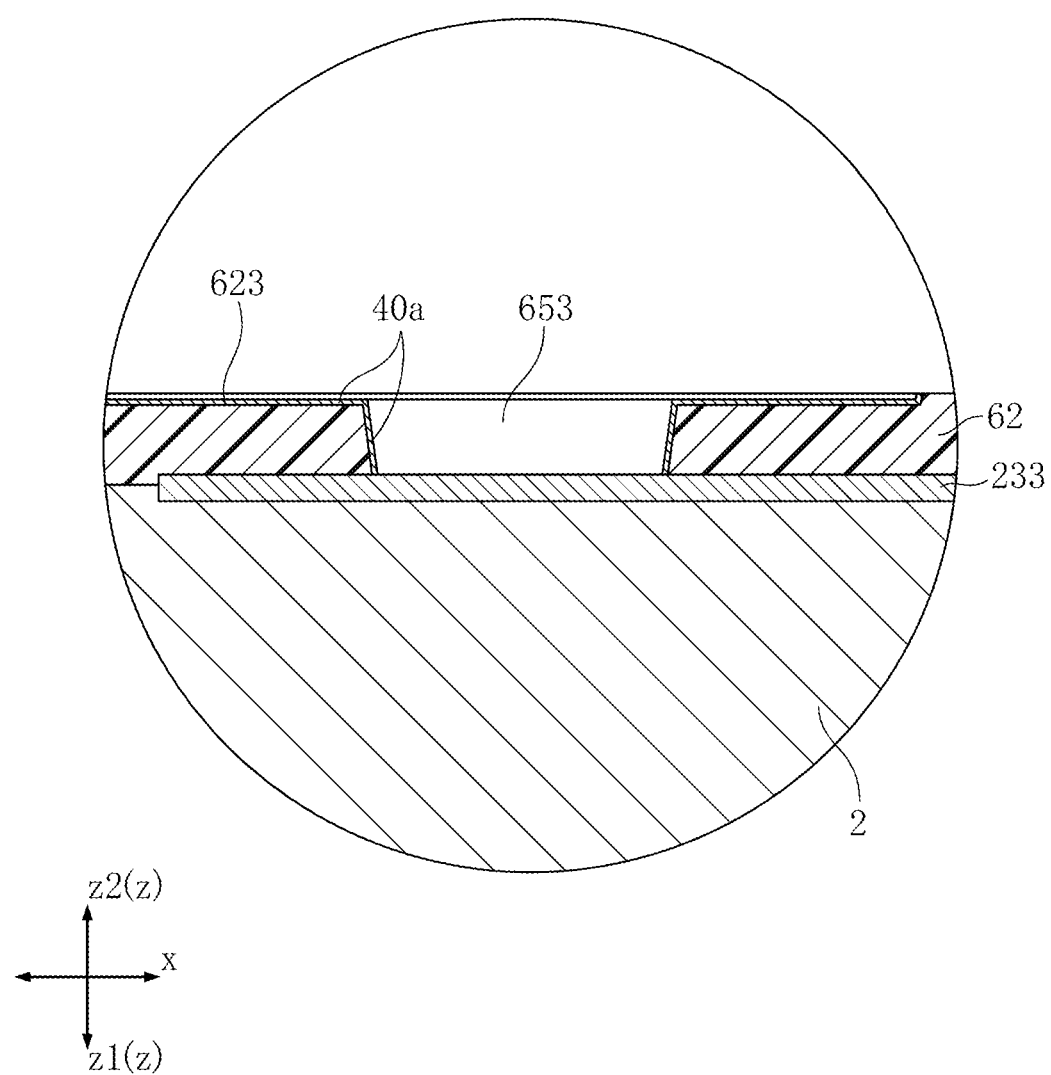
FIG. 11 is an enlarged view of a portion of FIG. 10.
Figure 12:
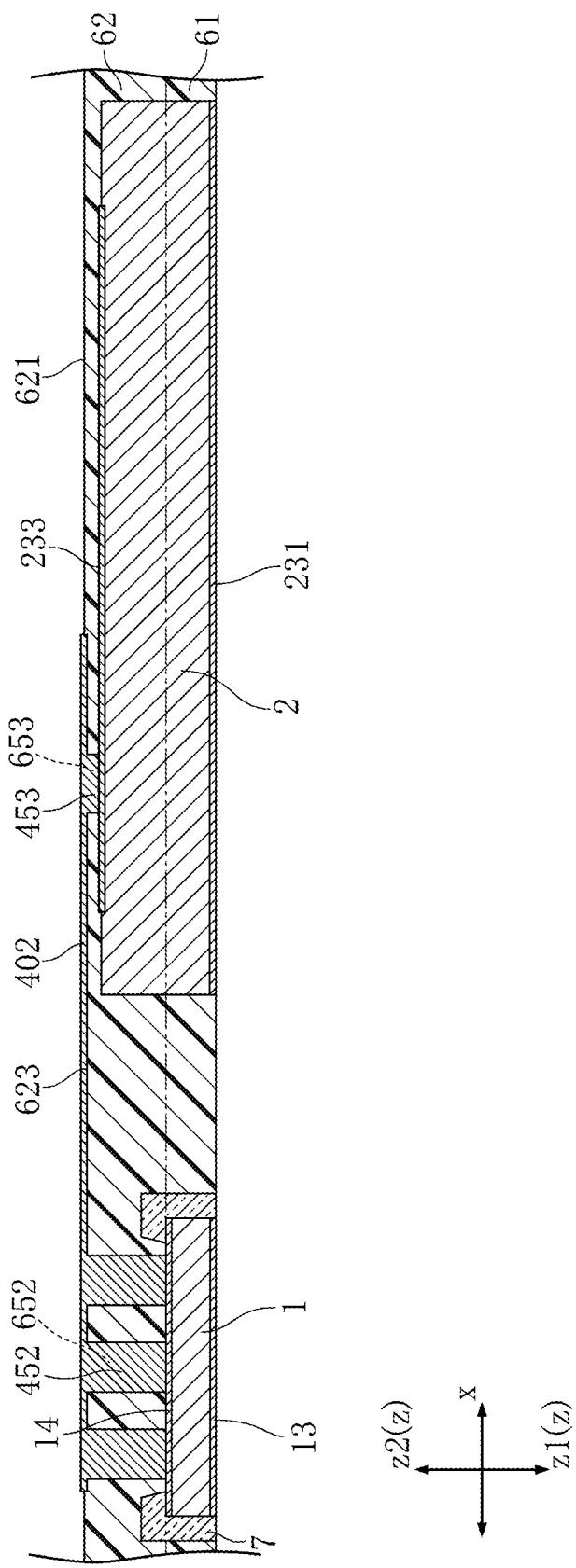
FIG. 12 is a sectional view showing a step subsequent to FIG. 10.
Figure 13:
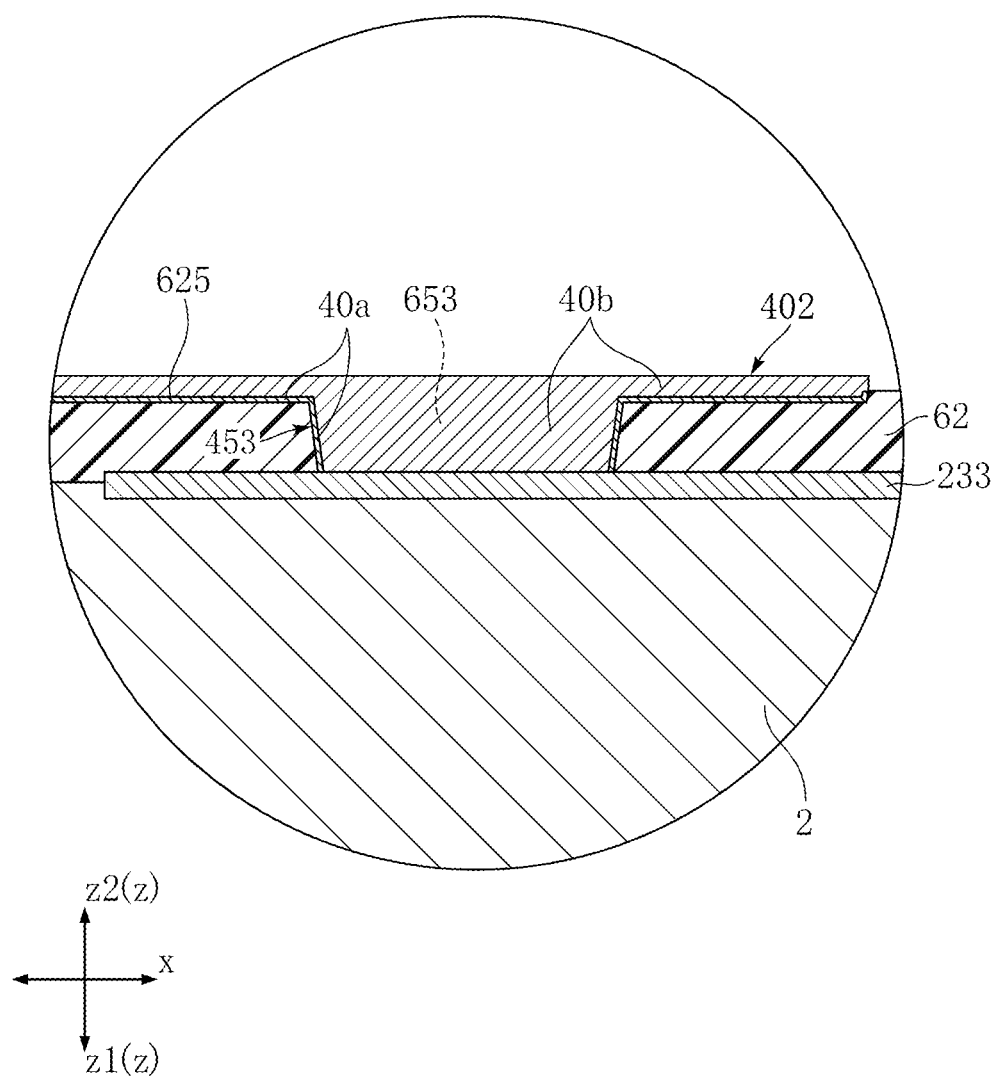
FIG. 13 is an enlarged view of a portion of FIG. 12.
Figure 15:
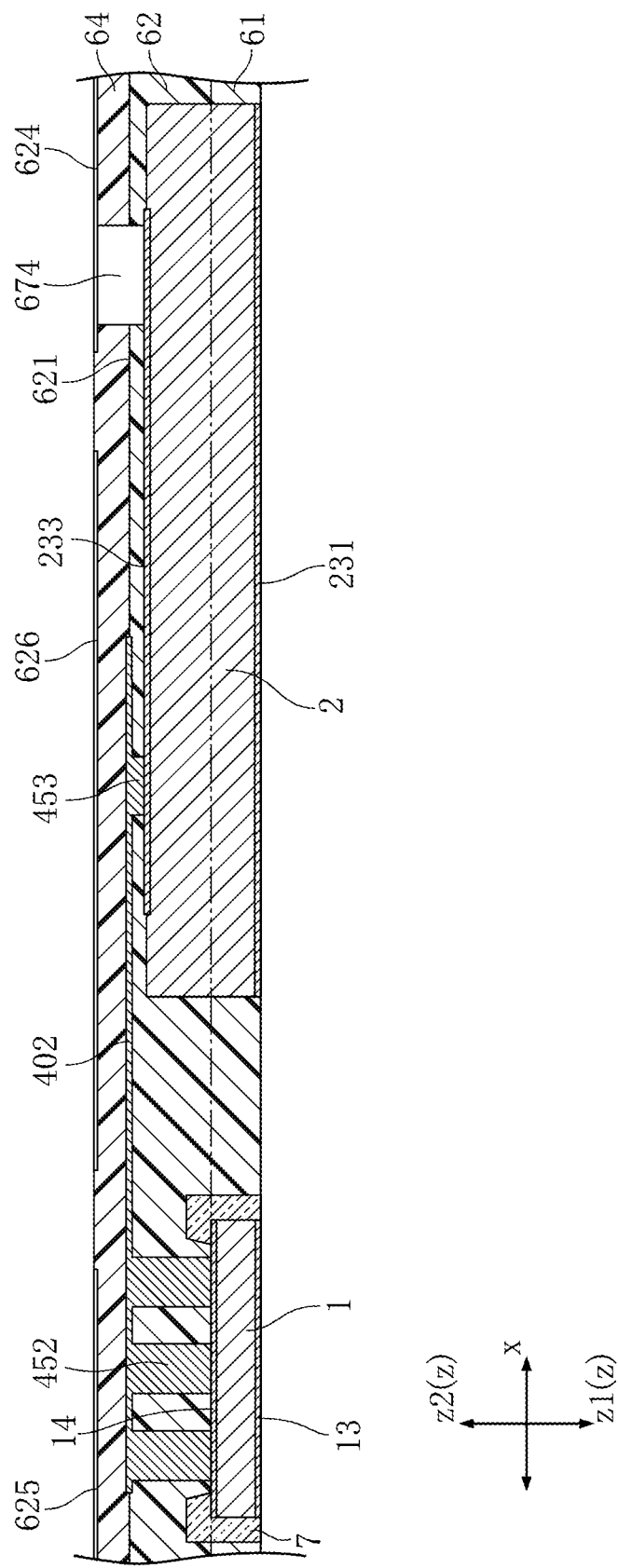
FIG. 15 is a sectional view showing a step subsequent to FIG. 14.
Figure 16:
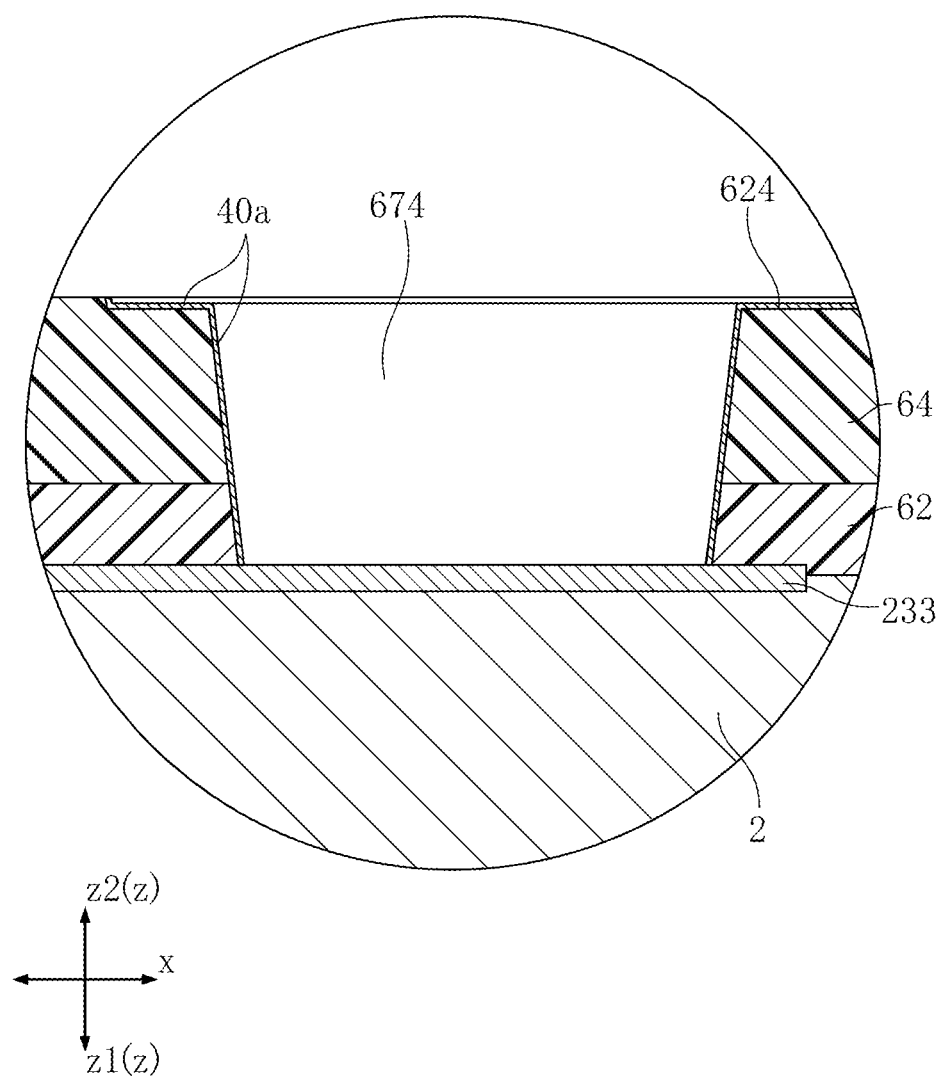
FIG. 16 is an enlarged view of a portion of FIG. 15.
Figure 17:
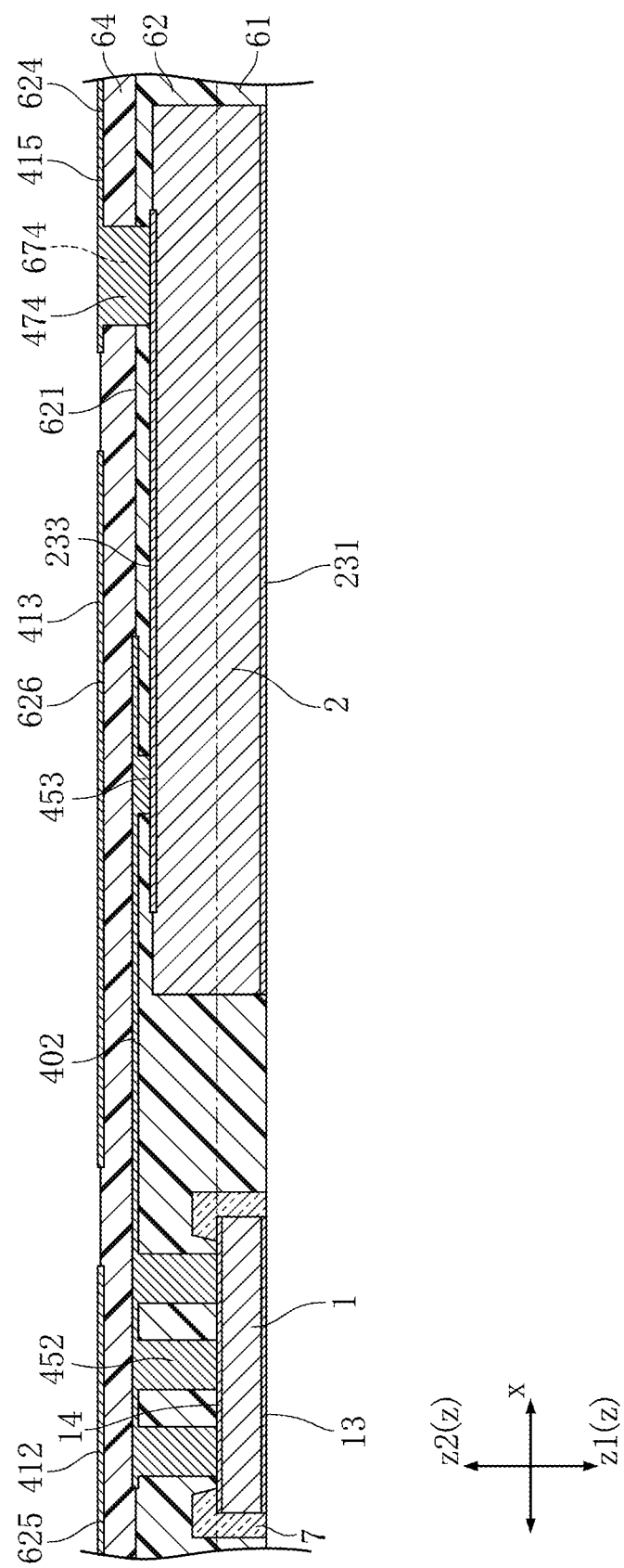
FIG. 17 is a sectional view showing a step subsequent to FIG. 15.
Figure 18:
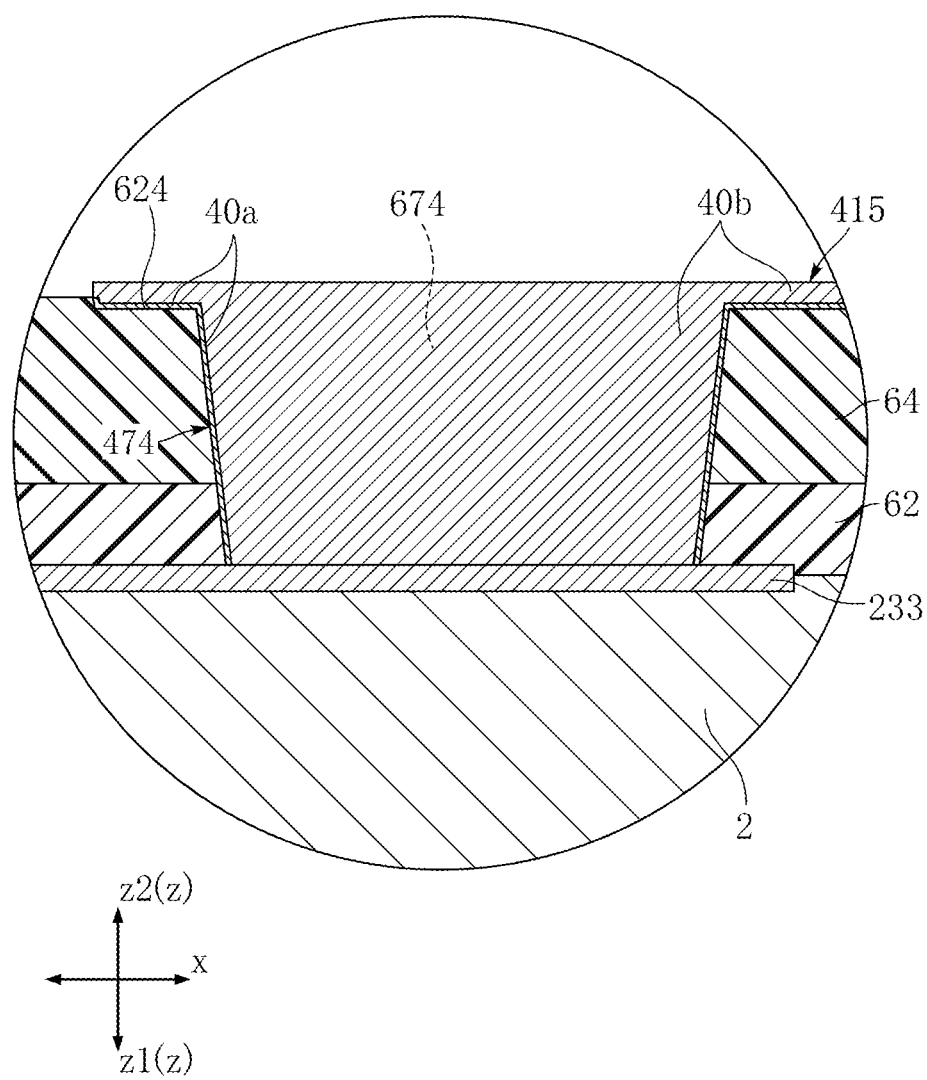
FIG. 18 is an enlarged view of a portion of FIG. 17.

An example of a method for manufacturing the semiconductor light-emitting device A1 is described below with reference to FIGS. 9 to 20. FIGS. 9 to 20 each show a step in the example of a method for manufacturing the semiconductor light-emitting device A1. FIGS. 9, 10, 12, 14, 15, 17, 19 and 20 are sectional views corresponding to FIG. 5. FIG. 11 is an enlarged view of a portion of FIG. 10 and corresponds to FIG. 7. FIG. 13 is an enlarged view of a portion of FIG. 12 and corresponds to FIG. 7. FIG. 16 is an enlarged view of a portion of FIG. 15 and corresponds to FIG. 8. FIG. 18 is an enlarged view of a portion of FIG. 17 and corresponds to FIG. 8.

Figure 9:
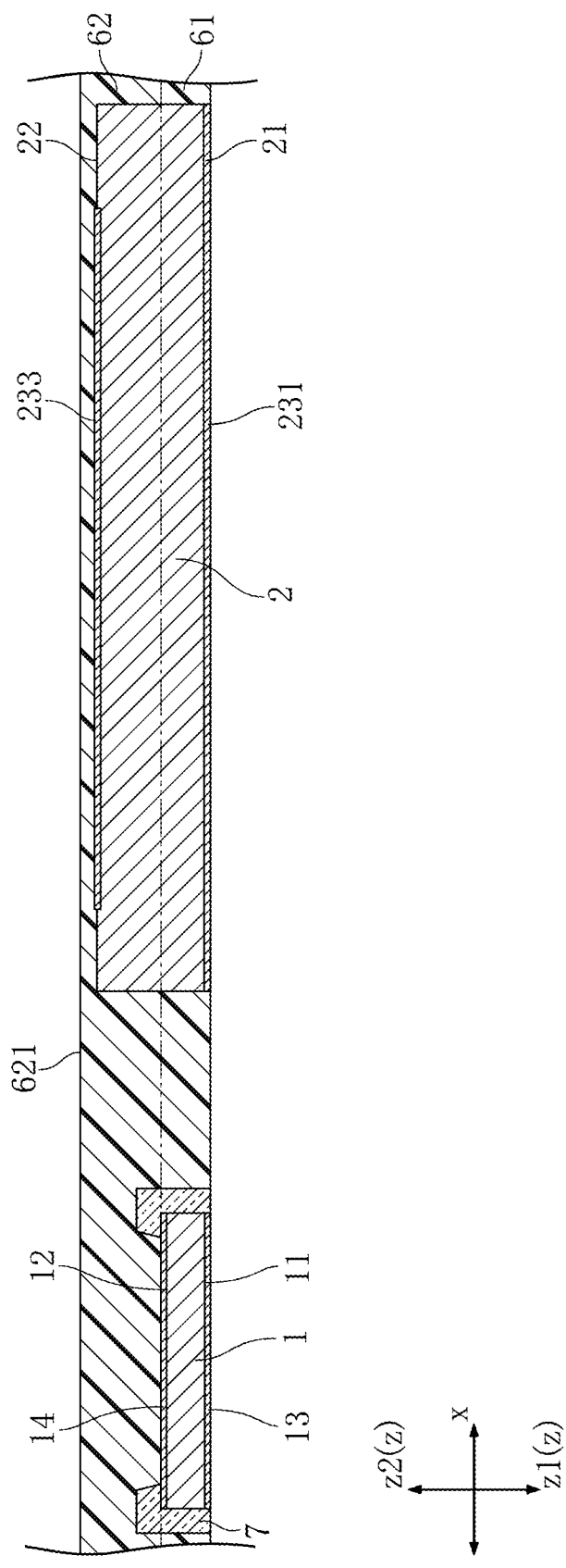
FIG. 9 is a sectional view showing a step in an example of a method for manufacturing the semiconductor light-emitting device of FIG. 1.

First, as shown in FIG. 9, a first layer 61 and a second layer 62 are formed to cover the second element electrode 14 of a semiconductor light-emitting element 1, which is partially covered with a light-transmittable resin 7, and a switching element 2. In this step, the semiconductor light-emitting element 1 and the switching element 2 are held upside down as compared to the posture shown in FIG. 5. The second layer 62 covers the second element surface 12 of the semiconductor light-emitting element 1 and the second switching element surface 22 of the switching element 2. The first layer 61 and the second layer 62 are made of a material including a thermosetting synthetic resin and an additive containing a metal element, which later forms a part of the conductor 4. Examples of the synthetic resin include epoxy resin and polyimide resin. The first layer 61 and the second layer 62 are formed by compression molding.

Next, as shown in FIGS. 10 to 13, second embedded portions 452 connected to the second element electrode 14 of the semiconductor light-emitting element 1, third embedded portions 453 connected to the source electrode 233 of the switching element 2, and a second interconnecting portion 402 connected to the second embedded portions 452 and the third embedded portions are formed.

As shown in FIG. 13, the third embedded portions 453 are embedded in the third cavities 653 and connected to the source electrode 233. As shown in FIG. 13, each of the third embedded portions 453 and the second interconnecting portion 402 has a base layer 40a and a plating layer 40b. The process of forming the third embedded portions 453 and the second interconnecting portion 402 includes a step of depositing a base layer 40a on the surface of the second layer 62 and a step of forming a plating layer 40b covering the base layer 40a.

First, as shown in FIG. 11, a base layer 40a is deposited on the surface of the second layer 62. In this step, as shown in FIG. 10, third cavities 653 and a groove 623 are formed in the second layer 62 with a laser. The third cavities 653 penetrate the second layer 62 in the z direction. The third cavities 653 expose the source electrode 233 of the switching element 2.

The third cavities 653 are formed by irradiating the second layer 62 with a laser beam until the source electrode 233 is exposed while checking the position of the source electrode 233 through image recognition with an infrared camera, for example. The laser irradiation point is corrected as appropriate based on the information on the position of the source electrode 233 obtained through image recognition. The groove 623 is recessed from the surface of the second layer 62 and connected to the third cavities 653. The groove 623 is formed by irradiating the surface of the second layer 62 with a laser beam. The laser beam may be an ultraviolet laser beam with a wavelength of 355 nm and a beam diameter of 17 μm, for example. By forming the third cavities 653 and the groove 623 in the second layer 62, the base layer 40a is deposited, as shown in FIG. 11. The base layer 40a covers the wall surface defining the third cavities 653 and the groove 623. The base layer 40a is composed of a metal element contained in the additive included in the second layer 62. The metal element contained in the additive is excited by laser irradiation. As a result, a metal layer containing the metal element is deposited as the base layer 40a. Although detailed description is omitted, the second cavities 652 shown in FIG. 10 is formed in the same manner as the third cavities 653. The second cavities 652 penetrate the second layer 62 in the z direction. The second cavities 652 expose the second element electrode 14 of the semiconductor light-emitting element 1.

Next, as shown in FIG. 13, a plating layer 40b covering the base layer 40a is formed. The plating layer 40b is made of a material containing copper. The plating layer 40b may be formed by electroless plating, for example. In this way, as shown in FIG. 12, the second embedded portions 452 and the third embedded portions 453 are formed in the second cavities 652 and the third cavities 653, respectively. The second interconnecting portion 402 is formed in the groove 623.

Figure 14:
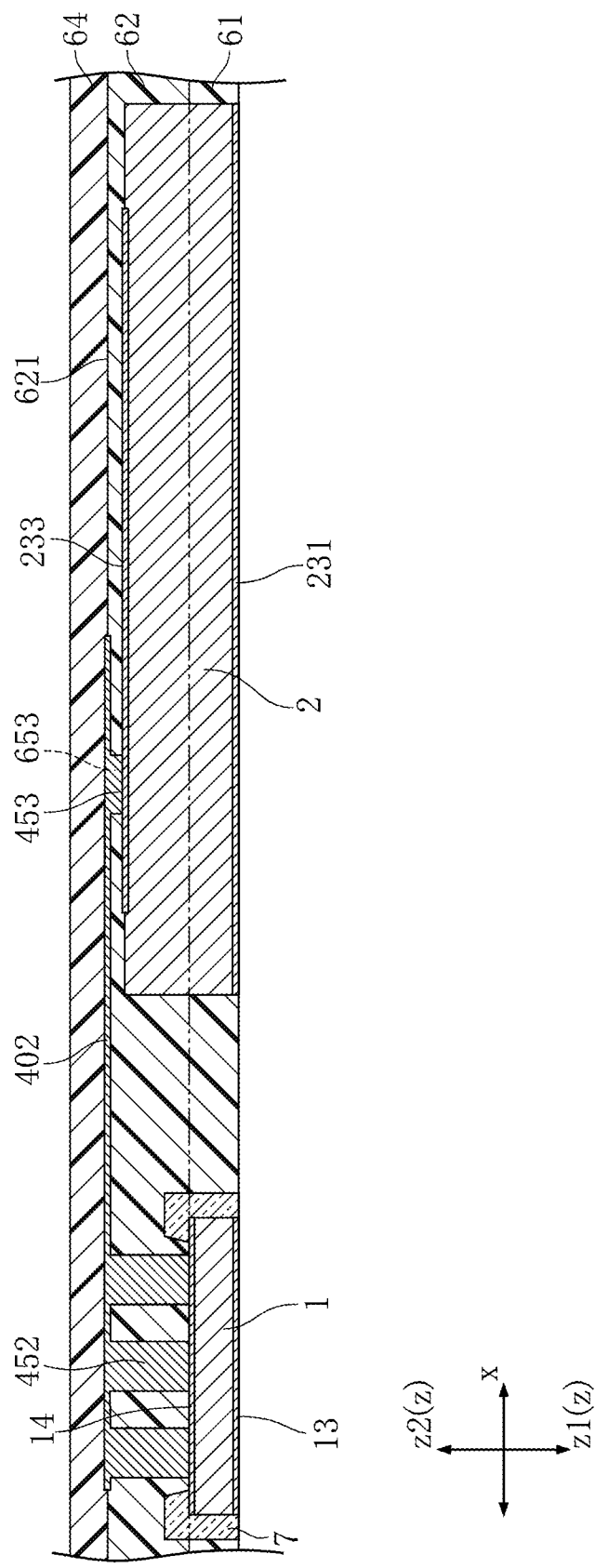
FIG. 14 is a sectional view showing a step subsequent to FIG. 12.

Next, a fourth layer 64 is formed, as shown in FIG. 14. The fourth layer 64 is laminated on the second layer 62 and covers the second interconnecting portion 402. The fourth layer 64 is made of the same material as the first layer 61 and the second layer 62. The fourth layer 64 is formed by compression molding.

Next, embedded portions 474, an interconnecting portion 415, an interconnecting portion 412, and an interconnecting portion 413 are formed, as shown in FIGS. 15 to 18.

As shown in FIG. 18, the embedded portions 474 are embedded in the cavities 674 and connected to the source electrode 233. As shown in FIG. 18, each of the embedded portions 474 and the interconnecting portion 415 has a base layer 40a and a plating layer 40b. The process of forming the embedded portions 474 and the interconnecting portion 415 includes a step of depositing a base layer 40a on the surfaces of the second layer 62 and the fourth layer 64 and a step of forming a plating layer 40b covering the base layer 40a.

First, as shown in FIG. 16, a base layer 40a is deposited on the surfaces of the second layer 62 and the fourth layer 64. In this step, as shown in FIG. 15, cavities 674 and a groove 624 are formed in the second layer 62 with a laser. The cavities 674 penetrate the fourth layer 64 and the second layer 62 in the z direction. The cavities 674 expose the source electrode 233 of the switching element 2.

The cavities 674 are formed by irradiating the fourth layer 64 and the second layer 62 with a laser beam until the source electrode 233 is exposed while checking the position of the source electrode 233 through image recognition with an infrared camera, for example. The laser irradiation point is corrected as appropriate based on the information on the position of the source electrode 233 obtained through image recognition. The groove 624 is recessed from the surface of the fourth layer 64 and connected to the cavities 674. The groove 624 is formed by irradiating the surface of the fourth layer 64 with a laser beam. The laser beam may be an ultraviolet laser beam with a wavelength of 355 nm and a beam diameter of 17 μm, for example. By forming the cavities 674 and the groove 624 in the second layer 62, the base layer 40a is deposited, as shown in FIG. 16. The base layer 40a covers the wall surface defining the cavities 674 and the groove 624. The base layer 40a is composed of a metal element contained in the additive included in the second layer 62 and the fourth layer 64. The metal element contained in the additive is excited by laser irradiation. As a result, a metal layer containing the metal element is deposited as the base layer 40a. Although detailed description is omitted, the groove 625 and the groove 626 shown in FIG. 15 are formed in the same manner as the groove 624.

Next, as shown in FIG. 18, a plating layer 40b covering the base layer 40a is formed. The plating layer 40b is made of a material containing copper. The plating layer 40b may be formed by electroless plating. In this way, as shown in FIG. 17, the embedded portions 474 and the interconnecting portion 415 are formed in the cavities 674 and the groove 624, respectively. The embedded portions 474 and the interconnecting portion 415 are connected to each other. Also, an interconnecting portion 412 and an interconnecting portion 413 are formed in the groove 625 and the groove 626, respectively. Although not illustrated, the embedded portions 471 and the embedded portions 472 are formed in the same manner as the embedded portions 474 described above.

Figure 19:
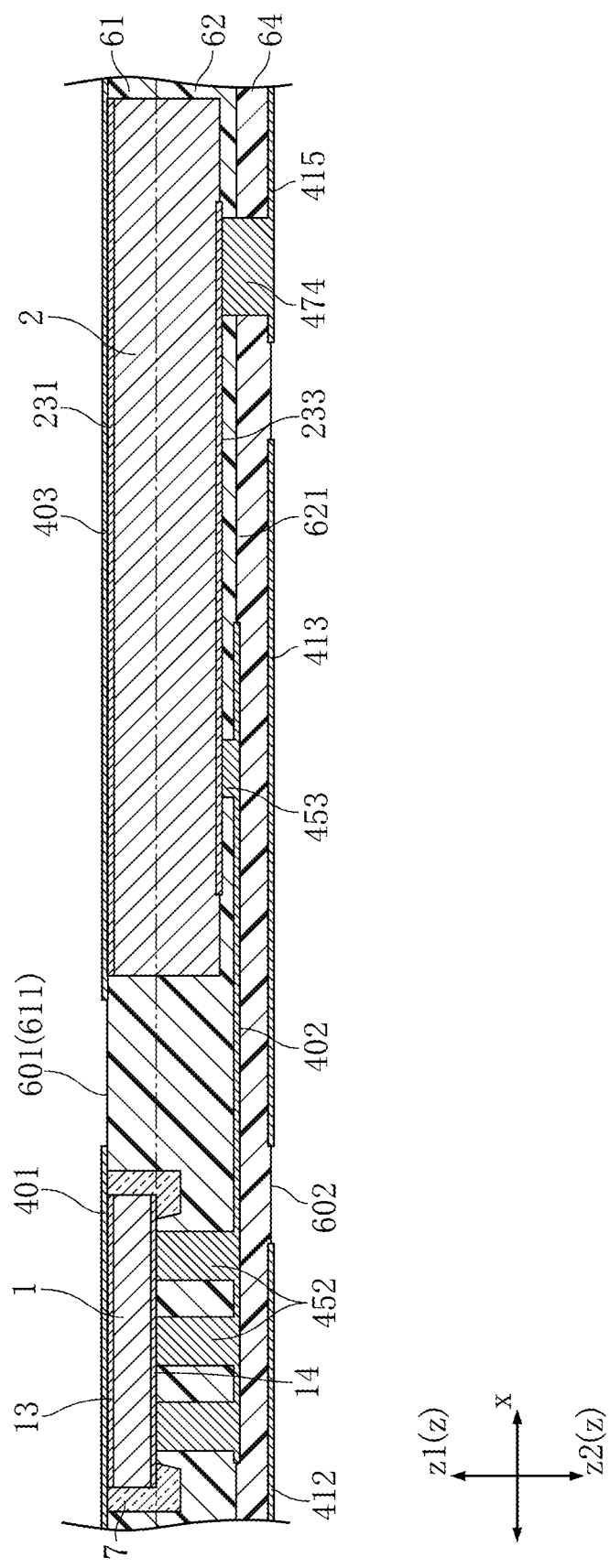
FIG. 19 is a sectional view showing a step subsequent to FIG. 17.
Figure 20:
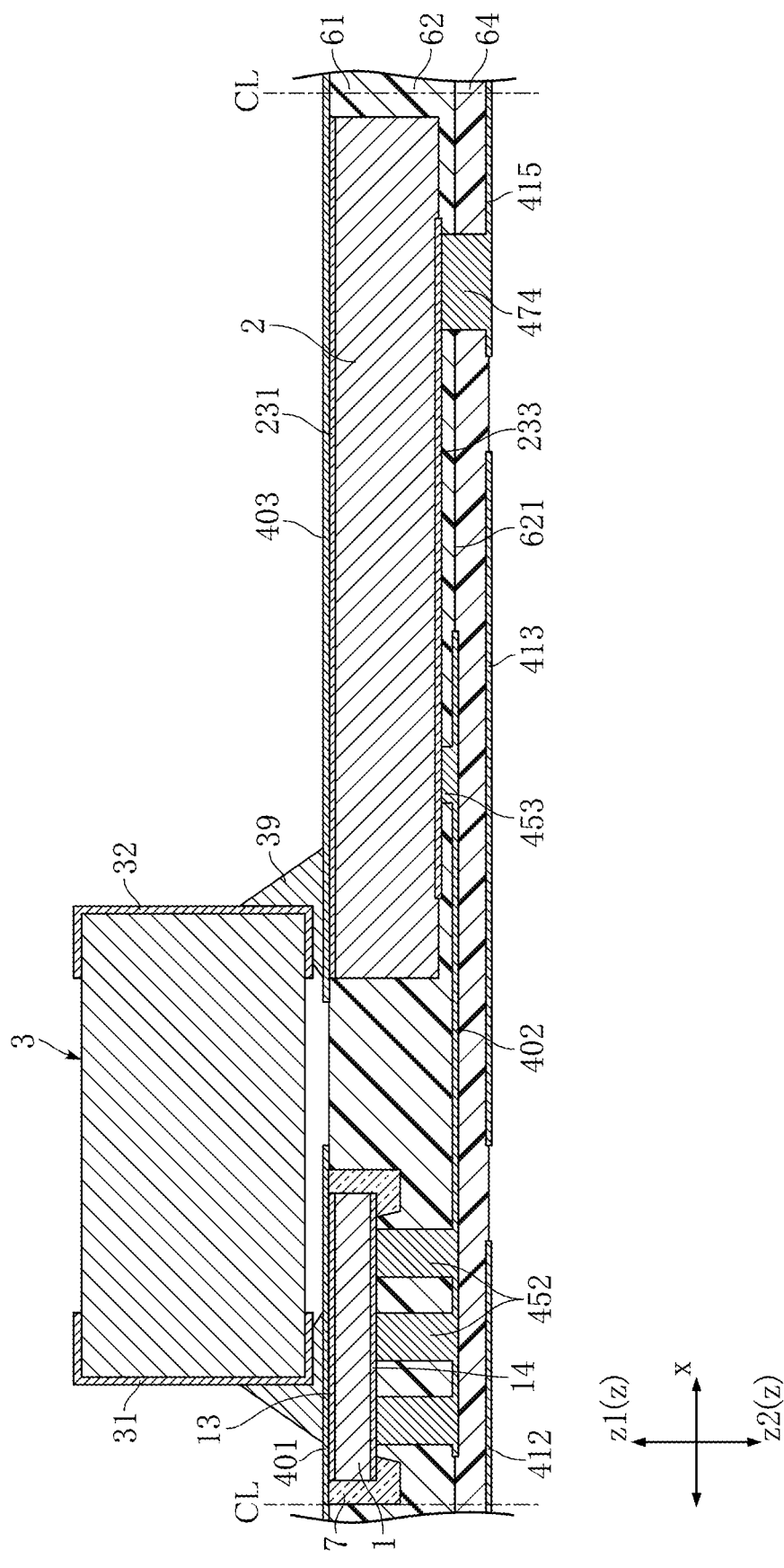
FIG. 20 is a sectional view showing a step subsequent to FIG. 19.

Next, after the laminate of the first layer 61, the second layer 62 and the fourth layer 64 are turned upside down such that the semiconductor light-emitting element 1 and the switching element 2 are located on the upper side, the first interconnecting portion 401 and the third interconnecting portion 403 are formed, as shown in FIG. 19. The first interconnecting portion 401 covers the first element electrode 13 of the semiconductor light-emitting element 1 and a portion of the first resin surface 601. The third interconnecting portion 403 covers the drain electrode 231 of the switching element 2 and a portion of the first resin surface 601. The first interconnecting portion 401 and the third interconnecting portion 403 may be formed by electroless plating.

Next, capacitors 3 are disposed on the first interconnecting portion 401 and the third interconnecting portion 403. In this step, the electrode 31 of each capacitor 3 is bonded and electrically connected to the first interconnecting portion 401 via a conductive bonding material 39, and the electrode 32 is bonded and electrically connected to the third interconnecting portion 403 via a conductive bonding material 39. Finally, the first layer 61, the second layer 62 and the fourth layer 64 are cut along predetermined cutting lines CL into a plurality of individual pieces with a dicing blade, for example. This cutting is performed such that each individual piece includes one semiconductor light-emitting element 1, one switching element 2, two capacitors 3, and a conductor 4 (interconnecting portions and embedded portions) connected to these. Through the above process, the semiconductor light-emitting device A1 is manufactured.

Figure 21:
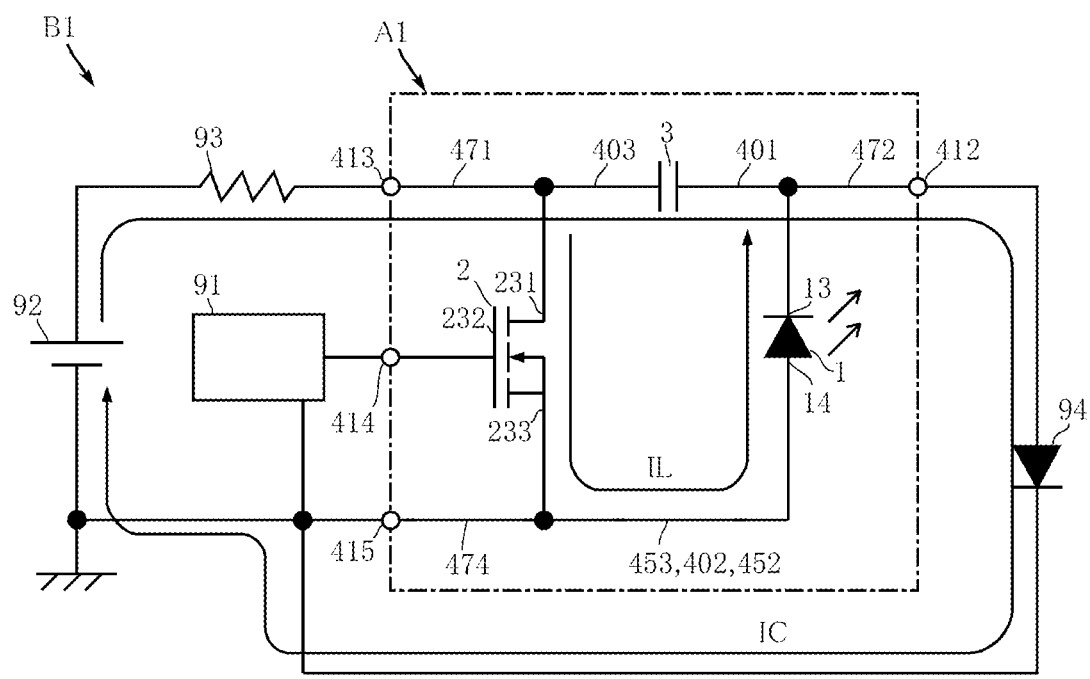
FIG. 21 is a circuit diagram of a semiconductor light-emitting system including the semiconductor light-emitting device according to the first embodiment of the present disclosure.

As shown in FIG. 21, the semiconductor light-emitting device A1 can be used for a semiconductor light-emitting system B1. The semiconductor light-emitting system B1 includes a gate driver 91, a DC power supply 92, a resistor 93 and a diode 94 in addition to the semiconductor light-emitting device A1.

The gate driver 91 is connected to the gate electrode 232 of the switching element 2 via the interconnecting portion 414 and the embedded portion 473. The gate driver 91 controls the driving voltage applied to the gate electrode 232. The DC power supply 92 is a power supply for emitting light from the semiconductor light-emitting element 1. The anode electrode of the DC power supply 92 is connected to the interconnecting portion 413 via the resistor 93. The diode 94 is provided between the interconnecting portion 415 and the interconnecting portion 412 to allow the current flow from the interconnecting portion 412 to the interconnecting portion 415. The diode 94 is provided to achieve charging of the capacitors 3 while preventing the application of excessive reverse voltage to the semiconductor light-emitting element 1.

In the semiconductor light-emitting system B1 having the above configuration, when the switching element 2 is OFF, the current IC flows from the DC power supply 92 through the resistor 93, the interconnecting portion 413, the embedded portions 471, the third interconnecting portion 403, the capacitors 3, the first interconnecting portion 401, the embedded portions 472, the interconnecting portion 412 and the diode 94, whereby the capacitors 3 are charged. When the switching element 2 is ON, the charge stored in the capacitor 3 flows, as the current IL, through the third interconnecting portion 403, the switching element 2, the third embedded portions 453, the second interconnecting portion 402, the second embedded portions 452, the semiconductor light-emitting element 1, and the first interconnecting portion 401, whereby the semiconductor light-emitting element 1 emits light.

The effect and advantages of the present embodiment are described below.

According to the present embodiment, the conductor 4, which forms the conduction path to the semiconductor light-emitting element 1, includes the first interconnecting portion 401, the second interconnecting portion 402, and the second embedded portions 452. The first interconnecting portion 401 and the second interconnecting portion 402 are disposed along a direction perpendicular to the thickness direction (z direction) of the semiconductor light-emitting element 1 (i.e., along the x-y plane). The first interconnecting portion 401 is offset from first element surface 11 of the semiconductor light-emitting element 1 in the first sense of the z direction and electrically connected to the first element electrode 13 disposed on the first element surface 11. The second interconnecting portion 402 is offset from the second element surface 12 of the semiconductor light-emitting element 1 in the second sense of the z direction. The second interconnecting portion 402 is electrically connected to the second element electrode 14 disposed on the second element surface 12 via the second embedded portions 452. At least a portion (the second element surface 12) of the semiconductor light-emitting element 1 is covered with the sealing resin 6, and the conductor 4 (the first interconnecting portion 401, the second interconnecting portion 402, and the second embedded portions 452) is in contact with the sealing resin 6. With such a configuration, the conduction path (the first interconnecting portion 401, the second interconnecting portion 402 and the second embedded portions 452) to the first element electrode 13 and the second element electrode 14, which are disposed on opposite sides of the semiconductor light-emitting element 1, can be three-dimensionally arranged in a space-efficient manner. Accordingly, the path of the current (the path of the current IL shown in FIG. 21) that flows when the semiconductor light-emitting element 1 emits light can be shortened, and the inductance component of the current path can be reduced. Thus, when the semiconductor light-emitting device A1 is applied to a pulse laser light source for LiDAR, faster switching is possible, and the peak value of the current (current IL) that flows when the light emitting device 1 emits light can be increased. This is advantageous for emitting laser beams with smaller pulse widths and higher output power. Thus, the semiconductor light-emitting device is desirable as a light source device for LiDAR.

The semiconductor light-emitting device A1 has the switching element 2. The switching element 2 is at least partially covered with the sealing resin 6 and is disposed across the first layer 61 and the second layer 62. In contrast, the semiconductor light-emitting element 1 is disposed in the first layer 61 alone. Thus, the second element surface 12 of the semiconductor light-emitting element 1 and the second switching element surface 22 of the switching element 2 are at different positions in the z direction (the thickness direction). In the present embodiment, the second element electrode 14 disposed on the second element surface 12 and the source electrode 233 disposed on the second switching element surface 22 are electrically connected via the second embedded portions 452, the second interconnecting portion 402, and the third embedded portions 453. The second embedded portions 452 are received in the second cavities 652, which extend to the second element electrode 14 in the z direction, and connected to the second element electrode 14. The third embedded portions 453 are received in the third cavities 653, which extend to the source electrode 233 in the z direction, and connected to the source electrode 233. The second interconnecting portion 402 is disposed along the second surface 621 of the second layer 62 and connected to the second cavities 652 and the third cavities 653. The second embedded portions 452 and the third embedded portions 453 have a shape along the z direction, and the second interconnecting portion 402 is along the direction perpendicular to the z direction (i.e., along the x-y plane). Thus, the second embedded portions 452, the second interconnecting portion 402 and the third embedded portions 453, which form the conduction path between the semiconductor light-emitting element 1 (the second element electrode 14) and the source electrode 233, are not bent. This is suitable for reducing the inductance component of the path of the current flowing through the semiconductor light-emitting device A1.

In the present embodiment, the second element electrode 14 of the semiconductor light-emitting element 1 and the source electrode 233 of the switching element 2, which are at different positions in the z direction (the thickness direction) as described above, are electrically connected via the second embedded portions 452, the second interconnecting portion 402 and the third embedded portions 453. Such a configuration increases the reliability of conduction between the semiconductor light-emitting element 1 (the second element electrode 14) and the source electrode 233, as compared with electrically connecting the semiconductor light-emitting element and the source electrode using a wire, for example. Moreover, the conduction path formed by the second embedded portions 452, the second interconnecting portion 402 and the third embedded portions 453 can have a relatively large cross sectional area. This is suitable for reducing the inductance component of the path of the current flowing through the semiconductor light-emitting device A1.

The third interconnecting portion 403 electrically connected to the drain electrode 231 of the switching element 2 is disposed at the same position as the first interconnecting portion 401 in the z direction. In the present embodiment, the first interconnecting portion 401 is bonded and electrically connected to the first element electrode 13 of the semiconductor light-emitting element 1, and the third interconnecting portion 403 is bonded and electrically connected to the drain electrode 231, and the capacitors 3 are mounted on the first interconnecting portion 401 and the third interconnecting portion 403. With such a configuration, the length of the path from the first element electrode 13 of the semiconductor light-emitting element 1 to the drain electrode 231 through the first interconnecting portion 401, the capacitors 3, and the third interconnecting portion 403 is relatively short. This is suitable for reducing the inductance component of the path of the current flowing through the semiconductor light-emitting device A1.

The semiconductor light-emitting element 1 and the switching element 2 are disposed apart from each other as viewed in the z direction. Such a configuration can reduce the dimension of the semiconductor light-emitting device A1 in the z direction (thickness direction). Accordingly, the path of the current that flows when the semiconductor light-emitting element 1 emits light can be shortened, which is suitable for reducing the inductance component of the current path.

The second interconnecting portion 402 is disposed between the second layer 62 and the fourth layer 64. With such a configuration, the second interconnecting portion 402 can be disposed so as to overlap with external connection terminals (the interconnecting portion 412, the interconnecting portion 413, etc.) disposed on the second resin surface 602. This is suitable for reducing the size of the semiconductor light-emitting device A1 as viewed in the z direction.

Unlike the present embodiment, when the parts such as a semiconductor light-emitting element, a switching element, and a capacitor are arranged two-dimensionally on a substrate and sealed with a resin, connecting these parts involves an increase in size of the semiconductor light-emitting device as viewed in the thickness direction. This may lead to an increased length of the path of the current that flows when the semiconductor light-emitting element emits light. Moreover, electrical connection of the parts requires the use of a wire. Thus, the inductance component cannot be reduced when the parts are arranged two-dimensionally on a substrate and sealed with resin. In contrast, in the semiconductor light-emitting device A1 of the present embodiment, the semiconductor light-emitting element 1 and the switching element 2 are covered inside the sealing resin 6. This allows mounting the capacitors 3 three-dimensionally so as to overlap with the semiconductor light-emitting element 1 or the switching element 2 as viewed in the z direction (the thickness direction). This is suitable for shortening the path of the current that flows when the semiconductor light-emitting element 1 emits light, and hence is suitable for reducing the inductance component of the current path. Moreover, the conductor 4, which forms the conduction path to the semiconductor light-emitting element 1 and the switching element 2, is constituted by a plurality of interconnecting portions and a plurality of embedded portions, and electrical connection using a wire is not necessary. This reduces the inductance component of the path of the current flowing through the semiconductor light-emitting element 1 and improves the yield (the percentage of non-defective products) of the semiconductor light emitting device A1.

Figure 22:
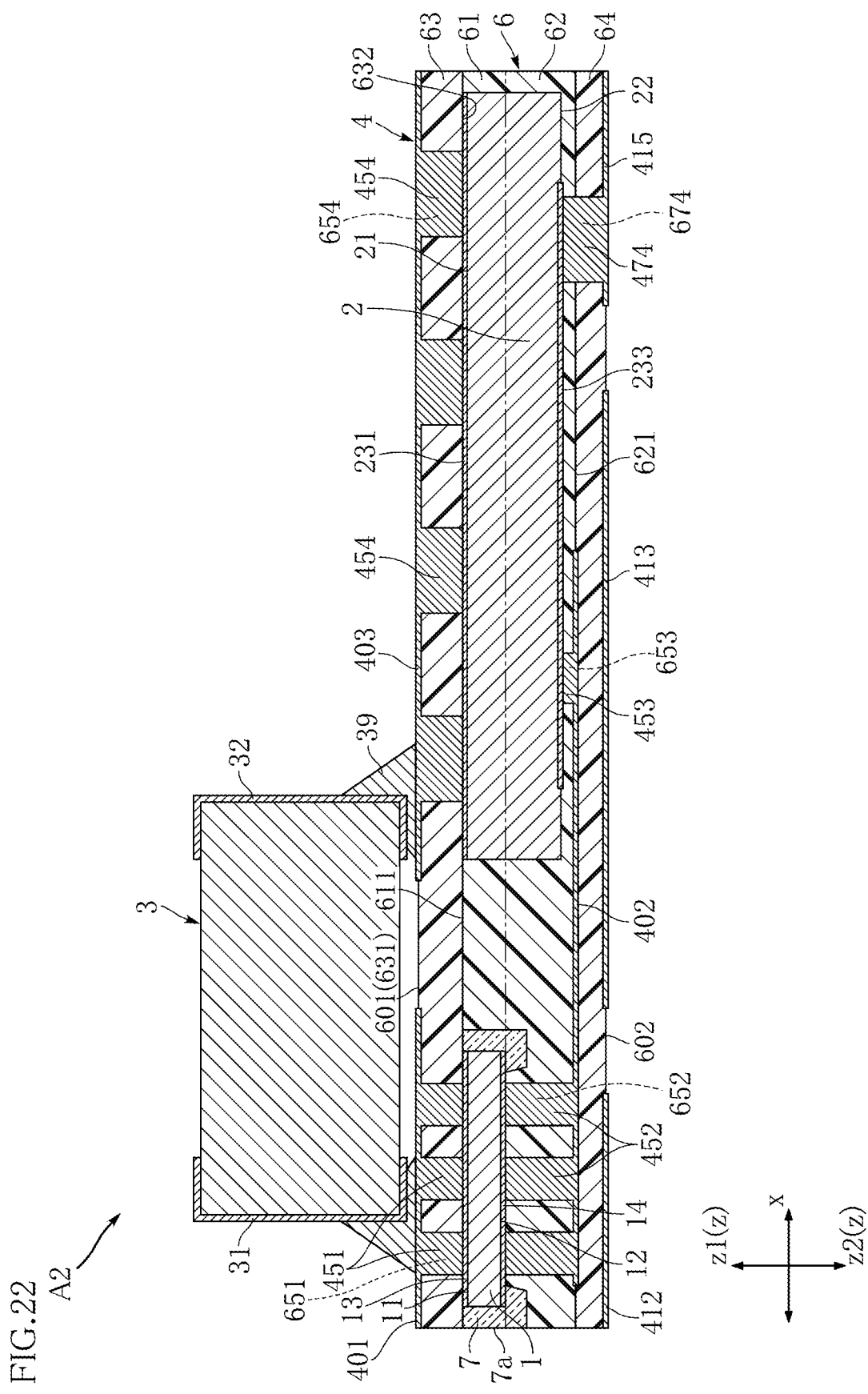
FIG. 22 is a sectional view of a semiconductor light-emitting device according to a second embodiment of the present disclosure.

FIG. 22 shows a semiconductor light-emitting device according to a second embodiment of the present disclosure. The semiconductor light-emitting device A2 of the present embodiment differs from the semiconductor light-emitting device A1 in that the sealing resin 6 includes an additional layer, and accordingly the conductor 4 includes additional portions. FIG. 22 is a sectional view of the semiconductor light-emitting device A2. In FIG. 22 and subsequent drawings, the elements that are identical or similar to those of the semiconductor light-emitting device A1 of the foregoing embodiment are denoted by the same reference signs, and the description thereof is omitted as appropriate.

In the present embodiment, the sealing resin 6 includes a third layer 63 in addition to the first layer 61, the second layer 62 and the fourth layer 64. The third layer 63 is disposed on the first side of the first layer 61 in the z direction. The third layer 63 has a third surface 631 and a fourth surface 632. The third surface 631 faces in the first sense of the z direction, and the fourth surface 632 faces in the second sense of the z direction. The third layer 63 covers the first element surface 11 of the semiconductor light-emitting element 1 and the first switching element surface 21 of the switching element 2. The third layer 63 is made of a material including a thermosetting synthetic resin and an additive containing a metal element, which forms a part of the conductor 4. In the present embodiment, the third layer 63 is located on the first side of the first layer 61, the second layer 62 and the fourth layer 64 in the z direction. Thus, the third surface 631 corresponds to the first resin surface 601.

The third layer 63 has a first cavity 651 and a fourth cavity 654. In the present embodiment, the third layer 63 is formed with a plurality of first cavities 651 and a plurality of fourth cavities 654. The first cavities 651 are disposed at a position overlapping with the semiconductor light-emitting element 1 as viewed in the z direction. The first cavities 651 extend from the third surface 631 to the first element electrode 13 of the semiconductor light-emitting element 1 in the z direction, penetrating the third layer 63 in the z direction in the present embodiment. The fourth cavities 654 are disposed at a position overlapping with the switching element 2 as viewed in the z direction. The fourth cavities 654 extend from the third surface 631 to the drain electrode 231 of the switching element 2 in the z direction, penetrating the third layer 63 in the z direction in the present embodiment.

In the present embodiment, the conductor 4 further includes first embedded portions 451 and fourth embedded portions 454, as compared with the semiconductor light-emitting device A1 according to the first embodiment. The first interconnecting portion 401 and the third interconnecting portion 403 are disposed along the third surface 631 of the third layer 63.

The first embedded portions 451 are received in the first cavities 651 and connected to the first element electrode 13 of the semiconductor light-emitting element 1 and the first interconnecting portion 401. The fourth embedded portions 454 are received in the fourth cavities 654 and connected to the drain electrode 231 of the switching element 2 and the third interconnecting portion 403.

In the present embodiment, each of the interconnecting portions and the embedded portions (including the first interconnecting portion 401 and the third interconnecting portion 403) includes a base layer and a plating layer. The lamination state of the base layer and the plating layer in each of the interconnecting portions and the embedded portions is the same as that described as to the semiconductor light-emitting device A1 of the first embodiment with reference to FIGS. 7 and 8.

Figure 23:
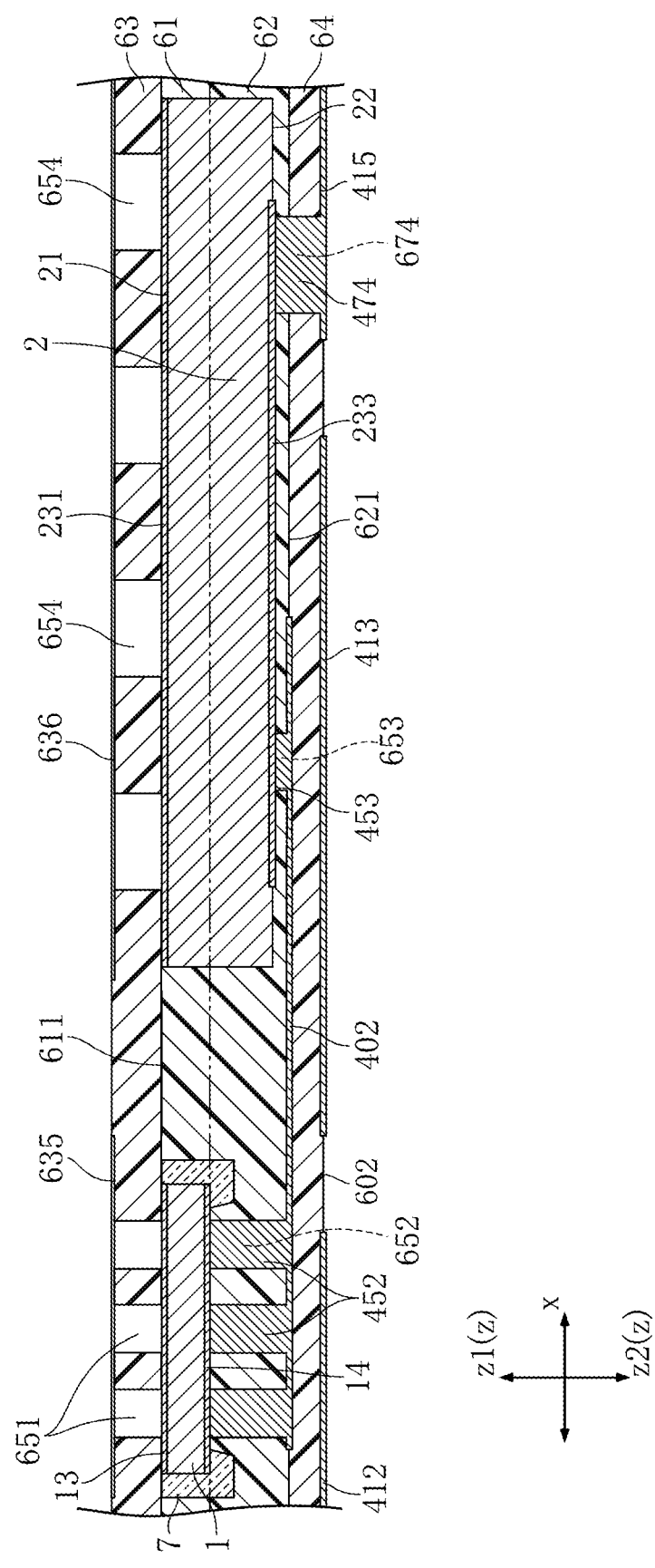
FIG. 23 is a sectional view showing a step in an example of a method for manufacturing the semiconductor light-emitting device of FIG. 22.
Figure 24:
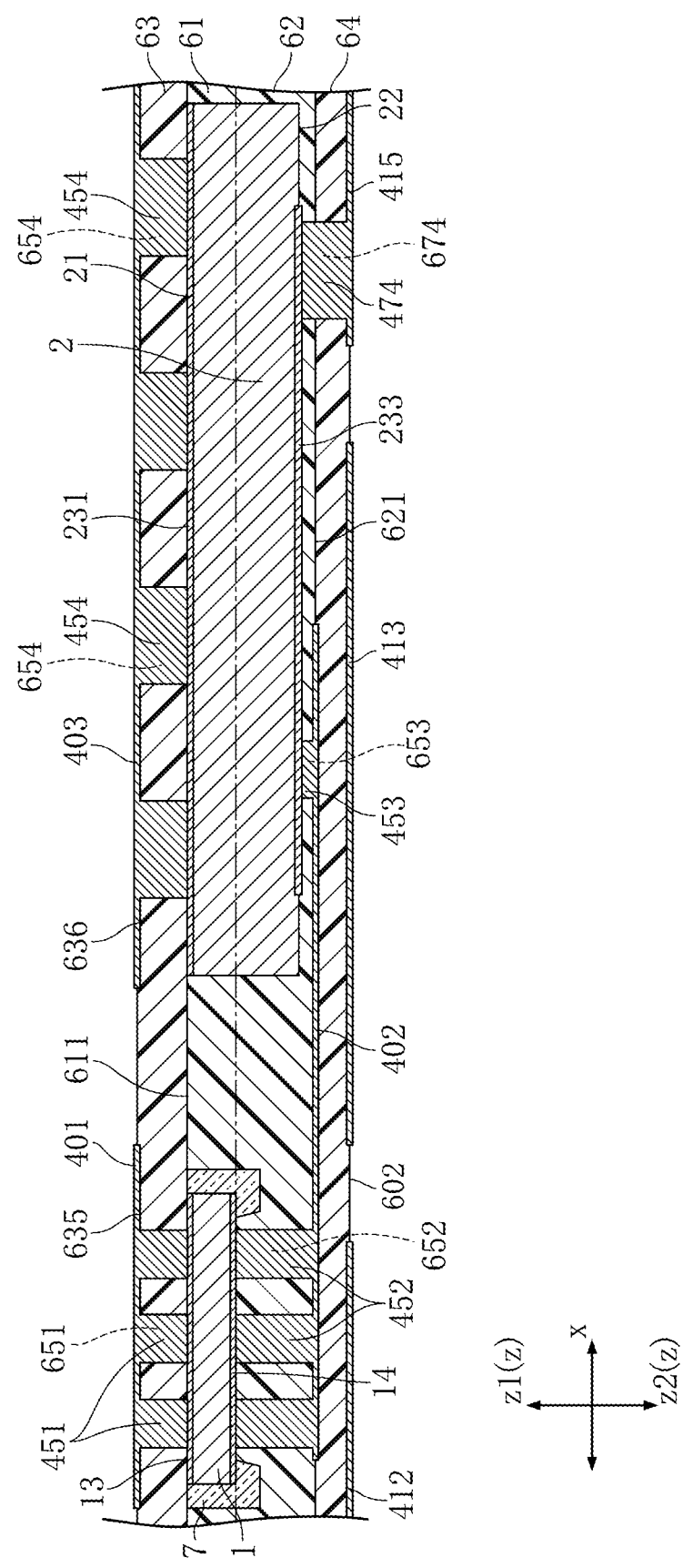
FIG. 24 is a sectional view showing a step subsequent to FIG. 23.

An example of a method for manufacturing the semiconductor light-emitting device A2 is described below with reference to FIGS. 23 and 24. FIGS. 23 and 24, which are sectional views corresponding to FIG. 22, each show a step in the example of a method for manufacturing the semiconductor light-emitting device A2.

The method for manufacturing the semiconductor light-emitting device A2 is partially the same as that for the semiconductor light-emitting device A1 of the foregoing embodiment. In the present embodiment, after the step shown in FIG. 17 as to the method for manufacturing the semiconductor light-emitting device A1, the step shown in FIG. 23 is performed. In the step shown in FIG. 23, after the laminate of the first layer 61, the second layer 62 and the fourth layer 64 is turned upside down such that the semiconductor light-emitting element 1 and the switching element 2 are located on the upper side, the third layer 63 is formed. The third layer 63 is laminated on the first layer 61 to cover the first element electrode 13 of the semiconductor light-emitting element 1 and the drain electrode 231 of the switching element 2. Next, first cavities 651, fourth cavities 654, a groove 635 and a groove 636 are formed in the third layer 63 with a laser, as shown in FIG. 23. The laser beam may be an ultraviolet laser beam with a wavelength of 355 nm and a beam diameter of 17 μm, for example.

Although detailed description is omitted, forming the first cavities 651, the fourth cavities 654, the groove 635 and the groove 636 results in deposition of the base layer 40a. The base layer covers the wall surfaces defining each of the first cavities 651 and fourth cavities 654, and the grooves 635 and 636. The base layer is composed of a metal element contained in the additive included in the third layer 63. The metal element contained in the additive is excited by laser irradiation. As a result, a metal layer containing the metal element is deposited as the base layer.

Next, as shown in FIG. 24, first embedded portions 451, fourth embedded portions 454, a first interconnecting portion 401 and a third interconnecting portion 403 are formed in the first cavities 651, the fourth cavities 654, the groove 635 and the groove 636, respectively. Although not illustrated, the fourth embedded portions 454, the first interconnecting portion 401 and the third interconnecting portion 403 are provided by forming plating layers covering the base layers described with reference to FIG. 23.

Next, capacitors 3 are mounted on the first interconnecting portion 401 and the third interconnecting portion 403, and finally, the third layer 63, the first layer 61, the second layer 62 and the fourth layer 64 are cut along predetermined cutting lines into a plurality of individual pieces with a dicing blade, for example. Through the above process, the semiconductor light-emitting device A2 is manufactured.

According to the semiconductor light-emitting device A2 of the present embodiment, the conduction path (the first interconnecting portion 401, the first embedded portions 451, the second interconnecting portion 402 and the embedded portions 452) to the first element electrode 13 and the second element electrode 14, which are disposed on opposite sides of the semiconductor light-emitting element 1, can be three-dimensionally arranged in a space-efficient manner. Accordingly, the path of the current that flows when the semiconductor light-emitting element 1 emits light can be shortened, and hence, the inductance component of the current path can be reduced. The semiconductor light-emitting device A2 also has other advantages similar to those of the semiconductor light-emitting device A1 of the foregoing embodiment.

FIGS. 25 to 29 show a semiconductor light-emitting device according to a third embodiment of the present disclosure. The semiconductor light-emitting device A3 of the present embodiment differs greatly from the semiconductor light-emitting device A1 in structure and arrangement of the capacitor 3. Also, the structure of the conductor 4 (the conduction path to the semiconductor light-emitting element 1 and the switching element 2) and the structure of the sealing resin 6 are different from the foregoing embodiment.

Figure 25:
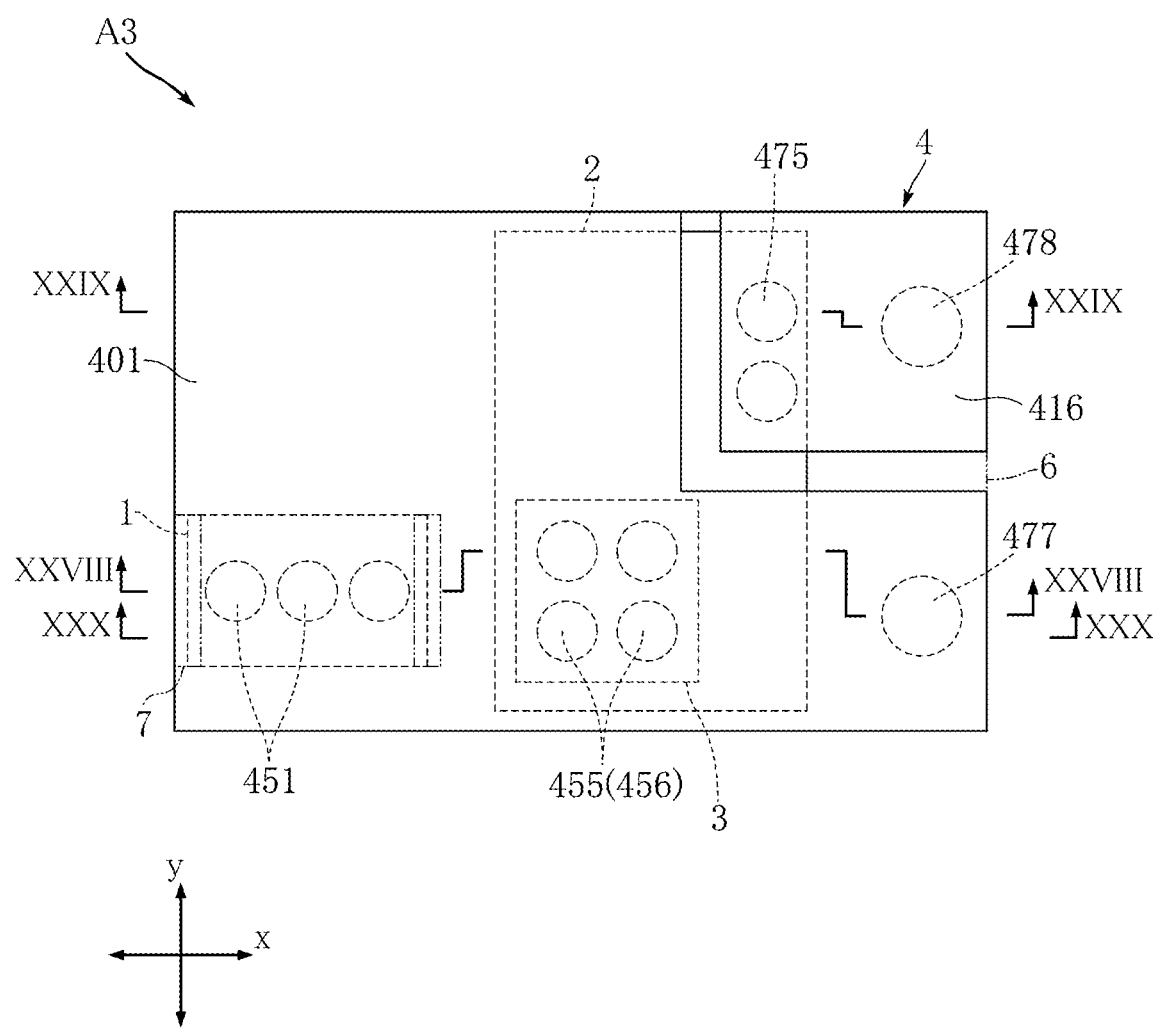
FIG. 25 is a schematic plan view of a semiconductor light-emitting device according to a third embodiment of the present disclosure.
Figure 26:
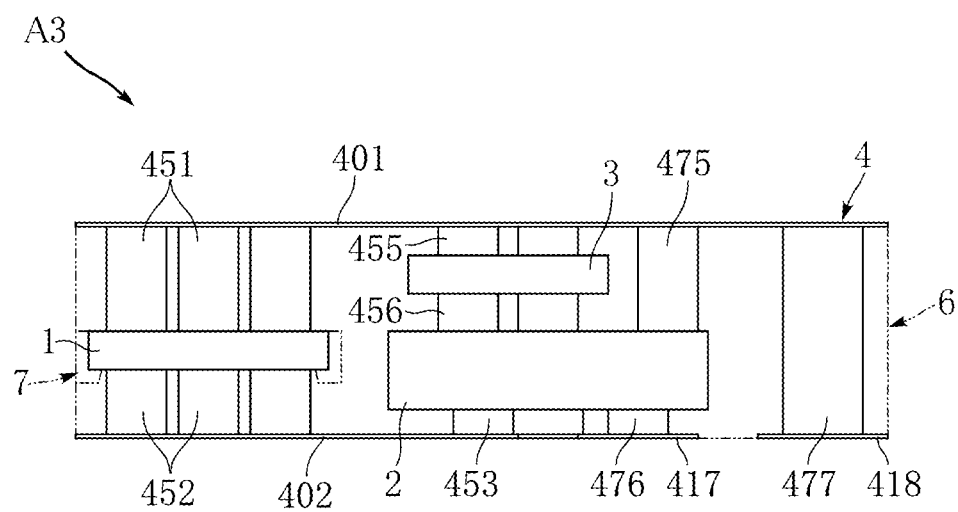
FIG. 26 is a front view of the semiconductor light-emitting device of FIG. 25.
Figure 26:
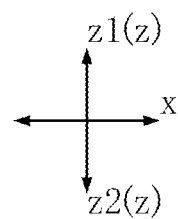
Figure 27:
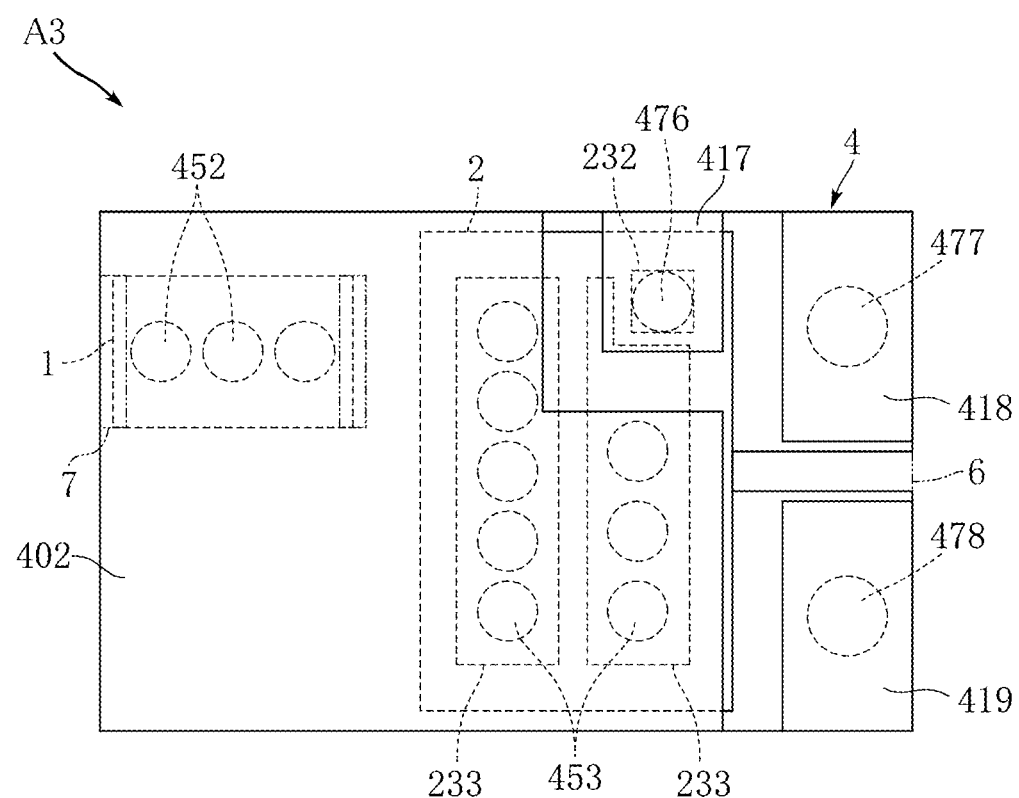
FIG. 27 is a bottom view of the semiconductor light-emitting device of FIG. 25.
Figure 28:
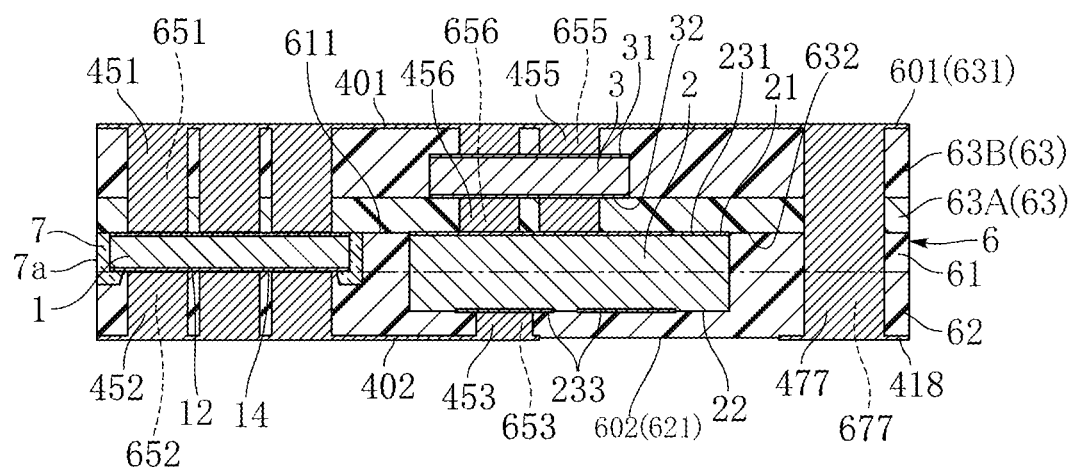
FIG. 28 is a sectional view taken along line XXVIII-XXVIII in FIG. 25.
Figure 28:
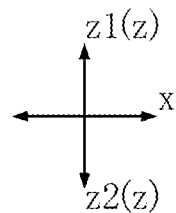
Figure 29:
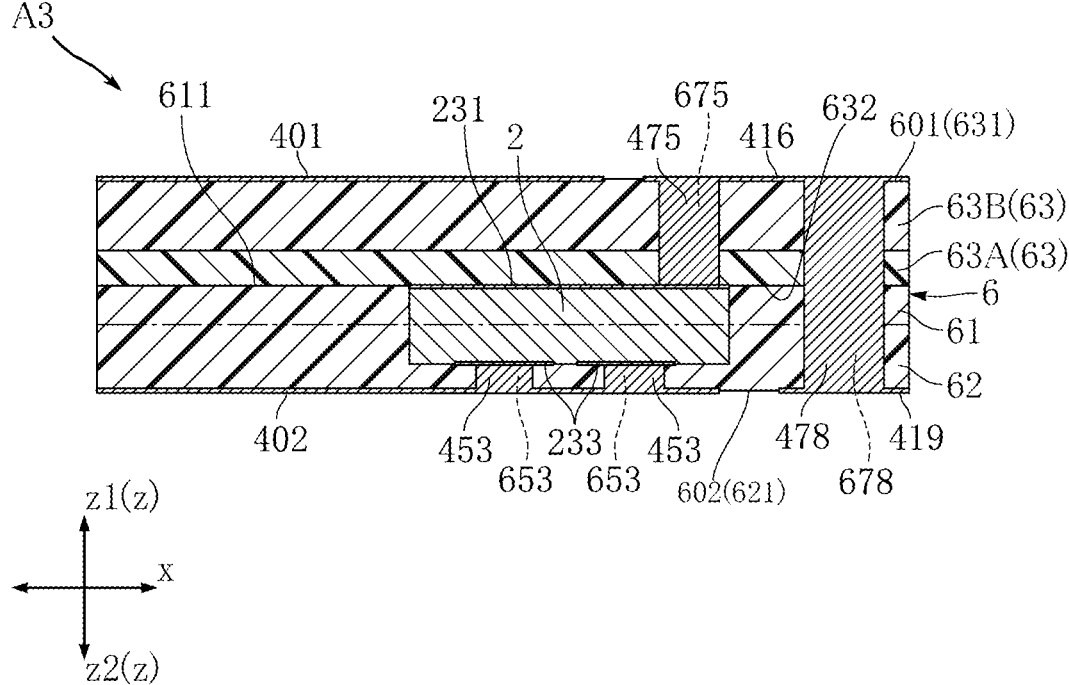
FIG. 29 is a sectional view taken along line XXIX-XXIX in FIG. 25.
Figure 29:
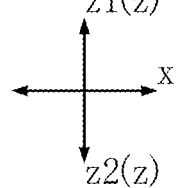
Figure 30:
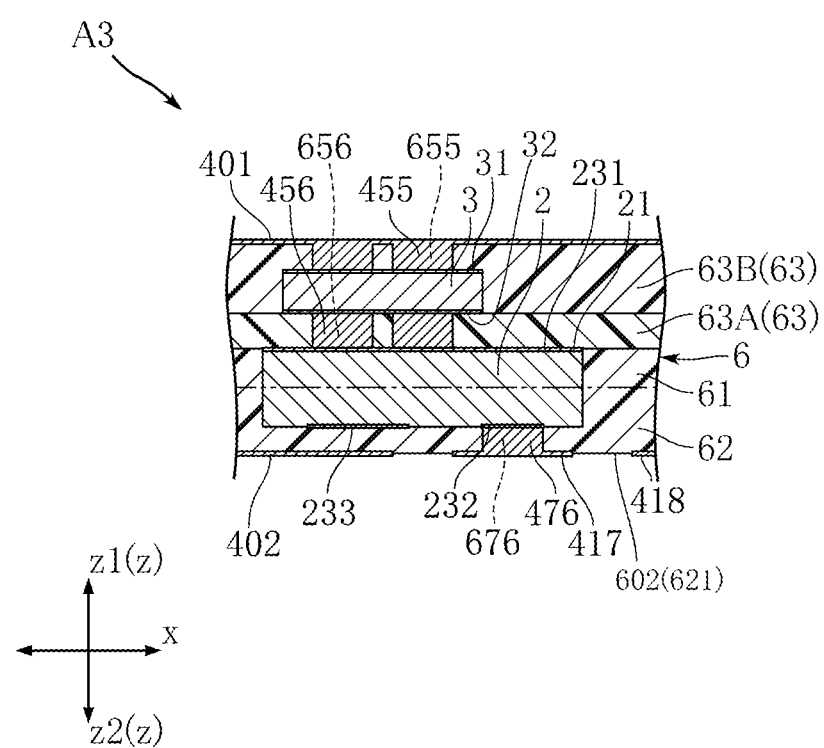
FIG. 30 is a partial sectional view taken along line XXX-XXX in FIG. 25.

FIG. 25 is a schematic plan view of the semiconductor light-emitting device A3. FIG. 26 is a front view of the semiconductor light-emitting device A3. FIG. 27 is a bottom view of the semiconductor light-emitting device A3. FIG. 28 is a sectional view taken along line XXVIII-XXVIII in FIG. 25. FIG. 29 is a sectional view taken along line XXIX-XXIX in FIG. 25. FIG. 30 is a partial sectional view taken along line XXX-XXX in FIG. 25. For convenience of description, in FIGS. 25 to 27, the sealing resin 6 and the light-transmittable resin 7 are illustrated as transparent, and the outlines of the sealing resin 6 and the light-transmittable resin 7 are shown by imaginary lines, as appropriate.

In the present embodiment, the arrangement of the semiconductor light-emitting element 1 and the switching element 2 are different from the foregoing embodiment. In the semiconductor light-emitting device A3, the semiconductor light-emitting element 1 is disposed at or near the first end (the left end in FIGS. 25 to 28) in the x direction and offset in the first sense of the y direction (downward in FIG. 25 and upward in FIG. 27). Also, the semiconductor light-emitting element 1 is offset in the second sense of the z direction.

In the semiconductor light-emitting device A3, the switching element 2 is offset in the second sense of the x direction (rightward in FIGS. 25 to 28) and extends almost entirely along the y direction. The switching element 2 is disposed apart from the semiconductor light-emitting element 1 as viewed in the z direction. The switching element 2 is offset in the second sense of the z direction.

The drain electrode 231 of the switching element 2 covers the first switching element surface 21 almost entirely. The gate electrode 232 is disposed on the second switching element surface 22, and in the illustrated example, in a region of the second switching element surface 22 that is offset in the second sense of the x direction and also offset in the first sense of the y direction. Source electrodes 233 are disposed on the second switching element surface 22. In the illustrated example, two source electrodes 233 are provided. One of the source electrodes 233 is disposed on the second switching element surface 22 at a position offset in the first sense of the x direction and in the form of a rectangle elongated in the y direction. The other source electrodes 233 is disposed on the second switching element surface 22 at a position offset in the second sense of the x direction and elongated in the y direction. In this source electrode 233, the corner on the second side in the x direction and on the second side in the y direction is cut away such that the gate electrode 232 is disposed.

The capacitor 3 is in the form of a rectangular plate as viewed in the z direction. The capacitor 3 has an electrode 31 and an electrode 32. In the present embodiment, the electrode 31 and the electrode 32 are disposed on opposite sides of the capacitor 3 in the z direction (the thickness direction). The electrode 31 is disposed on the surface of the capacitor 3 which faces in the first sense of the z direction, and the electrode 32 is disposed on the surface of the capacitor 3 which faces in the second sense of the z direction. In the present embodiment, the capacitor 3 is a thin silicon capacitor.

In the semiconductor light-emitting device A3, the capacitor 3 is disposed approximately in the center in the x direction and offset in the first sense of the y direction (downward in FIG. 25 and upward in FIG. 27). Also, the capacitor 3 is offset in the first sense of the z direction. The size of the capacitor 3 as viewed in the z direction is smaller than that of the switching element 2. The switching element 2 and the capacitor 3 overlap with each other as viewed in the z direction. In the present embodiment, the switching element 2 overlaps with the entire capacitor 3 as viewed in the z direction.

The sealing resin 6 covers at least a part of each of the semiconductor light-emitting element 1, the switching element 2 and the capacitor 3. The sealing resin 6 is made of a material including a thermosetting synthetic resin and an additive containing a metal element, which forms a part of the conductor 4. Examples of the synthetic resin include epoxy resin and polyimide resin.

In the present embodiment, the sealing resin 6 includes a first layer 61, a second layer 62, and a third layer 63. The second layer 62 is disposed on the second side of the first layer 61 in the z direction. The switching element 2 is disposed across the first layer 61 and the second layer 62. The third layer 63 is disposed on the first side of the first layer 61 in the z direction. The third layer 63 has a third surface 631 and a fourth surface 632. The third surface 631 faces in the first sense of the z direction, and the fourth surface 632 faces in the second sense of the z direction. The third layer 63 covers the capacitor 3. The capacitor 3 is disposed between the third surface 631 and the fourth surface 632 in the z direction. In the present embodiment, the third layer 63 is located on the first side of the first layer 61 and the second layer 62 in the z direction. Thus, the third surface 631 of the third layer 63 corresponds to the first resin surface 601. The second layer 62 is located on the second side of the first layer 61 and the third layer 63 in the z direction. Thus, the second surface 621 of the second layer 62 corresponds to the second resin surface 602.

In the present embodiment, the third layer 63 includes a lower layer 63A and an upper layer 63B. The lower layer 63A is laminated on the first surface 611 of the first layer 61. The upper layer 63B is laminated on the lower layer 63A. The upper layer 63B has the third surface 631, and the lower layer 63A has the fourth surface 632. The lower layer 63A and the upper layer 63B are formed in different steps.

In the present embodiment, the sealing resin 6 has a plurality of first cavities 651, a plurality of second cavities 652, a plurality of third cavities 653, a plurality of fifth cavities 655, a plurality of sixth cavities 656, a plurality of cavities 675, a cavity 676, a cavity 677, and a cavity 678.

The first cavities 651 are disposed at a position overlapping with semiconductor light-emitting element 1 as viewed in the z direction. The first cavities 651 extend from the third surface 631 to the first element electrode 13 of the semiconductor light-emitting element 1 in the z direction, penetrating the third layer 63 (the lower layer 63A and the upper layer 63B) in the z direction in the present embodiment.

The second cavities 652 are disposed at a position overlapping with semiconductor light-emitting element 1 as viewed in the z direction. The second cavities 652 extend from the second surface 621 of the second layer 62 to the second element electrode 14 of the semiconductor light-emitting element 1 in the z direction, penetrating the second layer 62 in the z direction in the present embodiment.

The third cavities 653 are disposed at a position overlapping with the source electrode 233 of the switching element 2 as viewed in the z direction. The third cavities 653 extend from the second surface 621 of the second layer 62 to the source electrode 233 in the z direction, penetrating the second layer 62 in the z direction in the present embodiment.

The fifth cavities 655 are disposed at a position overlapping with the capacitor 3 as viewed in the z direction. The fifth cavities 655 extend from the third surface 631 of the third layer 63 to the electrode 31 of the capacitor 3 in the z direction, penetrating the third layer 63 (the upper layer 63B) in the z direction in the present embodiment.

The sixth cavities 656 are disposed at a position overlapping with the capacitor 3 as viewed in the z direction. The sixth cavities 656 extend from the electrode 31 of the capacitor 3 to the drain electrode 231 of the switching element 2 in the z direction, penetrating the third layer 63 (the lower layer 63A) in the z direction in the present embodiment.

The cavities 675 are disposed at a position overlapping with the switching element 2 as viewed in the z direction. The cavities 675 extend from the third surface 631 to the drain electrode 231 in the z direction, penetrating the third layer 63 (the lower layer 63A and the upper layer 63B) in the z direction. The cavity 676 is disposed at a position overlapping with the gate electrode 232 of the switching element 2, as viewed in the z direction. The cavity 676 extends from the second surface 621 of the second layer 62 to the gate electrode 232 in the z direction, penetrating the second layer 62 in the z direction in the present embodiment. The cavity 677 and the cavity 678 each penetrate the first layer 61, the second layer 62, and the third layer 63 (the lower layer 63A and the upper layer 63B) in the z direction.

In the present embodiment, the conductor 4 includes a first interconnecting portion 401, a second interconnecting portion 402, an interconnecting portion 416, an interconnecting portion 417, an interconnecting portion 418, an interconnecting portion 419, first embedded portions 451, second embedded portions 452, third embedded portions 453, fifth embedded portions 455, sixth embedded portions 456, embedded portions 475, an embedded portion 476, an embedded portion 477 and an embedded portion 478.

The first interconnecting portion 401 is offset from the first element surface 11 of the semiconductor light-emitting element 1 in the first sense of the z direction. The first interconnecting portion 401 is disposed along the third surface 631 (the first resin surface 601) of the third layer 63. The first interconnecting portion 401 is provided in most region of the semiconductor light-emitting device A3, excluding the corner on the second side in the x direction (the right side in FIG. 25) and on the second side in the y direction (the upper side in FIG. 25), as viewed in the z direction. The first interconnecting portion 401 overlaps with the entire semiconductor light-emitting element 1 and a portion of the switching element 2 as viewed in the z direction.

The interconnecting portion 416 is disposed along the third surface 631 (the first resin surface 601) of the third layer 63. The interconnecting portion 416 is disposed in the corner on the second side in the x direction (the right side in FIG. 25) and on the second side in the y direction (the upper side in FIG. 25) of the semiconductor light-emitting device A3, as viewed in the z direction. The interconnecting portion 416 overlaps with a portion of the switching element 2 as viewed in the z direction.

The second interconnecting portion 402 is offset from the second element surface 12 of the semiconductor light-emitting element 1 in the second sense of the z direction. The second interconnecting portion 402 is disposed along the second surface 621 of the second layer 62 (the second resin surface 602). The second interconnecting portion 402 is disposed in a region of the semiconductor light-emitting device A3 which excludes a portion close to the edge on the second side in the x direction. The second interconnecting portion 402 overlaps with the entire semiconductor light-emitting element 1 and a portion of the switching element 2 as viewed in the z direction.

The interconnecting portion 417 is disposed along the second surface 621 of the second layer 62 (the second resin surface 602). The interconnecting portion 417 is disposed at a position offset in the second sense of the x direction (rightward in FIG. 27) and also offset in the first sense of the y direction (upward in FIG. 27), as viewed in the z direction. The interconnecting portion 417 overlaps with a portion of the switching element 2 (the gate electrode 232) as viewed in the z direction.

The interconnecting portion 418 is disposed along the second surface 621 of the second layer 62 (the second resin surface 602). The interconnecting portion 418 is disposed in the corner on the second side in the x direction and on the first side in the y direction, as viewed in the z direction.

The interconnecting portion 419 is disposed along the second surface 621 of the second layer 62 (the second resin surface 602). The interconnecting portion 419 is disposed in the corner on the second side in the x direction and on the second side in the y direction, as viewed in the z direction.

The second interconnecting portion 402, the interconnecting portion 417, the interconnecting portion 418 and the interconnecting portion 419, which are disposed along the second surface 621 of the second layer 62 (the second resin surface 602), are spaced apart from each other. The second interconnecting portion 402 and the interconnecting portions 417, 418 and 419 are used as external connection terminals in mounting the semiconductor light-emitting device A3 to a circuit board (not shown), for example.

The first embedded portions 451 are received in the first cavities 651 and connected to the first element electrode 13 of the semiconductor light-emitting element 1 and the first interconnecting portion 401. In the present embodiment, a plurality of first embedded portions 451 are provided. In the illustrated example, the first embedded portions 451 are arranged along the x direction.

The second embedded portions 452 are received in the second cavities 652 and connected to the second element electrode 14 of the semiconductor light-emitting element 1 and the second interconnecting portion 402. In the present embodiment, a plurality of second embedded portions 452 are provided. In the illustrated example, the second embedded portions 452 are arranged along the x direction.

The third embedded portions 453 are received in the third cavities 653 and connected to the source electrode 233 of the switching element 2 and the second interconnecting portion 402. In the present embodiment, a plurality of third embedded portions 453 are provided. In the illustrated example, the third embedded portions 453 are arranged in a matrix along the x direction and the y direction.

The fifth embedded portions 455 are received in the fifth cavities 655 and connected to the electrode 31 of the capacitor 3 and the first interconnecting portion 401. In the present embodiment, a plurality of fifth embedded portions 455 are provided. In the illustrated example, the fifth embedded portions 455 are arranged in a matrix along the x direction and the y direction.

The sixth embedded portions 456 are received in the sixth cavities 656 and connected to the drain electrode 231 of the switching element 2 and the electrode 32 of the capacitor 3. In the present embodiment, a plurality of sixth embedded portions 456 are provided. In the illustrated example, the sixth embedded portions 456 are arranged in a matrix along the x direction and the y direction.

The embedded portions 475 are received in the cavities 675 and connected to the drain electrode 231 and the interconnecting portion 416. In the present embodiment, a plurality of embedded portions 475 are provided. In the illustrated example, the embedded portions 475 are arranged along the y direction. The embedded portion 476 is received in the cavity 676 and connected to the gate electrode 232 and the interconnecting portion 417. The embedded portion 477 is received in the cavity 677 and connected to the first interconnecting portion 401 and the interconnecting portion 418. The embedded portion 478 is received in the cavity 678 and connected to the interconnecting portion 416 and the interconnecting portion 419.

Although not shown in detail, each of the interconnecting portions and the embedded portions has a base layer and a plating layer. The base layer is composed of a metal element contained in the additive included in the sealing resin 6 (the first layer 61, the second layer 62 and the third layer 63).

The process of manufacturing the semiconductor light-emitting device A3 is the same as that of the semiconductor light-emitting device A1 until the first layer 61 and the second layer 62 are formed by compression molding and the embedded portions and interconnecting portions are formed at predetermined positions in the second layer 62. Thereafter, the first layer 61 and the second layer 62, each in the form of a plate, are turned upside down, and the lower layer 63A is formed. The lower layer 63A is laminated on the first layer 61 and covers the first element electrode 13 of the semiconductor light-emitting element 1 and the drain electrode 231 of the switching element 2. The lower layer 63A is formed by compression molding. Next, the sixth cavities 656 are formed in the lower layer 63A with a laser, causing base layers to be deposited on the wall surfaces defining the sixth cavities 656. Next, plating layers covering the base layers are formed to provide the sixth embedded portions 456. Next, a capacitor 3 is disposed at a predetermined position on the lower layer 63A, and an upper layer 63B laminated on the lower layer 63A is formed. In disposing the capacitor 3, the electrode 32 of the capacitor 3 and the sixth embedded portions 456 may be bonded with a conductive bonding material such as silver paste, for example. The upper layer 63B is formed by compression molding. Next, a plurality of fifth cavities 655 are formed in the upper layer 63B with a laser. Also, first cavities 651 and cavities 675 are formed in the upper layer 63B and the lower layer 63A with a laser, a cavity 677 and a cavity 678 are formed in the upper layer 63B, the lower layer 63A, the first layer 61 and the second layer 62 with a laser, and a plurality of grooves are formed in the third surface 631 of the third layer 63 (the first resin surface 601) with a laser. By this process, base layers are deposited in these cavities and grooves. Next, plating layers covering these base layers are formed to provide the first embedded portions 451, the fifth embedded portions 455, the embedded portions 475, the embedded portion 477, the embedded portion 478, the first interconnecting portion 401 and the interconnecting portion 416. Thereafter, the third layer 63, the first layer 61, and the second layer 62 are cut along predetermined cutting lines into a plurality of individual pieces. Through the above process, the semiconductor light-emitting device A3 is manufactured.

Although not shown in the figures, the semiconductor light-emitting device A3 can be connected to e.g. an external DC power supply. In that case, when the switching element 2 is OFF, current flows from the DC power supply to the capacitor 3 so that the capacitor 3 is charged. When the switching element 2 is ON, the current due to the electrical charge stored in the capacitor 3 flows through the path of the sixth embedded portions 456, the switching element 2, the third embedded portions 453, the second interconnecting portion 402, the second embedded portions 452, the semiconductor light-emitting element 1, the first embedded portions 451, the first interconnecting portion 401, and the fifth embedded portions 455, making the semiconductor light-emitting element 1 emit light.

In the semiconductor light-emitting device A3 of the present embodiment, the conductor 4 forming the conduction path to the semiconductor light-emitting element 1 includes the first interconnecting portion 401, the first embedded portions 451, the second interconnecting portion 402 and the second embedded portions 452. The first interconnecting portion 401 is electrically connected to the first element electrode 13 of the semiconductor light-emitting element 1 via the first embedded portions 451. The second interconnecting portion 402 is electrically connected to the second element electrode 14 of the semiconductor light-emitting element 1 via the second embedded portions 452. At least a portion (the second element surface 12) of the semiconductor light-emitting element 1 is covered with the sealing resin 6, and the conductor 4 (the first interconnecting portion 401, the second interconnecting portion 402, and the second embedded portions 452) is in contact with the sealing resin 6. With such a configuration, the conduction path (the first interconnecting portion 401, the first embedded portions 451, the second interconnecting portion 402 and the second embedded portions 452) to the first element electrode 13 and the second element electrode 14, which are disposed on opposite sides of the semiconductor light-emitting element 1, can be three-dimensionally arranged in a space-efficient manner. Accordingly, the path of the current that flows when the semiconductor light-emitting element 1 emits light can be shortened, and hence, the inductance component of the current path can be reduced.

At least a portion of each of the switching element 2 and the capacitor 3 is covered with the sealing resin 6. The conductor 4 includes the fifth embedded portions 455 and the sixth embedded portions 456 that are arranged along the z direction. The fifth embedded portions 455 are connected to the first interconnecting portion 401 and the electrode 31 of the capacitor 3, and the sixth embedded portions 456 are connected to the electrode 32 of the capacitor 3 and the drain electrode 231 of the switching element 2. With such a configuration, the length of the path from the first element electrode 13 of the semiconductor light-emitting element 1 to the drain electrode 231 through the first embedded portions 451, the first interconnecting portion 401, the fifth embedded portions 455, the capacitor 3 and the sixth embedded portions 456 can be made relatively short. This is suitable for reducing the inductance component of the path of the current flowing through the semiconductor light-emitting device A3.

The sealing resin 6 includes the third layer 63 laminated on the first side of the first layer 61 in the z direction, and the capacitor 3 is disposed between the third surface 631 and the fourth surface 632 of the third layer 63 in the z direction. As the capacitor 3, a thin silicon capacitor is used. With such a configuration, the capacitor 3 is embedded in the sealing resin 6 along with the semiconductor light-emitting element 1 and the switching element 2 to be arranged three dimensionally in a space-efficient manner. In the present embodiment, the semiconductor light-emitting element 1 and the switching element 2 are disposed apart from each other as viewed in the z direction. The switching element 2 overlaps with the entire capacitor 3 as viewed in the z direction. Such a configuration makes it possible to reduce the dimension of the semiconductor light-emitting device A3 in the z direction (the thickness direction) while also reducing the size of the semiconductor light-emitting device A3 as viewed in the z direction. This is suitable for shortening the path of the current that flows when the semiconductor light-emitting element 1 emits light, and hence is suitable for reducing the inductance component of the current path.

Moreover, the conductor 4, which forms the conduction path to the semiconductor light-emitting element 1 and the switching element 2, is constituted by a plurality of interconnecting portions and a plurality of embedded portions, and electrical connection using a wire is not necessary. This reduces the inductance component of the path of the current flowing through the semiconductor light-emitting device A3 and improves the yield (the percentage of non-defective products) of the semiconductor light emitting device A3.

FIGS. 31 to 36 show a semiconductor light-emitting device according to a fourth embodiment of the present disclosure. The semiconductor light-emitting device A4 of the present embodiment differs from the semiconductor light-emitting device A3 mainly in structure of a portion of the conductor 4 and structure of the sealing resin 6.

Figure 31:
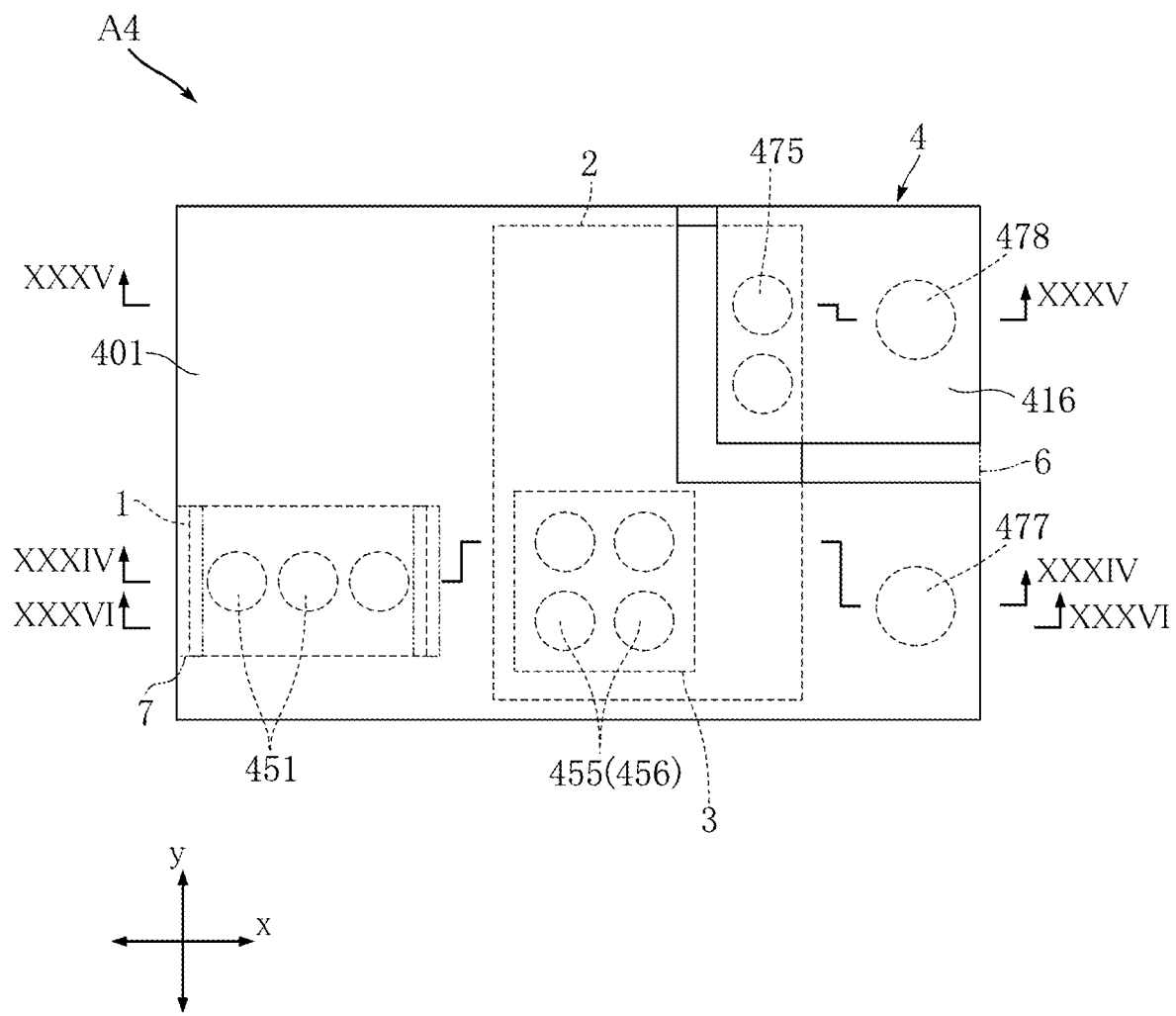
FIG. 31 is a schematic plan view of a semiconductor light-emitting device according to a fourth embodiment of the present disclosure.
Figure 32:
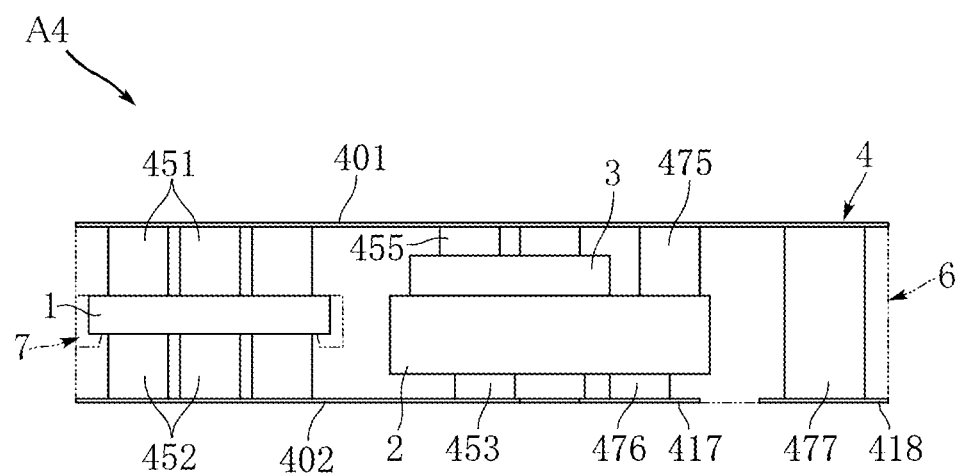
FIG. 32 is a front view of the semiconductor light-emitting device of FIG. 31.
Figure 32:
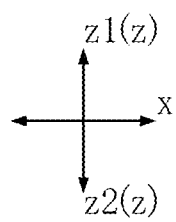
Figure 33:
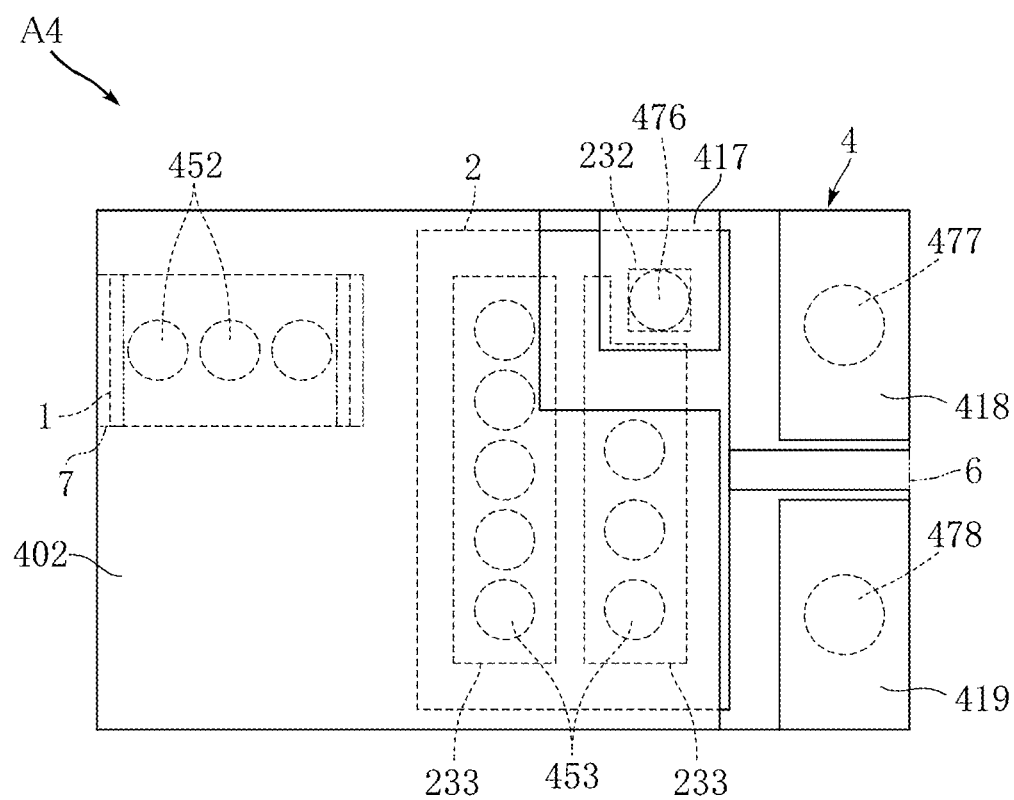
FIG. 33 is a bottom view of the semiconductor light-emitting device of FIG. 31.
Figure 33:
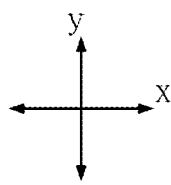
Figure 34:
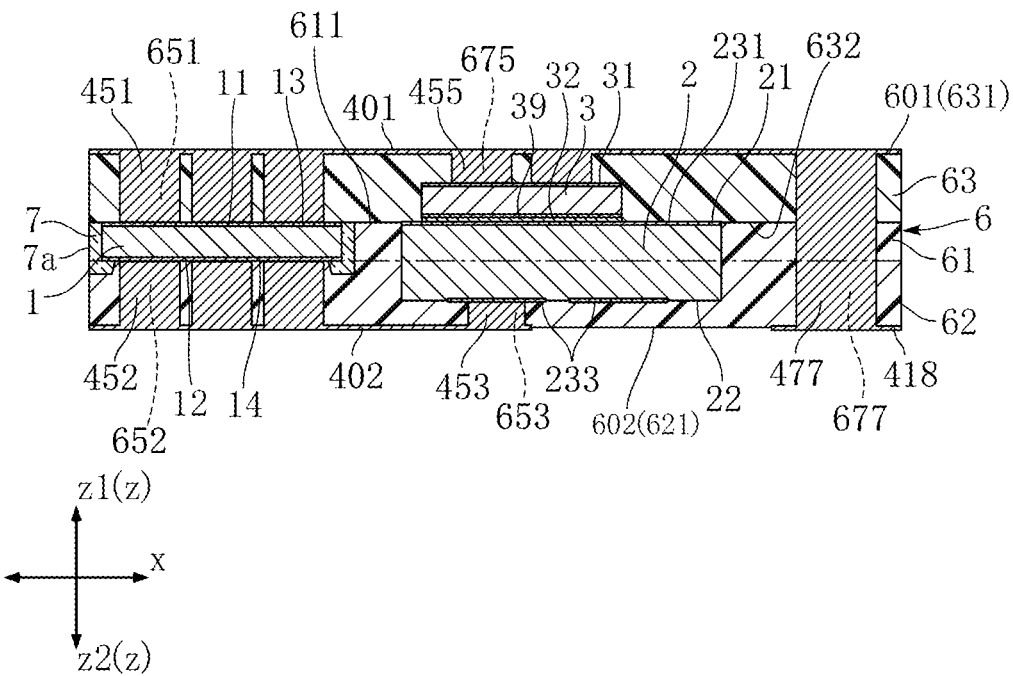
FIG. 34 is a sectional view taken along line XXXIV-XXXIV in FIG. 31.
Figure 35:
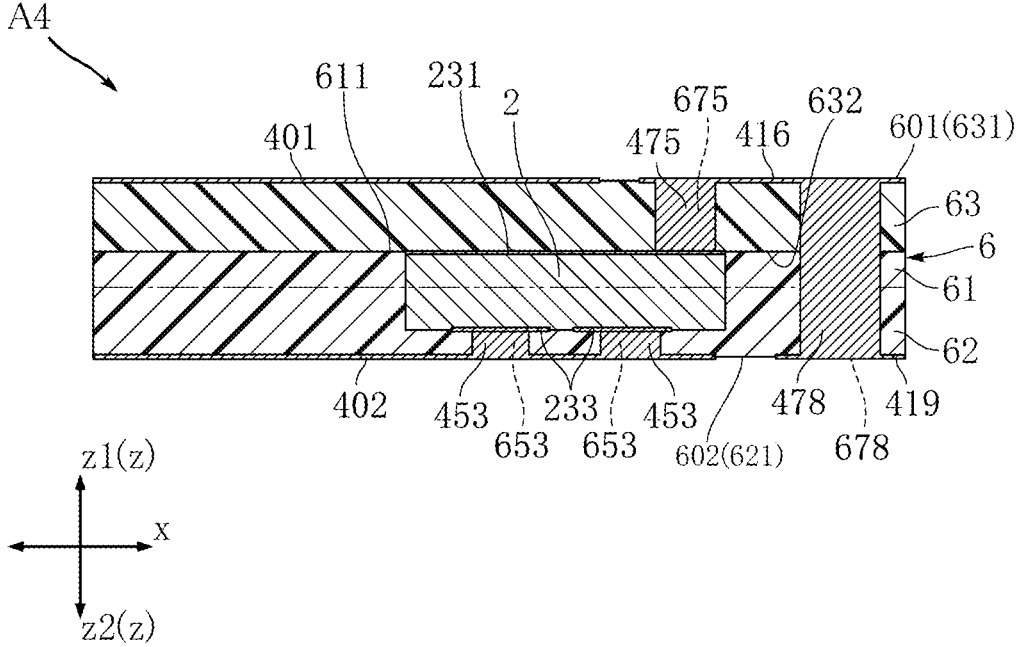
FIG. 35 is a sectional view taken along line XXXV-XXXV in FIG. 31.
Figure 36:
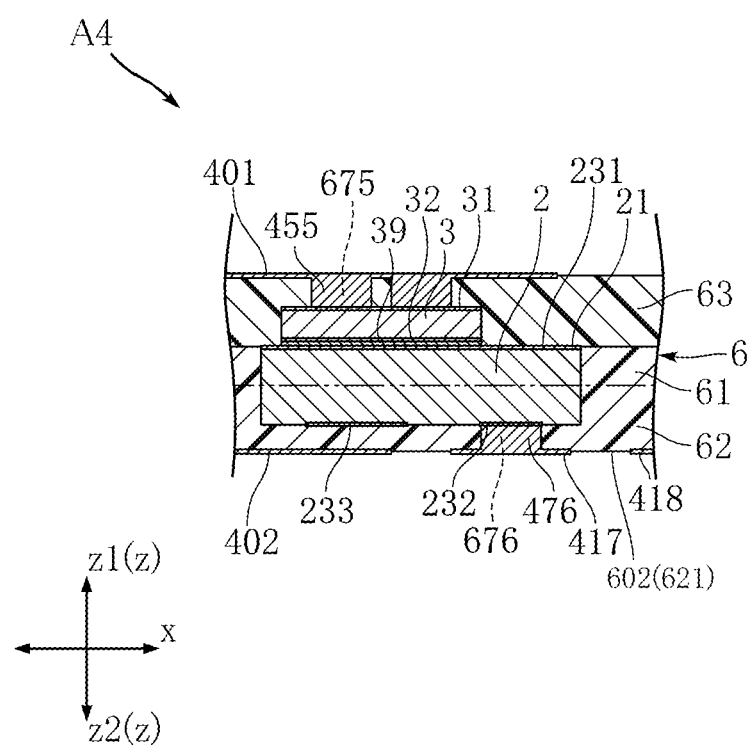
FIG. 36 is a sectional view taken along line XXXVI-XXXVI in FIG. 31.

FIG. 31 is a schematic plan view of the semiconductor light-emitting device A4. FIG. 32 is a front view of the semiconductor light-emitting device A4. FIG. 33 is a bottom view of the semiconductor light-emitting device A4. FIG. 34 is a sectional view taken along line XXXIV-XXXIV in FIG. 31. FIG. 35 is a sectional view taken along line XXXV-XXXV in FIG. 31. FIG. 36 is a sectional view taken along line XXXVI-XXXVI in FIG. 31. For convenience of description, in FIGS. 31 to 33, the sealing resin 6 and the light-transmittable resin 7 are illustrated as transparent, and the outlines of the sealing resin 6 and the light-transmittable resin 7 are shown by imaginary lines, as appropriate.

In the semiconductor light-emitting device A4 of the present embodiment, the sealing resin 6 includes a first layer 61, a second layer 62, and a third layer 63, as with the semiconductor light-emitting device A3. Although the third layer 63 includes the lower layer 63A and the upper layer 63B in the semiconductor light-emitting device A3, the third layer 63 of the present embodiment is a single layer. In the present embodiment, the dimension of the third layer 63 in the z direction (thickness direction) is smaller than that of the third layer 63 of the semiconductor light-emitting device A3.

The conductor 4 does not include the sixth embedded portions 456, which is a difference from the semiconductor light-emitting device A3. The capacitor 3 is disposed to stack on the switching element 2. As shown in FIG. 34, in the illustrated example, the electrode 32 of the capacitor 3 is bonded and electrically connected to the drain electrode 231 with a conductive bonding material 39. The conductive bonding material 39 may be silver paste, for example.

Unlike the process of manufacturing the semiconductor light-emitting device A3, the process of manufacturing the semiconductor light-emitting device A4 does not include the steps of forming the lower layer 63A and forming the sixth embedded portions 456. The process of manufacturing the semiconductor light-emitting device A4 is the same as that of the semiconductor light-emitting device A1 until the first layer 61 and the second layer 62 are formed by compression molding and the embedded portions and interconnecting portions are formed at predetermined positions in the second layer 62. Thereafter, the first layer 61 and the second layer 62, each in the form of a plate, are turned upside down, and the electrode 32 of the capacitor 3 is bonded to the drain electrode 231, which is exposed from the first layer 61, with a conductive bonding material 39. Next, the third layer 63 is formed on the first layer 61. The third layer 63 is a single layer and covers the first element electrode 13 of the semiconductor light-emitting element 1 and the drain electrode 231 of the switching element 2. The third layer 63 is formed by compression molding. The subsequent steps are the same as those for the semiconductor light-emitting device A3.

In the semiconductor light-emitting device A4 of the present embodiment, when the switching element 2 is ON, the current due to the electrical charge stored in the capacitor 3 flows through the path of the switching element 2, the third embedded portions 453, the second interconnecting portion 402, the second embedded portions 452, the semiconductor light-emitting element 1, the first embedded portions 451, the first interconnecting portion 401, and the fifth embedded portions 455, making the semiconductor light-emitting element 1 emit light.

According to the semiconductor light-emitting device A4 of the present embodiment, the conduction path (the first interconnecting portion 401, the first embedded portions 451, the second interconnecting portion 402 and the second embedded portions 452) to the first element electrode 13 and the second element electrode 14, which are disposed on opposite sides of the semiconductor light-emitting element 1, can be three-dimensionally arranged in a space-efficient manner. Accordingly, the path of the current that flows when the semiconductor light-emitting element 1 emits light can be shortened, and hence, the inductance component of the current path can be reduced. The semiconductor light-emitting device A2 also has other advantages similar to those of the semiconductor light-emitting device A3 of the foregoing embodiment.

Unlike the semiconductor light-emitting device A3, the semiconductor light-emitting device A4 of the present embodiment does not include the sixth embedded portions 456, and the capacitor 3 is bonded and electrically connected to the drain electrode 231. Such a configuration further reduces the dimension of the semiconductor light-emitting device A4 in the z direction (thickness direction). Accordingly, the path of the current that flows when the semiconductor light-emitting element 1 emits light can be shortened, and hence, the inductance component of the current path can be reduced.

FIGS. 37 to 42 show a semiconductor light-emitting device according to a fifth embodiment of the present disclosure. The semiconductor light-emitting device A5 of the present embodiment differs greatly from the foregoing embodiments in configuration and arrangement of the switching element 2. Accordingly, the structure of the conductor 4 (the conduction path to the semiconductor light-emitting element 1 and the switching element 2) and the structure of the sealing resin 6 also differ from the foregoing embodiments.

Figure 37:
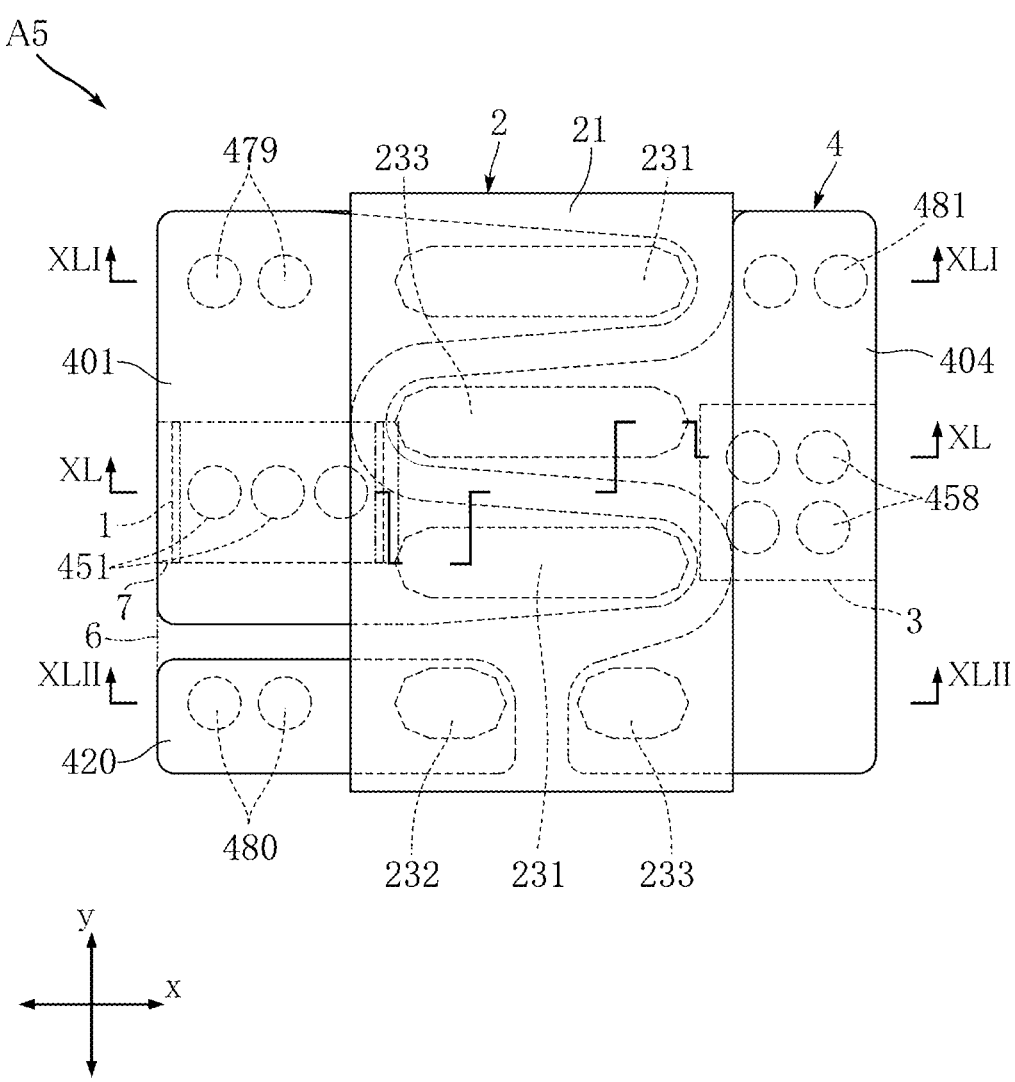
FIG. 37 is a schematic plan view of a semiconductor light-emitting device according to a fifth embodiment of the present disclosure.
Figure 38:
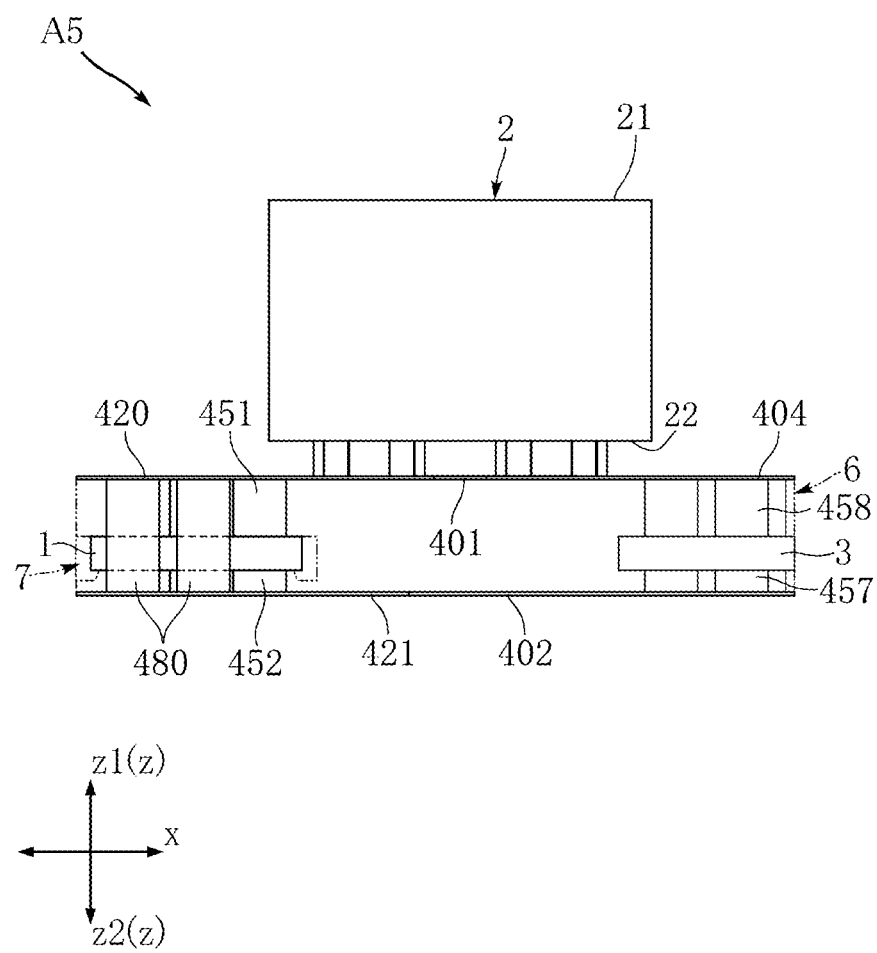
FIG. 38 is a front view of the semiconductor light-emitting device of FIG. 37.
Figure 39:
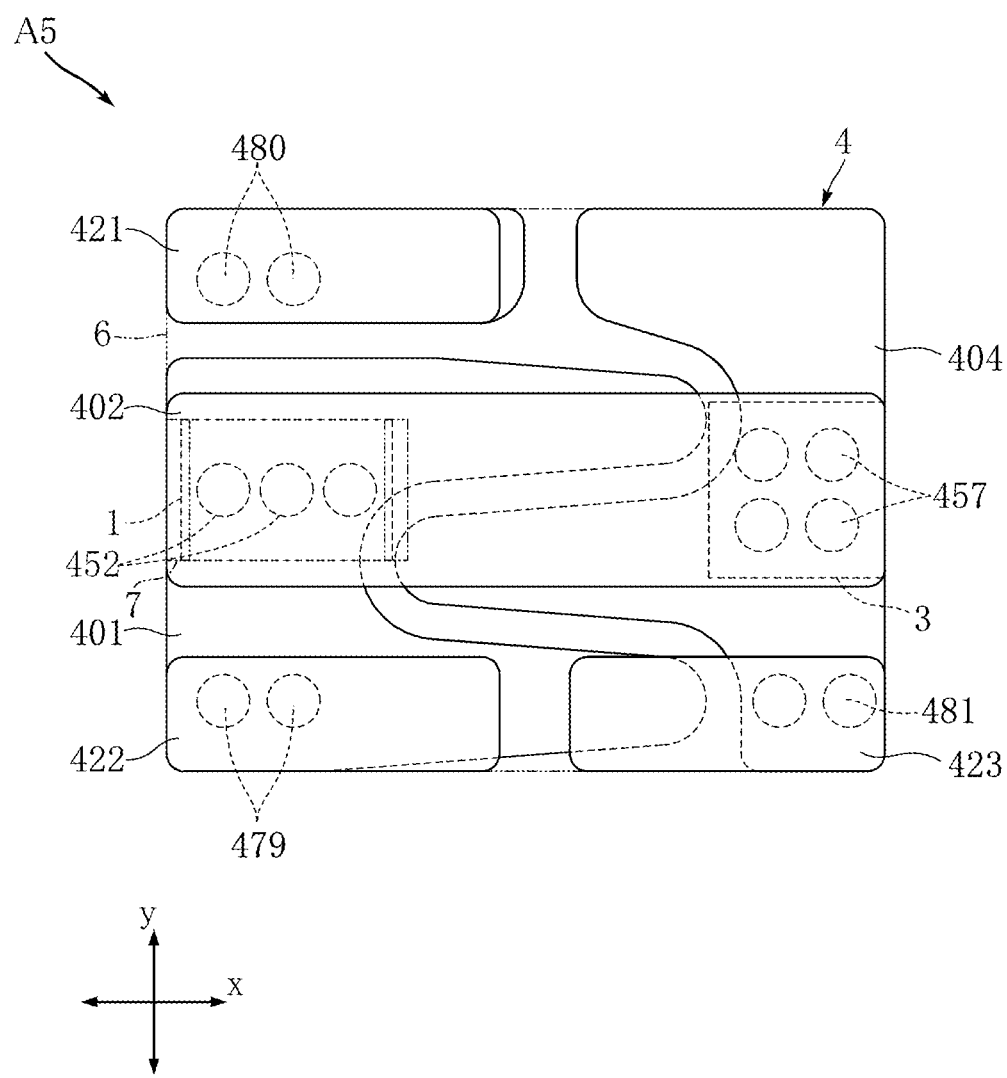
FIG. 39 is a bottom view of the semiconductor light-emitting device of FIG. 37, in which a switching element is omitted.
Figure 40:
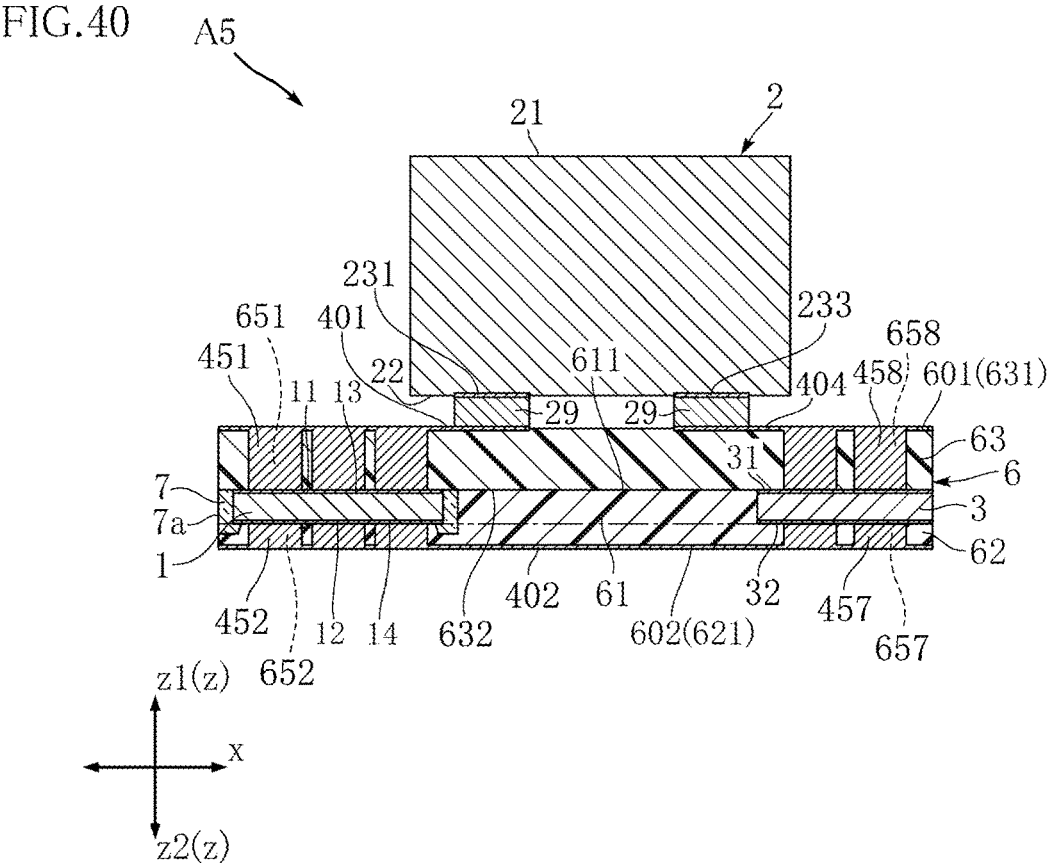
FIG. 40 is a sectional view taken along line XL-XL in FIG. 37.
Figure 41:
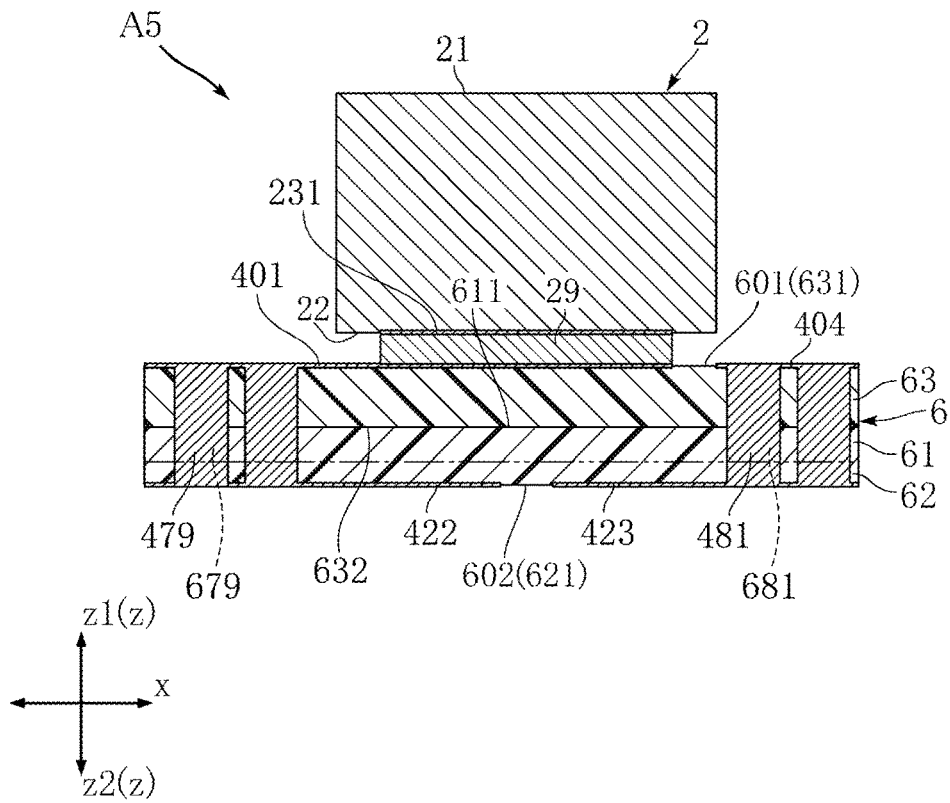
FIG. 41 is a sectional view taken along line XLI-XLI in FIG. 37.
Figure 42:
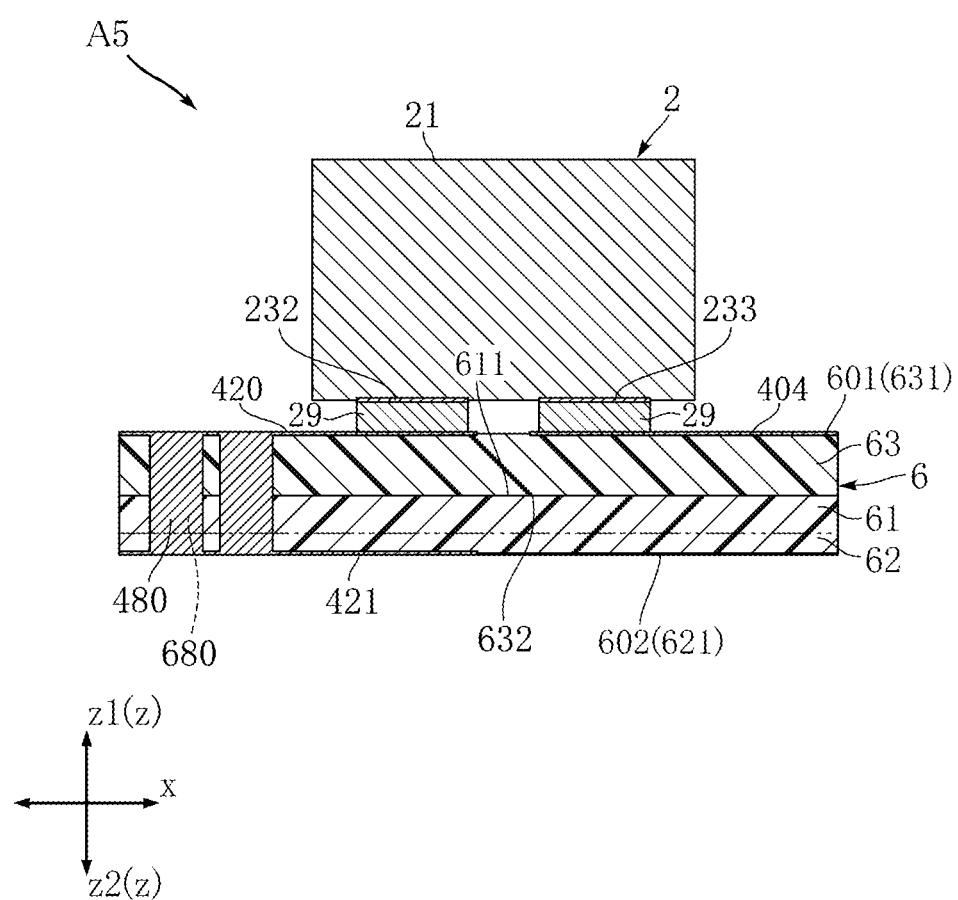
FIG. 42 is a sectional view taken along line XLII-XLII in FIG. 37.

FIG. 37 is a schematic plan view of the semiconductor light-emitting device A5. FIG. 38 is a front view of the semiconductor light-emitting device A5. FIG. 39 is a bottom view of the semiconductor light-emitting device A5, in which the switching element is omitted. FIG. 40 is a sectional view taken along line XL-XL in FIG. 37. FIG. 41 is a sectional view taken along line XLI-XLI in FIG. 37. FIG. 42 is a sectional view taken along line XLII-XLII in FIG. 37. For convenience of description, in FIGS. 37 to 39, the sealing resin 6 and the light-transmittable resin 7 are illustrated as transparent, and the outlines of the sealing resin 6 and the light-transmittable resin 7 are shown by imaginary lines, as appropriate.

In the semiconductor light-emitting device A5 of the present embodiment, the semiconductor light-emitting element 1 is disposed at or near the first end (the left end in FIGS. 37 to 40) in the x direction and approximately in the center in the y direction. Also, the semiconductor light-emitting element 1 is offset in the second sense of the z direction (the thickness direction) in the sealing resin 6.

In the present embodiment, the capacitor 3 is in the form of a rectangular plate as viewed in the z direction. The capacitor 3 has an electrode 31 and an electrode 32. In the present embodiment, the electrode 31 and the electrode 32 are disposed on opposite sides of the capacitor 3 in the z direction (the thickness direction). The electrode 31 is disposed on the surface of the capacitor 3 which faces in the first sense of the z direction, and the electrode 32 is disposed on the surface of the capacitor 3 which faces in the second sense of the z direction. In the present embodiment, the capacitor 3 is a thin silicon capacitor.

In the semiconductor light-emitting device A5, the capacitor 3 is disposed at or near a second end (the right end in FIGS. 37 to 40) in the x direction and approximately in the center in the y direction. The capacitor 3 is at least partially covered with the sealing resin 6 and disposed between the first resin surface 601 and the second resin surface 602 of the sealing resin 6 in the z direction. In the present embodiment, the semiconductor light-emitting element 3 is offset in the second sense of the z direction (the thickness direction) in the sealing resin 6. The capacitor 3 is disposed apart from the semiconductor light-emitting element 1 as viewed in the z direction.

In the present embodiment, the switching element 2 may be a GaN-FET, for example. The switching element 2 is disposed on the first side of the first resin surface 601 of the sealing resin 6 in the z direction. That is, the switching element 2 is entirely exposed from the sealing resin 6.

In the semiconductor light-emitting device A5, the switching element 2 is disposed approximately in the center in the x direction and extends almost entirely along the y direction. The switching element 2 is disposed between the position of the semiconductor light-emitting element 1 and the position of the capacitor 3, as viewed in the z direction. In the present embodiment, the switching element 2 overlaps with a portion of the semiconductor light-emitting element 1 and a portion of the capacitor 3, as viewed in the z direction.

In the present embodiment, the drain electrodes 231, the gate electrode 232, and the source electrodes 233 of the switching element 2 are disposed on the second switching element surface 22. In the illustrated example, two drain electrodes 231, one gate electrode 232, and two source electrodes 233 are provided on the second switching element surface 22. The two drain electrodes 231 are elongated in the x direction and spaced apart from each other in the y direction. The gate electrode 232 is disposed in the corner of second switching element surface 22 on the first side in the x direction and on the first side in the y direction. The two source electrodes 233 are disposed alternately with the two drain electrodes 231 in the y direction. One of the source electrodes 233 is disposed between the two drain electrodes 231 in the y direction and elongated in the x direction. The other source electrode 233 is disposed in the corner of the second switching element surface 22 on the second side in the x direction and on the first side in the y direction.

The sealing resin 6 covers the semiconductor light-emitting element 1 and at least a portion of the capacitor 3. The sealing resin 6 is made of a material including a thermosetting synthetic resin and an additive containing a metal element, which forms a part of the conductor 4. Examples of the synthetic resin include epoxy resin and polyimide resin.

In the present embodiment, the sealing resin 6 includes a first layer 61, a second layer 62, and a third layer 63. The second layer 62 is disposed on the second side of the first layer 61 in the z direction. The third layer 63 is disposed on the first side of the first layer 61 in the z direction. The third layer 63 has a third surface 631 and a fourth surface 632. The third surface 631 faces in the first sense of the z direction, and the fourth surface 632 faces in the second sense of the z direction. In the present embodiment, the third layer 63 is located on the first side of the first layer 61 and the second layer 62 in the z direction. Thus, the third surface 631 of the third layer 63 corresponds to the first resin surface 601. The second layer 62 is located on the second side of the first layer 61 and the third layer 63 in the z direction. Thus, the second surface 621 of the second layer 62 corresponds to the second resin surface 602.

In the present embodiment, the sealing resin 6 has a plurality of first cavities 651, a plurality of second cavities 652, a plurality of seventh cavities 657, a plurality of eighth cavities 658, a plurality of cavities 679, a plurality of cavities 680, and a plurality of cavities 681.

The first cavities 651 are disposed at a position overlapping with the semiconductor light-emitting element 1 as viewed in the z direction. The first cavities 651 extend from the third surface 631 to the first element electrode 13 of the semiconductor light-emitting element 1 in the z direction, penetrating the third layer 63 in the z direction in the present embodiment.

The second cavities 652 are disposed at a position overlapping with the semiconductor light-emitting element 1 as viewed in the z direction. The second cavities 652 extend from the second surface 621 of the second layer 62 to the second element electrode 14 of the semiconductor light-emitting element 1 in the z direction, penetrating the second layer 62 in the z direction in the present embodiment.

The seventh cavities 657 are disposed at a position overlapping with the capacitor 3 as viewed in the z direction. The seventh cavities 657 extend from the second surface 621 of the second layer 62 to the electrode 32 of the capacitor 3 in the z direction, penetrating the second layer 62 in the z direction in the present embodiment.

The eighth cavities 658 are disposed at a position overlapping with the capacitor 3 as viewed in the z direction. The eighth cavities 658 extend from the third surface 631 of the third layer 63 to the electrode 31 of the capacitor 3 in the z direction, penetrating the third layer 63 in the z direction in the present embodiment.

The cavities 679, the cavities 680, and the cavities 681 penetrate the first layer 61, the second layer 62 and the third layer 63 in the z direction.

In the present embodiment, the conductor 4 includes a first interconnecting portion 401, a second interconnecting portion 402, a fourth interconnecting portion 404, an interconnecting portion 420, an interconnecting portion 421, an interconnecting portion 422, an interconnecting portion 423, first embedded portions 451, second embedded portions 452, seventh embedded portions 457, eighth embedded portions 458, embedded portions 479, embedded portions 480, and embedded portions 481.

The first interconnecting portion 401 is offset from the first element surface 11 of the semiconductor light-emitting element 1 in the first sense of the z direction. The first interconnecting portion 401 is disposed along the third surface 631 of the third layer 63 (the first resin surface 601). In the semiconductor light-emitting device A5, the first interconnecting portion 401 is offset in the first sense of the x direction (leftward in FIG. 37) and disposed in a region excluding the edge on the first side in the y direction (the lower side in FIG. 37). The first interconnecting portion 401 overlaps with the almost entire semiconductor light-emitting element 1, as viewed in the z direction.

The first interconnecting portion 401 has a comb-like part extending in the second sense of the x direction (rightward in FIG. 37). The comb-like part overlaps with two drain electrodes 231 of the switching element 2, as viewed in the z direction. As shown in FIGS. 40 and 41, a conductive bonding material 29 may be applied to the comb-like part of the first interconnecting portion 401, and the conductive bonding material 29 bonds to the drain electrodes 231. In this way, the first interconnecting portion 401 is electrically connected to the drain electrodes 231 via the conductive bonding material 29. The conductive bonding material 29 may be solder, for example.

The fourth interconnecting portion 404 is disposed along the third surface 631 of the third layer 63 (the first resin surface 601). In the semiconductor light-emitting device A5, the fourth interconnecting portion 404 is offset in the second sense of the x direction (rightward in FIG. 37) and extends almost entirely along the y direction. The fourth interconnecting portion 404 overlaps with the almost entire capacitor 3, as viewed in the z direction.

The fourth interconnecting portion 404 has a comb-like part extending in the first sense of the x direction (leftward in FIG. 37). This comb-like part is arranged in a staggered manner with the comb-like part of the first interconnecting portion 401 in the y direction. The comb-like part of the fourth interconnecting portion 404 overlaps with the two source electrodes 233 of the switching element 2, as viewed in the z direction. As shown in FIGS. 40 and 42, a conductive bonding material 29 may be applied to the comb-like part of the fourth interconnecting portion 404, and the conductive bonding material 29 bonds to the source electrodes 233. In this way, the fourth interconnecting portion 404 is electrically connected to the source electrodes 233 with the conductive bonding material 29.

The interconnecting portion 420 is disposed along the third surface 631 of the third layer 63 (the first resin surface 601). In the semiconductor light-emitting device A5, the interconnecting portion 420 is disposed in a region offset in the first sense of the x direction (leftward in FIG. 37) and also offset in the first sense of the y direction (downward in FIG. 37), as viewed in the z direction. The interconnecting portion 420 overlaps with the gate electrode 232 of the switching element 2, as viewed in the z direction. As shown in FIG. 41, a conductive bonding material 29 may be applied to the interconnecting portion 420, and the conductive bonding material 29 bonds to the gate electrodes 232. In this way, the interconnecting portion 420 is electrically connected to the gate electrode 232 with the conductive bonding material 29.

The second interconnecting portion 402 is offset from the second element surface 12 of the semiconductor light-emitting element 1 in the second sense of the z direction. The second interconnecting portion 402 is disposed along the second surface 621 of the second layer 62 (the second resin surface 602). In the semiconductor light-emitting device A5, the second interconnecting portion 402 extends almost over the entire region along the x direction and is disposed approximately in the center in the y direction, as viewed in the z direction. The second interconnecting portion 402 overlaps with the entire semiconductor light-emitting element 1 and the entire capacitor 3, as viewed in the z direction.

The interconnecting portion 421 is disposed along the second surface 621 of the second layer 62 (the second resin surface 602). In the semiconductor light-emitting device A5, the interconnecting portion 421 is disposed in a region offset in the first sense of the x direction (leftward in FIG. 39) and also offset in the first sense of the y direction (upward in FIG. 39), as viewed in the z direction. The interconnecting portion 421 overlaps with the interconnecting portion 420 as viewed in the z direction.

The interconnecting portion 422 is disposed along the second surface 621 of the second layer 62 (the second resin surface 602). In the semiconductor light-emitting device A5, the interconnecting portion 422 is disposed in a region offset in the first sense of the x direction (leftward in FIG. 39) and also offset in the second sense of the y direction (downward in FIG. 39), as viewed in the z direction. The interconnecting portion 422 overlaps with the first interconnecting portion 401 as viewed in the z direction.

The interconnecting portion 423 is disposed along the second surface 621 of the second layer 62 (the second resin surface 602). In the semiconductor light-emitting device A5, the interconnecting portion 423 is disposed in a region offset in the second sense of the x direction (rightward in FIG. 39) and also offset in the second sense of the y direction (downward in FIG. 39), as viewed in the z direction. The interconnecting portion 423 overlaps with the fourth interconnecting portion 404 as viewed in the z direction.

The second interconnecting portion 402, the interconnecting portion 421, the interconnecting portion 422 and the interconnecting portion 423, which are disposed along the second surface 621 of the second layer 62 (the second resin surface 602), are spaced apart from each other. The second interconnecting portion 402 and the interconnecting portions 421, 422 and 423 are used as external connection terminals in mounting the semiconductor light-emitting device A5 to a circuit board (not shown), for example.

The first embedded portions 451 are received in the first cavities 651 and connected to the first element electrode 13 of the semiconductor light-emitting element 1 and the first interconnecting portion 401. In the present embodiment, a plurality of first embedded portions 451 are provided. In the illustrated example, the first embedded portions 451 are arranged along the x direction.

The second embedded portions 452 are received in the second cavities 652 and connected to the second element electrode 14 of the semiconductor light-emitting element 1 and the second interconnecting portion 402. In the present embodiment, a plurality of second embedded portions 452 are provided. In the illustrated example, the second embedded portions 452 are arranged along the x direction.

The seventh embedded portions 457 are received in the seventh cavities 657 and connected to the electrode 32 of the capacitor 3 and the second interconnecting portion 402. In the present embodiment, a plurality of seventh embedded portions 457 are provided. In the illustrated example, the seventh embedded portions 457 are arranged in a matrix along the x direction and the y direction.

The eighth embedded portions 458 are received in the eighth cavities 658 and connected to the electrode 31 of the capacitor 3 and the fourth interconnecting portion 404. In the present embodiment, a plurality of eighth embedded portions 458 are provided. In the illustrated example, the eighth embedded portions 458 are arranged in a matrix along the x direction and the y direction.

The embedded portions 479 are received in the cavities 679 and connected to the first interconnecting portion 401 and the interconnecting portion 422. In the present embodiment, a plurality of embedded portions 479 are provided. In the illustrated example, the embedded portions 479 are arranged along the x direction. The embedded portions 480 are received in the cavities 680 and connected to the interconnecting portion 420 and the interconnecting portion 421. In the present embodiment, a plurality of embedded portions 480 are provided. In the illustrated example, the embedded portions 480 are arranged along the x direction.

The embedded portions 481 are received in the cavities 681 and connected to the fourth interconnecting portion 404 and the interconnecting portion 423. In the present embodiment, a plurality of embedded portions 481 are provided. In the illustrated example, the embedded portions 481 are arranged along the x direction.

Although not shown in detail, each of the interconnecting portions and the embedded portions has a base layer and a plating layer. The base layer is composed of a metal element contained in the additive included in the sealing resin 6 (the first layer 61, the second layer 62 and the third layer 63).

Although not shown in detail, to manufacture the semiconductor light-emitting device A5, a first layer 61 and a second layer 62 are formed so as to cover the semiconductor light-emitting element 1 and the capacitor 3. The first layer 61 and the second layer 62 are formed by compression molding. Next, a plurality of second cavities 652 and a plurality of seventh cavities 657 are formed in the second layer 62 with a laser. In addition, a plurality of grooves are formed in the second surface 621 of the second layer 62 (the second resin surface 602) with a laser. By this process, base layers are deposited in these cavities and grooves. Next, plating layers covering the base layers are formed to provide the second embedded portions 452, the seventh embedded portions 457, the second interconnecting portion 402, the interconnecting portion 421, the interconnecting portion 422 and the interconnecting portion 423. Thereafter, the first layer 61 and the second layer 62, each in the form of a plate, are turned upside down, and the third layer 63 is formed. The third layer 63 is laminated on the first layer 61 and covers the first element electrode 13 of the semiconductor light-emitting element 1 and the electrode 31 of the capacitor 3. The third layer 63 is formed by compression molding. Next, a plurality of first cavities 651 and a plurality of eighth cavities 658 are formed in the third layer 63 with a laser. Also, a plurality of cavities 679, a plurality of cavities 680, and a plurality of cavities 681 are formed in the third layer 63, the first layer 61 and the second layer 62 with a laser, and a plurality of grooves are formed in the third surface 631 of the third layer 63 (the first resin surface 601) with a laser. By this process, base layers are deposited in these cavities and grooves. Next, plating layers covering the base layers are formed to provide the first embedded portions 451, the eighth embedded portions 458, the embedded portions 479, the embedded portions 480, the embedded portions 481, the first interconnecting portion 401, the fourth interconnecting portion 404 and the interconnecting portion 420. Thereafter, the switching element 2 is disposed on the first interconnecting portion 401, the fourth interconnecting portion 404 and the interconnecting portion 420. In this process, the drain electrode 231 of the switching element 2 is bonded and electrically connected to the first interconnecting portion 401 with a conductive bonding material 29, the gate electrode 232 to the interconnecting portion 420 with a conductive bonding material 29, and the source electrode 233 to the fourth interconnecting portion 404 with a conductive bonding material 29. Thereafter, the third layer 63, the first layer 61, and the second layer 62 are cut along predetermined cutting lines into a plurality of individual pieces. Through the above process, the semiconductor light-emitting device A5 is manufactured.

Although not shown in the figures, the semiconductor light-emitting device A5 can be used as connected to e.g. an external DC power supply. In that case, when the switching element 2 is OFF, current flows from the DC power supply to the capacitor 3 so that the capacitor 3 is charged. When the switching element 2 is ON, the current due to the electrical charge stored in the capacitor 3 flows through the path of the seventh embedded portions 457, the second interconnecting portion 402, the second embedded portions 452, the semiconductor light-emitting element 1, the first embedded portions 451, the first interconnecting portion 401, the switching element 2, the fourth interconnecting portion 404 and the eighth embedded portions 458, making the semiconductor light-emitting element 1 emit light.

In the semiconductor light-emitting device A5 of the present embodiment, the conductor 4 forming the conduction path to the semiconductor light-emitting element 1 includes the first interconnecting portion 401, the first embedded portions 451, the second interconnecting portion 402 and the second embedded portions 452. The first interconnecting portion 401 is electrically connected to the first element electrode 13 of the semiconductor light-emitting element 1 via the first embedded portions 451. The second interconnecting portion 402 is electrically connected to the second element electrode 14 of the semiconductor light-emitting element 1 via the second embedded portions 452. At least a portion (the second element surface 12) of the semiconductor light-emitting element 1 is covered with the sealing resin 6, and the conductor 4 (the first interconnecting portion 401, the second interconnecting portion 402, and the second embedded portions 452) is in contact with the sealing resin 6. With such a configuration, the conduction path (the first interconnecting portion 401, the first embedded portions 451, the second interconnecting portion 402 and the second embedded portions 452) to the first element electrode 13 and the second element electrode 14, which are disposed on opposite sides of the semiconductor light-emitting element 1, can be three-dimensionally arranged in a space-efficient manner. Accordingly, the path of current that flows when the semiconductor light-emitting element 1 emits light can be shortened, and hence, the inductance component of the current path can be reduced.

The capacitor 3 is at least partially covered with the sealing resin 6. The switching element 2 is disposed on the first side of the first resin surface 601 in the z direction and entirely exposed from the sealing resin 6. The conductor 4 includes the fourth interconnecting portion 404, the seventh embedded portions 457 and the eighth embedded portions 458. The first interconnecting portion 401 and the fourth interconnecting portion 404 are disposed along the third surface 631 (the first resin surface 601) of the third layer 63 (the sealing resin 6). The seventh embedded portions 457 are connected to the electrode 31 of the capacitor 3 and the second interconnecting portion 402, and the eighth embedded portions 458 are connected to the electrode 32 of the capacitor 3 and the fourth interconnecting portion 404. With such a configuration, the length of the path from the first interconnecting portion 401 to the second interconnecting portion 402 through the switching element 2, the fourth interconnecting portion 404, the eighth embedded portions 458, the capacitor 3 and the seventh embedded portions 457 can be made relatively short. This is suitable for reducing the inductance component of the path of the current flowing through the semiconductor light-emitting device A5.

In the present embodiment, the semiconductor light-emitting element 1 and the capacitor 3 are disposed apart from each other as viewed in the z direction. The switching element 2 is disposed between the position of the semiconductor light-emitting element 1 and the position of the capacitor 3, as viewed in the z direction. As the capacitor 3, a thin silicon capacitor is used. Such a configuration makes it possible to reduce the dimension of the semiconductor light-emitting device A5 in the z direction (thickness direction) while also reducing the size of the semiconductor light-emitting device A3 as viewed in the z direction. This is suitable for shortening the path of the current that flows when the semiconductor light-emitting element 1 emits light, and hence is suitable for reducing the inductance component of the current path.

Moreover, the conductor 4, which forms the conduction path to the semiconductor light-emitting element 1 and the switching element 2, is constituted by a plurality of interconnecting portions and a plurality of embedded portions, and electrical connection using a wire is not necessary. This reduces the inductance component of the path of current flowing through the semiconductor light-emitting device A5 and improves the yield (the percentage of non-defective products) of the semiconductor light emitting device A5.

FIGS. 43 to 50 show a semiconductor light-emitting device according to a sixth embodiment of the present disclosure. The semiconductor light-emitting device A6 of the present embodiment differs from the semiconductor light-emitting device A5 mainly in structure of the conductor 4 (the conduction path to the semiconductor light-emitting element 1 and the switching element 2) and structure of the sealing resin 6.

Figure 43:
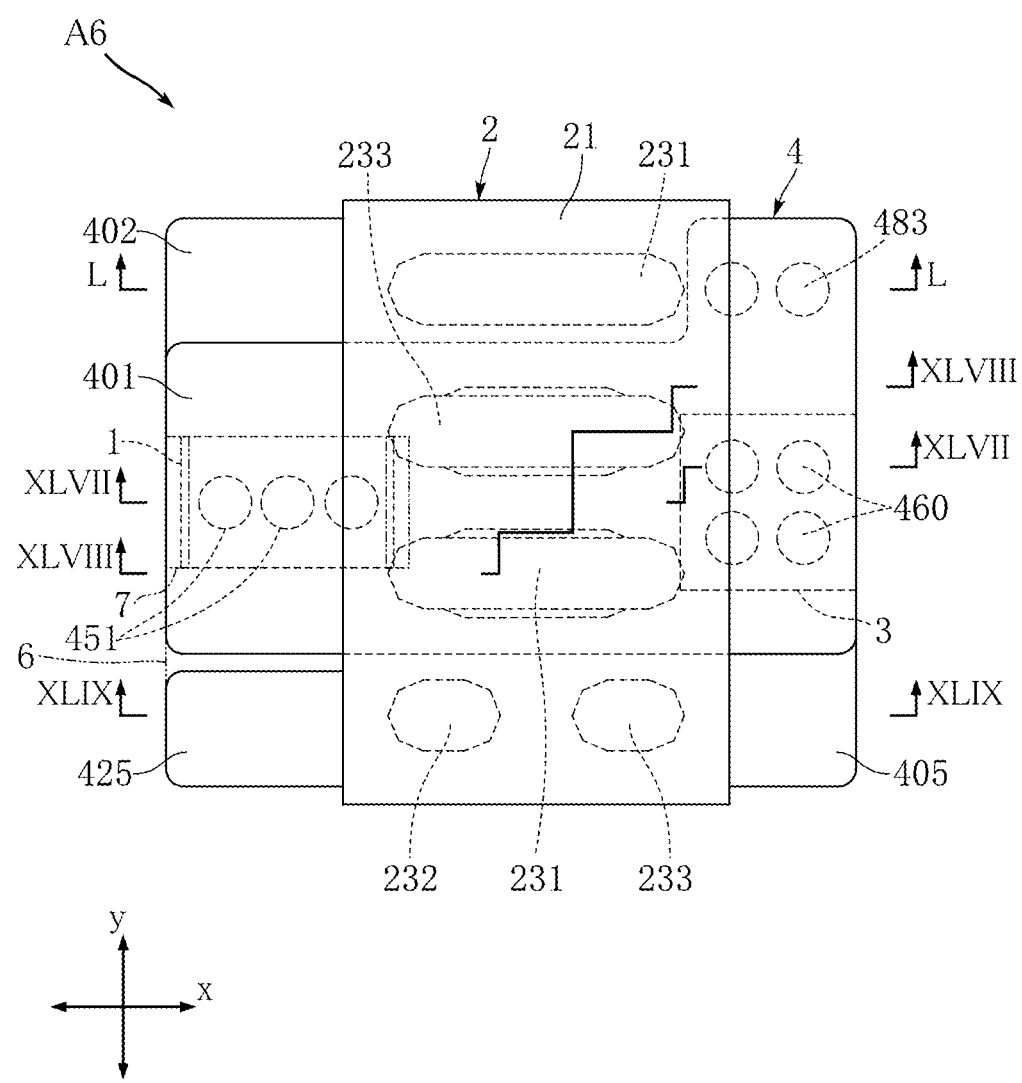
FIG. 43 is a schematic plan view of a semiconductor light-emitting device according to a sixth embodiment of the present disclosure.
Figure 44:
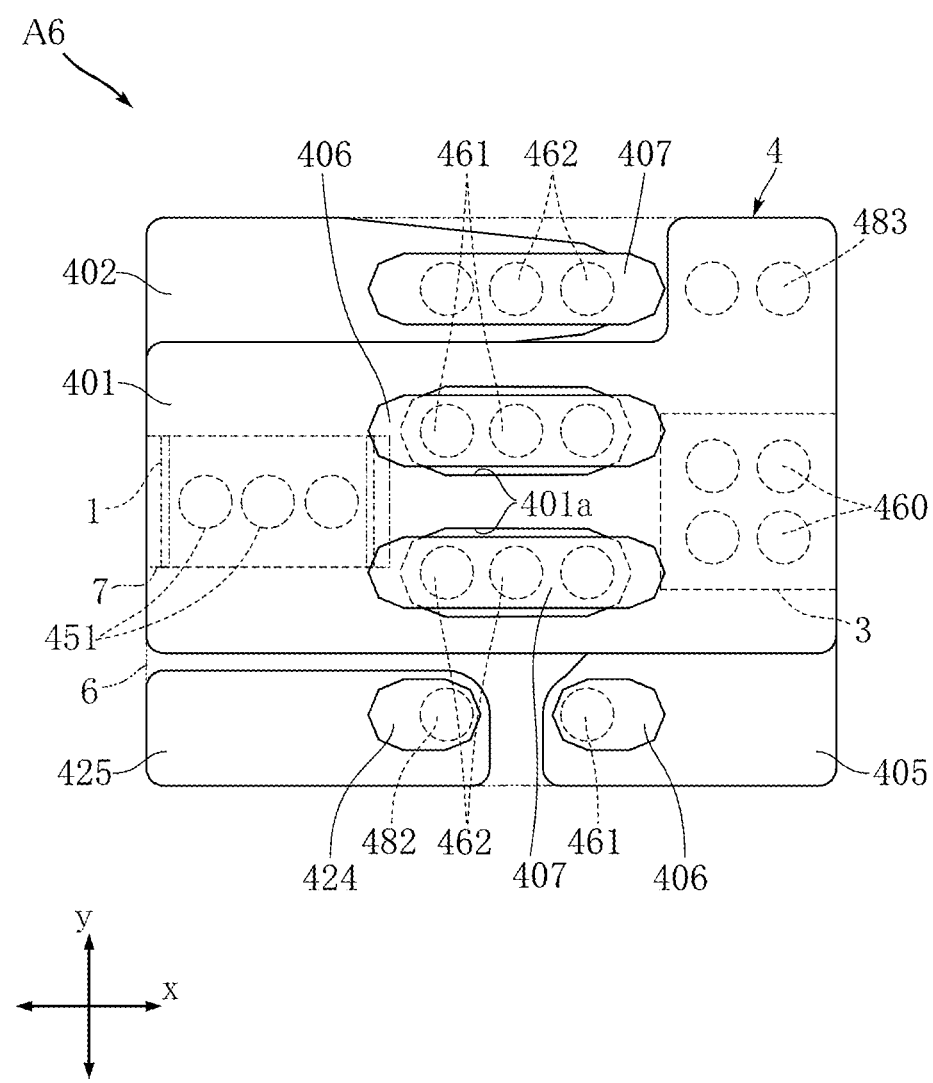
FIG. 44 is a bottom view of the semiconductor light-emitting device of FIG. 43, in which a switching element is omitted.
Figure 45:
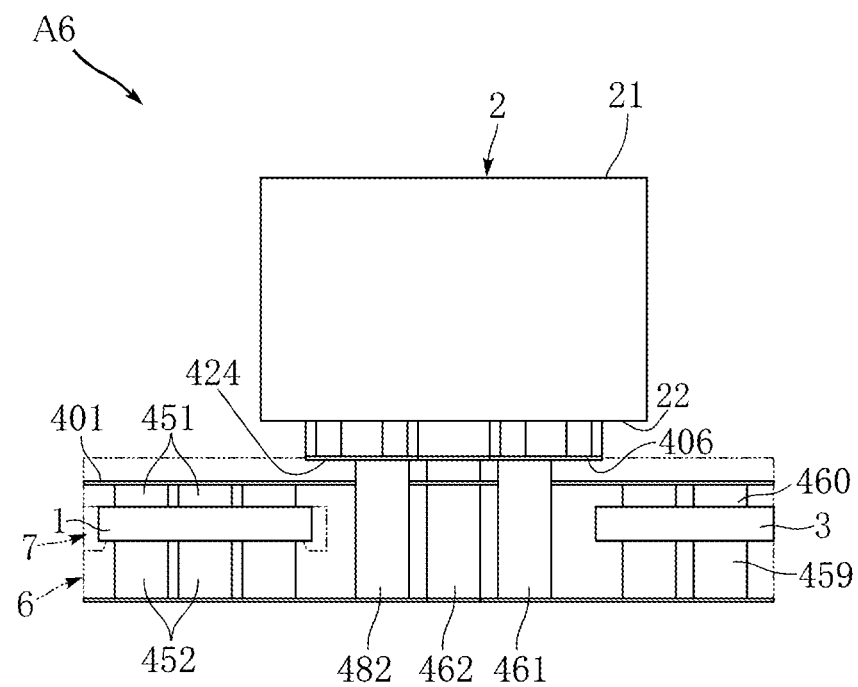
FIG. 45 is a front view of the semiconductor light-emitting device of FIG. 43.
Figure 46:
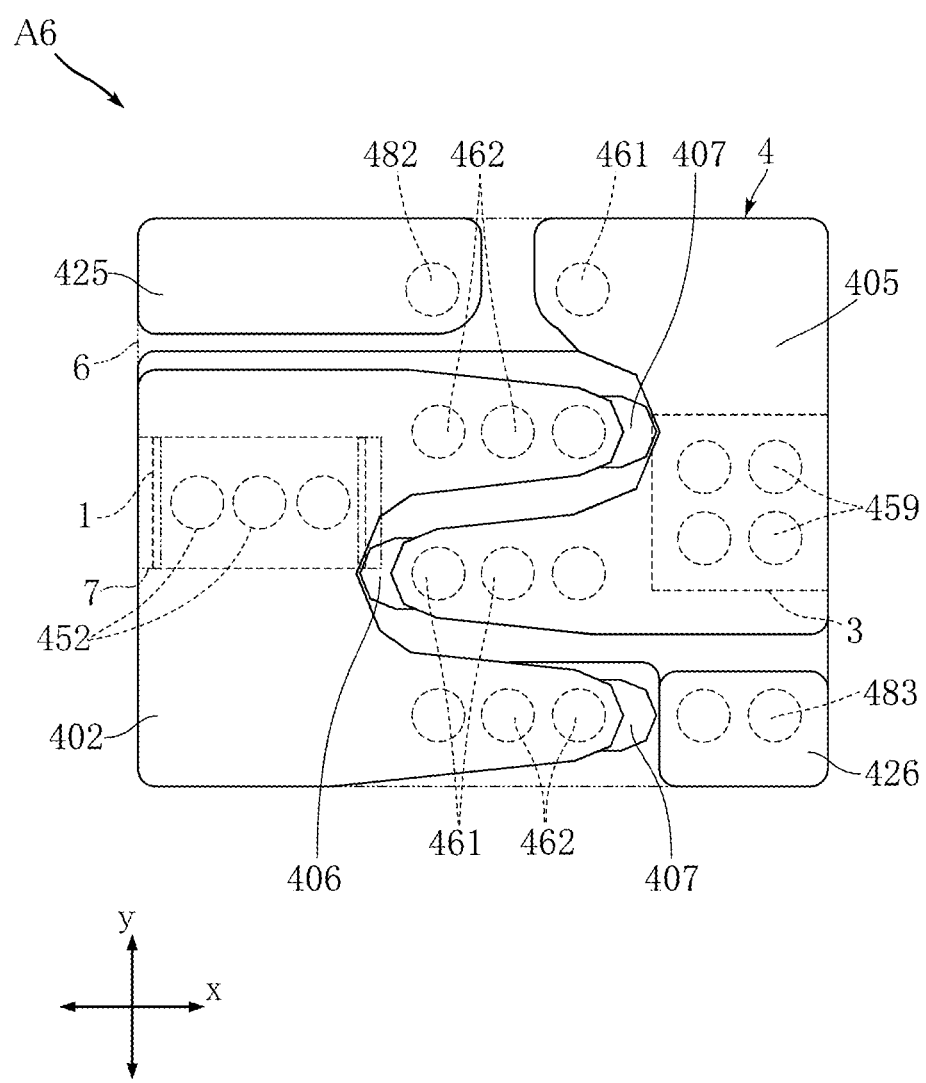
FIG. 46 is a bottom view of the semiconductor light-emitting device of FIG. 43.
Figure 47:
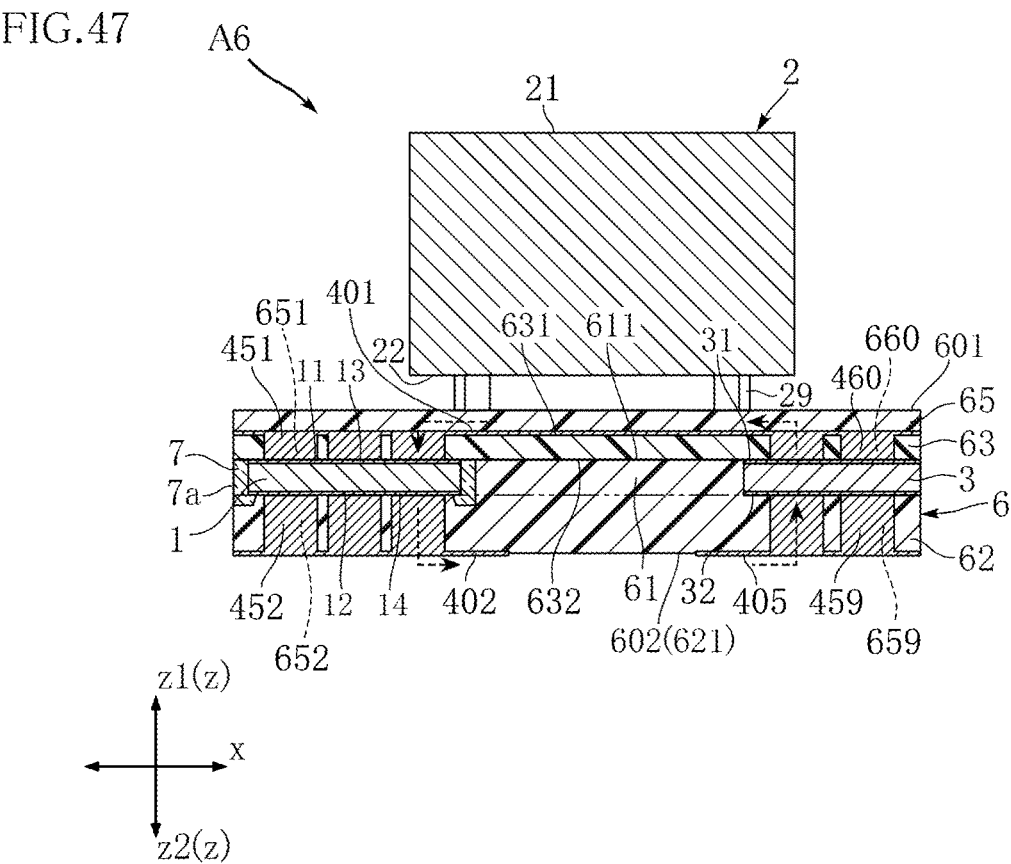
FIG. 47 is a sectional view taken along line XLVII-XLVII in FIG. 43.
Figure 48:
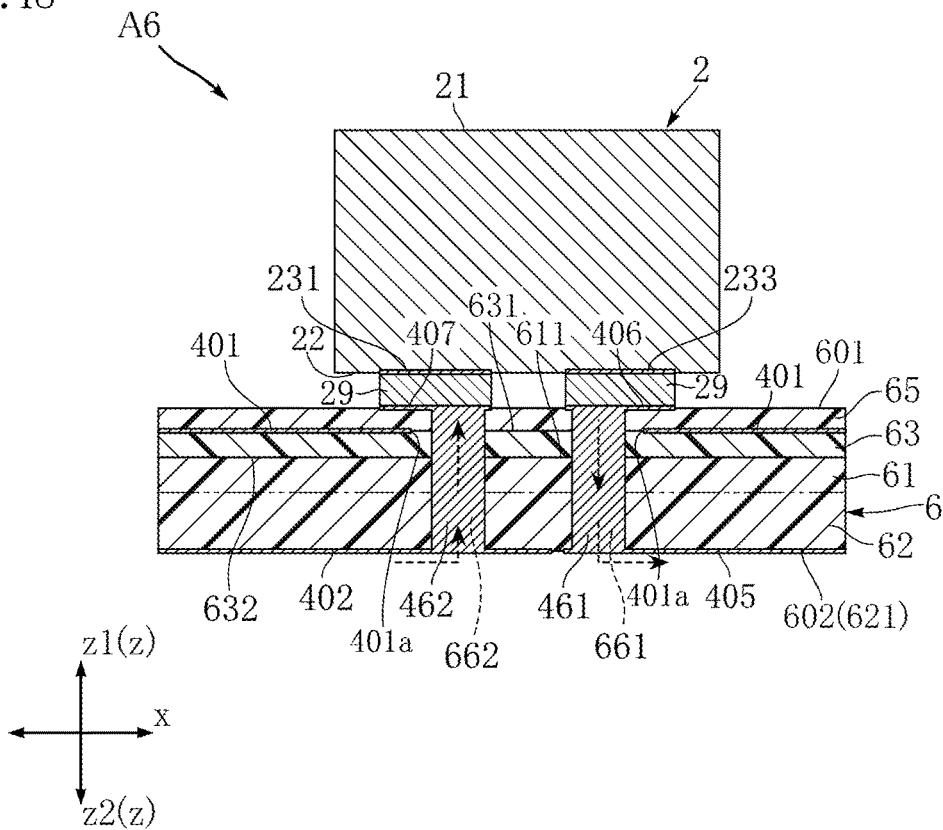
FIG. 48 is a sectional view taken along line XLVIII-XLVIII in FIG. 43.
Figure 49:
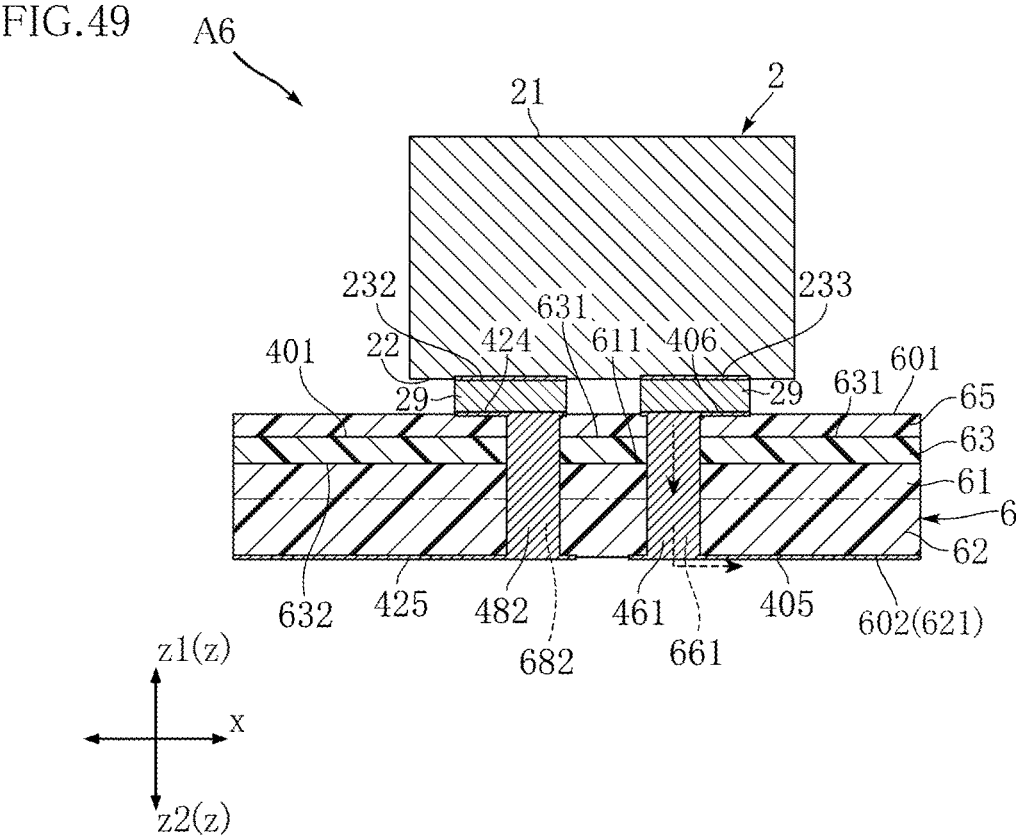
FIG. 49 is a sectional view taken along line XLIX-XLIX in FIG. 43.
Figure 50:
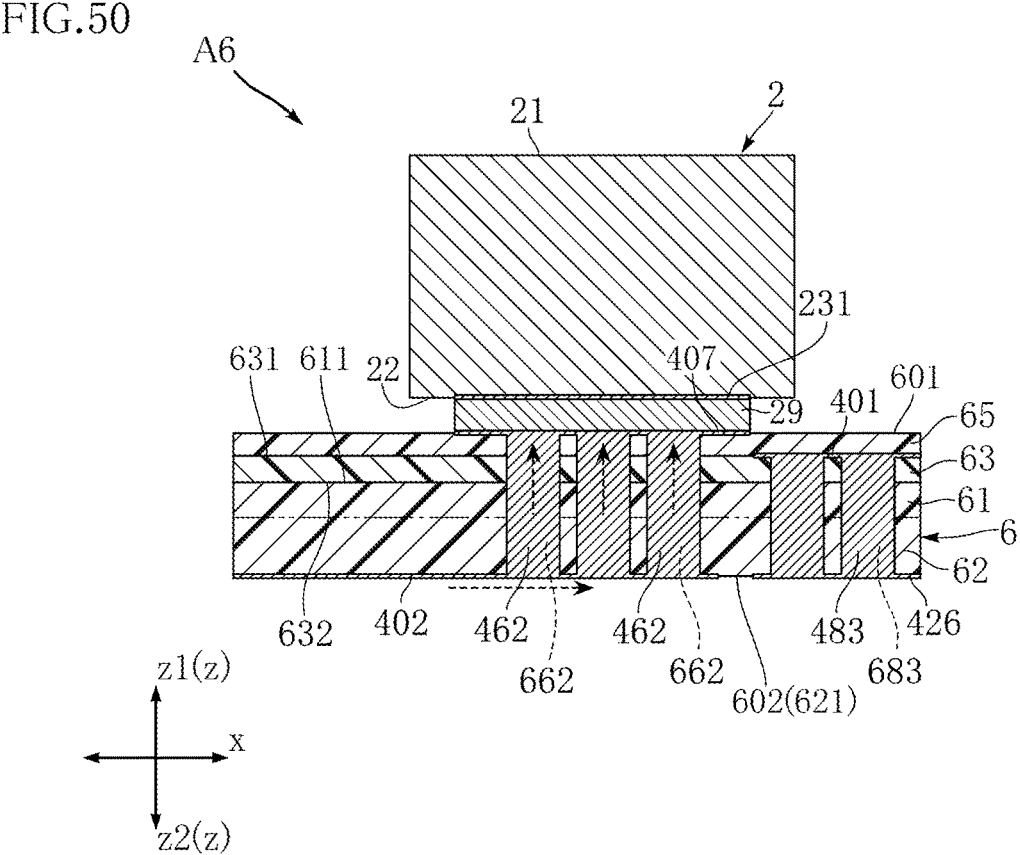
FIG. 50 is a sectional view taken along line L-L in FIG. 43.

FIG. 43 is a schematic plan view of the semiconductor light-emitting device A6. FIG. 44 is a plan view of the semiconductor light-emitting device A6, in which the switching element is omitted. FIG. 45 is a front view of the semiconductor light-emitting device A6. FIG. 46 is a bottom view of the semiconductor light-emitting device A6, in which the switching element is omitted. FIG. 47 is a sectional view taken along line XLVII-XLVII in FIG. 43. FIG. 48 is a sectional view taken along line XLVIII-XLVIII in FIG. 43. FIG. 49 is a sectional view taken along line XLIX-XLIX in FIG. 43. FIG. 50 is a sectional view taken along line L-L in FIG. 43. For convenience of description, in FIGS. 43 to 46, the sealing resin 6 and the light-transmittable resin 7 are illustrated as transparent, and the outlines of the sealing resin 6 and the light-transmittable resin 7 are shown by imaginary lines, as appropriate.

In semiconductor light-emitting device A6 of the present embodiment, the position of the semiconductor light-emitting element 1, the position of the capacitor 3, and the position of the switching element 2 are the same as those in the semiconductor light-emitting device A5. The capacitor 3 is a thin silicon capacitor, as with the semiconductor light-emitting device A5. The structure of the switching element 2 is the same as that of the semiconductor light-emitting device A5. Also, the arrangement of each of the drain electrode 231, the gate electrode 232 and the source 233 is the same as that in the semiconductor light-emitting device A5.

The sealing resin 6 covers the semiconductor light-emitting element 1 and at least a portion of the capacitor 3. The sealing resin 6 is made of a material including a thermosetting synthetic resin and an additive containing a metal element, which forms a part of the conductor 4. Examples of the synthetic resin include epoxy resin and polyimide resin.

In the present embodiment, the sealing resin 6 includes a fifth layer 65 in addition to the first layer 61, the second layer 62, and the third layer 63. The structures of the first layer 61, the second layer 62 and the third layer 63 are the same as those in the semiconductor light-emitting device A5. The fifth layer 65 is disposed on the first side of the third layer 63 in the z direction. The fifth layer 65 is located on the first side of the first layer 61, the second layer 62 and the third layer 63 in the z direction. The second layer 62 is disposed on the second side of the first layer 61 in the z direction. Thus, the surface of the fifth layer 65 which faces in the first sense of the z direction corresponds to the first resin surface 601.

In the present embodiment, the sealing resin 6 has a plurality of first cavities 651, a plurality of second cavities 652, a plurality of ninth cavities 659, a plurality of tenth cavities 660, a plurality of eleventh cavities 661, a plurality of twelfth cavities 662, a cavity 682, and a plurality of cavities 683.

The first cavities 651 are disposed at a position overlapping with the semiconductor light-emitting element 1 as viewed in the z direction. The first cavities 651 extend from the third surface 631 to the first element electrode 13 of the semiconductor light-emitting element 1 in the z direction, penetrating the third layer 63 in the z direction in the present embodiment.

The second cavities 652 are disposed at a position overlapping with the semiconductor light-emitting element 1 as viewed in the z direction. The second cavities 652 extend from the second surface 621 of the second layer 62 to the second element electrode 14 of the semiconductor light-emitting element 1 in the z direction, penetrating the second layer 62 in the z direction in the present embodiment.

The ninth cavities 659 are disposed at a position overlapping with the capacitor 3 as viewed in the z direction. The ninth cavities 659 extend from the second surface 621 of the second layer 62 to the electrode 32 of the capacitor 3 in the z direction, penetrating the second layer 62 in the z direction in the present embodiment.

The tenth cavities 660 are disposed at a position overlapping with the capacitor 3 as viewed in the z direction. The tenth cavities 660 extend from the third surface 631 of the third layer 63 to the electrode 31 of the capacitor 3 in the z direction, penetrating the third layer 63 in the z direction in the present embodiment.

The eleventh cavities 661, the twelfth cavities 662 and the cavity 682 penetrate the first layer 61, the second layer 62, the third layer 63 and the fifth layer 65 in the z direction.

The cavities 683 penetrate the first layer 61, the second layer 62 and the third layer 63 in the z direction.

In the present embodiment, the conductor 4 includes a first interconnecting portion 401, a second interconnecting portion 402, a fifth interconnecting portion 405, sixth interconnecting portions 406, seventh interconnecting portions 407, an interconnecting portion 424, an interconnecting portion 425, an interconnecting portion 426, first embedded portions 451, second embedded portions 452, ninth embedded portions 459, tenth embedded portions 460, eleventh embedded portions 461, twelfth embedded portions 462, an embedded portion 482, and embedded portions 483.

The first interconnecting portion 401 is offset from the first element surface 11 of the semiconductor light-emitting element 1 in the first sense of the z direction. The first interconnecting portion 401 is disposed along the third surface 631 of the third layer 63. In the semiconductor light-emitting device A6, the first interconnecting portion 401 extends almost over the entire region along the x direction and is disposed in a region excluding the edge on the first side (the lower side in FIG. 43) and a portion of the edge on the second side (the upper side in FIG. 23) in the y direction. The first interconnecting portion 401 overlaps with the almost entire semiconductor light-emitting element 1 and the almost entire capacitor 3, as viewed in the z direction.

The first interconnecting portion 401 is formed with two openings 401a penetrating in the z direction. The two openings 401a are formed approximately in the center of the first interconnecting portion 401 in the x direction. The openings 401a each extend in the x direction with a predetermined width and are spaced apart from each other in the y-direction.

The seventh interconnecting portions 407 are disposed along the first resin surface 601 of the fifth layer 65 (see FIGS. 48 and 50). In the present embodiment, two seventh interconnecting portions 407 are provided (see FIG. 44). The seventh interconnecting portions 407 are disposed approximately in the center of the semiconductor light-emitting device A6 in the x direction. The two seventh interconnecting portions 407 are elongated in the x direction and spaced apart from each other in the y direction. As shown in FIGS. 48 and 50, a conductive bonding material 29 may be applied to the seventh interconnecting portions 407, and the conductive bonding material 29 bonds to the drain electrode 231. In this way, the seventh interconnecting portions 407 are electrically connected to the drain electrodes 231 via the conductive bonding material 29. The conductive bonding material 29 may be solder, for example.

The sixth interconnecting portions 406 are disposed along the first resin surface 601 of the fifth layer 65 (see FIGS. 48 and 49). In the present embodiment, two sixth interconnecting portions 406 are provided (see FIG. 44). In the semiconductor light-emitting device A6, the sixth interconnecting portions 406 are disposed approximately in the center in the x direction. The two sixth interconnecting portions 406 are elongated in the x direction and spaced apart from each other in the y direction. One of the sixth interconnecting portions 406 is disposed between two seventh interconnecting portions 407 in the y direction and extends in the x direction. The other sixth interconnecting portion 406 is disposed at a position offset in the second sense of the x direction (rightward in FIG. 44) and also offset in the first sense of the y direction (downward in FIG. 44) in the semiconductor light-emitting device A6. As shown in FIGS. 48 and 49, a conductive bonding material 29 may be applied to the sixth interconnecting portions 406, and the conductive bonding material 29 bonds to the source electrodes 233. In this way, the sixth interconnecting portions 406 is electrically connected to the source electrodes 233 via the conductive bonding material 29.

The interconnecting portion 424 is disposed along the first resin surface 601 of the fifth layer 65 (see FIG. 49). In the semiconductor light-emitting device A6, the interconnecting portion 424 is disposed at a position near the center in the x direction and offset in the first sense of the y direction (see FIG. 44). As shown in FIG. 49, a conductive bonding material 29 may be applied to the interconnecting portion 424, and the conductive bonding material 29 bonds to the gate electrodes 232. In this way, the interconnecting portion 424 is electrically connected to the gate electrode 232 via the conductive bonding material 29.

The second interconnecting portion 402 is offset from the second element surface 12 of the semiconductor light-emitting element 1 in the second sense of the z direction. The second interconnecting portion 402 is disposed along the second surface 621 of the second layer 62 (the second resin surface 602). In the semiconductor light-emitting device A6, the second interconnecting portion 402 is offset in the first sense of the x direction (leftward in FIG. 46) and disposed in a region excluding the edge on the first side in the y direction (the upper side in FIG. 46). The second interconnecting portion 402 overlaps with the almost entire semiconductor light-emitting element 1, as viewed in the z direction. The second interconnecting portion 402 has a comb-like part extending in the second sense of the x direction (rightward in FIG. 46). The comb-like part overlaps with the two seventh interconnecting portions 407 as viewed in the z direction.

The fifth interconnecting portion 405 is disposed along the second surface 621 of the second layer 62 (the second resin surface 602). In the semiconductor light-emitting device A6, the fifth interconnecting portion 405 is offset in the second sense of the x direction (rightward in FIG. 46) and disposed in a region excluding the edge on the second side in the y direction (the lower side in FIG. 46). The fifth interconnecting portion 405 overlaps with the almost entire capacitor 3, as viewed in the z direction. The fifth interconnecting portion 405 has a comb-like part extending in the first sense of the x direction (leftward in FIG. 46). This comb-like part is arranged in a staggered manner with the comb-like part of the second interconnecting portion 402 in the y direction. The comb-like part of the fifth interconnecting portion 405 overlaps with the two sixth interconnecting portions 406 as viewed in the z direction.

The interconnecting portion 425 is disposed along the second surface 621 of the second layer 62 (the second resin surface 602). In the semiconductor light-emitting device A6, the interconnecting portion 425 is disposed in a region offset in the first sense of the x direction (leftward in FIG. 46) and also offset in the first sense of the y direction (upward in FIG. 46), as viewed in the z direction. The interconnecting portion 425 overlaps with the interconnecting portion 424 as viewed in the z direction.

The interconnecting portion 426 is disposed along the second surface 621 of the second layer 62 (the second resin surface 602). In the semiconductor light-emitting device A6, the interconnecting portion 426 is disposed in a region offset in the second sense of the x direction (rightward in FIG. 46) and also offset in the second sense of the y direction (downward in FIG. 46), as viewed in the z direction. The interconnecting portion 426 overlaps with the interconnecting portion 401 as viewed in the z direction.

The second interconnecting portion 402, the fifth interconnecting portion 405, the interconnecting portion 425 and the interconnecting portion 426, which are disposed along the second surface 621 of the second layer 62 (the second resin surface 602), are spaced apart from each other. The second interconnecting portion 402, the fifth interconnecting portion 405, the interconnecting portion 425, and the interconnecting portion 426 are used as external connection terminals in mounting the semiconductor light-emitting device A6 to a circuit board (not shown).

The first embedded portions 451 are received in the first cavities 651 and connected to the first element electrode 13 of the semiconductor light-emitting element 1 and the first interconnecting portion 401. In the present embodiment, a plurality of first embedded portions 451 are provided. In the illustrated example, the first embedded portions 451 are arranged along the x direction.

The second embedded portions 452 are received in the second cavities 652 and connected to the second element electrode 14 of the semiconductor light-emitting element 1 and the second interconnecting portion 402. In the present embodiment, a plurality of second embedded portions 452 are provided. In the illustrated example, the second embedded portions 452 are arranged along the x direction.

The ninth embedded portions 459 are received in the ninth cavities 695 and connected to the electrode 32 of the capacitor 3 and the fifth interconnecting portion 405. In the present embodiment, a plurality of ninth embedded portions 459 are provided. In the illustrated example, the ninth embedded portions 459 are arranged in a matrix along the x direction and the y direction.

The tenth embedded portions 460 are received in the tenth cavities 660 and connected to the electrode 31 of the capacitor 3 and the first interconnecting portion 401. In the present embodiment, a plurality of tenth embedded portions 460 are provided. In the illustrated example, the tenth embedded portions 460 are arranged in a matrix along the x direction and the y direction.

The eleventh embedded portions 461 are received in the eleventh cavities 661 and connected to the fifth interconnecting portion 405 and the sixth interconnecting portion 406. In the present embodiment, a plurality of eleventh embedded portions 461 are provided. In the illustrated example, the plurality of eleventh embedded portions 461 include those arranged along the x direction. As will be understood from FIGS. 44 and 48, the eleventh embedded portions 461 extends through an opening 401a of the first interconnecting portion 401. As will be understood from FIGS. 43, 44, 48 and 49, the switching element 2 overlaps with the entire eleventh embedded portions 461 as viewed in the z direction.

The twelfth embedded portions 462 are received in the twelfth cavities 662 and connected to the second interconnecting portion 402 and the seventh interconnecting portion 407. In the present embodiment, a plurality of twelfth embedded portions 462 are provided. In the illustrated example, the twelfth embedded portions 462 are arranged along the x direction. As will be understood from FIGS. 44 and 48, the plurality of twelfth embedded portions 462 include those extending through an opening 401a of the first interconnecting portion 401. As will be understood from FIGS. 43, 44, 48 and 50, the switching element 2 overlaps with the entire twelfth embedded portions 462 as viewed in the z direction.

The embedded portions 482 are received in the cavities 682 and connected to the interconnecting portion 424 and the interconnecting portion 425. The embedded portions 483 are received in the cavities 683 and connected to the first interconnecting portion 401 and the interconnecting portion 426. In the present embodiment, a plurality of embedded portions 483 are provided. In the illustrated example, the embedded portions 483 are arranged along the x direction.

Although not shown in detail, each of the interconnecting portions and the embedded portions has a base layer and a plating layer. The base layer is composed of a metal element contained in the additive included in the sealing resin 6 (the first layer 61, the second layer 62, the third layer 63 and the fifth layer 65).

Although not shown in detail, to manufacture the semiconductor light-emitting device A6, a first layer 61 and a second layer 62 are formed so as to cover the semiconductor light-emitting element 1 and the capacitor 3. The first layer 61 and the second layer 62 are formed by compression molding. Next, a plurality of second cavities 652 and a plurality of ninth cavities 659 are formed in the second layer 62 with a laser. In addition, a plurality of grooves are formed in the second surface 621 of the second layer 62 (the second resin surface 602) with a laser. By this process, base layers are deposited in these cavities and grooves. Next, plating layers covering the base layers are formed to provide the second embedded portions 452, the ninth embedded portions 459, the second interconnecting portion 402, the fifth interconnecting portion 405, the interconnecting portion 425, and the interconnecting portion 426. Thereafter, the first layer 61 and the second layer 62, each in the form of a plate, are turned upside down, and the third layer 63 is formed. The third layer 63 is laminated on the first layer 61 and covers the first element electrode 13 of the semiconductor light-emitting element 1 and the electrode 31 of the capacitor 3. The third layer 63 is formed by compression molding. Next, a plurality of first cavities 651 and a plurality of tenth cavities 660 are formed in the third layer 63 with a laser. Also, a plurality of cavities 683 are formed in the third layer 63, the first layer 61 and the second layer 62 with a laser, and a plurality of grooves are formed in the third surface 631 of the third layer 63 with a laser. By this process, base layers are deposited in these cavities and grooves. Next, plating layers covering the base layers are formed to provide the first embedded portions 451, the tenth embedded portions 460, and the first interconnecting portion 401 having openings 401a. Next, a fifth layer 65 is formed. The fifth layer 65 is laminated on the third layer 63. The fifth layer 65 is formed by compression molding. Next, a plurality of eleventh cavities 661, a plurality of twelfth cavities 662 and a cavity 682 are formed in the fifth layer 65, the third layer 63, the first layer 61 and the second layer 62 with a laser, and a plurality of grooves are formed in the first resin surface 601 of the fifth layer 65 with a laser. By this process, base layers are deposited in these cavities and grooves. Next, plating layers covering the base layers are formed to provide the eleventh embedded portions 461, the twelfth embedded portions 462, the embedded portion 482, the sixth interconnecting portion 406, the seventh interconnecting portion 407 and the interconnecting portion 424. Thereafter, the switching element 2 is disposed on the sixth interconnecting portion 406, the seventh interconnecting portion 407 and the interconnecting portion 424. In this process, the drain electrode 231 of the switching element 2 is bonded and electrically connected to the seventh interconnecting portion 407 with a conductive bonding material 29, the gate electrode 232 to the interconnecting portion 424 with a conductive bonding material 29, and the source electrode 233 to the sixth interconnecting portion 604 with a conductive bonding material 29. Thereafter, the fifth layer 65, the third layer 63, the first layer 61, and the second layer 62 are cut along predetermined cutting lines into a plurality of individual pieces. Through the above process, the semiconductor light-emitting device A6 is manufactured.

In the semiconductor light-emitting device A6 of the present embodiment, when the switching element 2 is ON, the current due to the electrical charge stored in the capacitor 3 flows through the path of the tenth embedded portions 460, the first interconnecting portion 401, the first embedded portions 451, the semiconductor light-emitting element 1, the second embedded portions 452, the second interconnecting portion 402, the twelfth embedded portions 462, the seventh interconnecting portion 407, the switching element 2, the sixth interconnecting portion 406, the eleventh embedded portions 461, the fifth interconnecting portion 405 and the ninth embedded portions 459, making the semiconductor light-emitting element 1 emit light.

According to the semiconductor light-emitting device A6 of the present embodiment, the conduction path (the first interconnecting portion 401, the first embedded portions 451, the second interconnecting portion 402 and the second embedded portions 452) to the first element electrode 13 and the second element electrode 14, which are disposed on opposite sides of the semiconductor light-emitting element 1, can be three-dimensionally arranged in a space-efficient manner. Accordingly, the path of current that flows when the semiconductor light-emitting element 1 emits light can be shortened, and hence, the inductance component of the current path can be reduced.

The capacitor 3 is at least partially covered with the sealing resin 6. The switching element 2 is disposed on the first side of the first resin surface 601 in the z direction and entirely exposed from the sealing resin 6. In the present embodiment, the semiconductor light-emitting element 1 and the capacitor 3 are disposed apart from each other as viewed in the z direction. The switching element 2 is disposed between the position of the semiconductor light-emitting element 1 and the position of the capacitor 3, as viewed in the z direction. As the capacitor 3, a thin silicon capacitor is used. Such a configuration makes it possible to reduce the dimension of the semiconductor light-emitting device A6 in the z direction (the thickness direction) while also reducing the size of the semiconductor light-emitting device as viewed in the z direction. This is suitable for shortening the path of the current that flows when the semiconductor light-emitting element 1 emits light, and hence is suitable for reducing the inductance component of the current path.

In the present embodiment, when the semiconductor light-emitting element 1 emits light, the direction of the current in the eleventh embedded portions 461 and that in the twelfth embedded portions 462 are opposite from each other. These eleventh embedded portions 461 and twelfth embedded portions 462 entirely overlap with the switching element 2, as viewed in the z direction. As viewed in the z direction, the eleventh embedded portions 461 and the twelfth embedded portions 462 that are adjacent to each other are relatively close to each other. With such a configuration, when the semiconductor light-emitting element 1 emits light, the magnetic field generated due to the current flow in the eleventh embedded portions 461 is cancelled by the magnetic field generated due to the current flow in the twelfth embedded portions 462. This is suitable for shortening the path of the current that flows when the semiconductor light-emitting element 1 emits light, and hence is suitable for reducing the inductance component of the current path.

Moreover, the conductor 4, which forms the conduction path to the semiconductor light-emitting element 1 and the switching element 2, is constituted by a plurality of interconnecting portions and a plurality of embedded portions, and electrical connection using a wire is not necessary. This reduces the inductance component of the path of current flowing through the semiconductor light-emitting device A6 and improves the yield (the percentage of non-defective products) of the semiconductor light emitting device A6.

The semiconductor light-emitting device according to the present disclosure is not limited to the foregoing embodiments. The specific configuration of each part of the semiconductor light-emitting device according to present disclosure may be varied in design in many ways.

The present disclosure includes the configurations defined in the following clauses.

Clause 1.

A semiconductor light-emitting device comprising:
a semiconductor light-emitting element having a first element surface and a second element surface facing away from each other in a thickness direction, a first element electrode disposed on the first element surface, and a second element electrode disposed on the second element surface;

a sealing resin having a first resin surface and a second resin surface, the first resin surface facing in a first sense of the thickness direction in which the first element surface faces, the second resin surface facing in a second sense of the thickness direction in which the second element surface faces, the sealing resin covering at least the second element surface of the semiconductor light-emitting element; and a conductor forming a conduction path to the semiconductor light-emitting element, wherein the sealing resin has a second cavity extending to the second element electrode in the thickness direction, the conductor includes a first interconnecting portion, a second embedded portion, and a second interconnecting portion, the first interconnecting portion is electrically connected to the first element electrode, is offset from the first element surface in the first sense of the thickness direction, and extends along a direction perpendicular to the thickness direction, the second embedded portion is received in the second cavity and connected to the second element electrode, and the second interconnecting portion is connected to the second embedded portion, is offset from the second element surface in the second sense of the thickness direction, and extends along the direction perpendicular to the thickness direction.

Clause 2.

The semiconductor light-emitting device according to clause 1, wherein the semiconductor light-emitting element is a semiconductor laser element, the semiconductor light-emitting device further includes a switching element including a first switching element surface facing in the first sense of the thickness direction, a second switching element surface facing in the second sense of the thickness direction, a gate electrode, a source electrode, and a drain electrode, and the conductor forms a conduction path to the switching element.

Clause 3.

The semiconductor light-emitting device according to clause 2, wherein the sealing resin covers at least a portion of the switching element, and the switching element is disposed between the first resin surface and the second resin surface in the thickness direction.

Clause 4.

The semiconductor light-emitting device according to clause 3, wherein the sealing resin includes a first layer and a second layer, the first layer having a first surface facing in the first sense of the thickness direction and overlapping with the semiconductor light-emitting element as viewed in a direction perpendicular to the thickness direction, the second layer being disposed on a second side of the first layer in the thickness direction and having a second surface facing in the second sense of the thickness direction, the switching element is disposed across the first layer and the second layer, and the second interconnecting portion is disposed along the second surface of the second layer.

Clause 5.

The semiconductor light-emitting device according to clause 4, wherein the drain electrode is disposed on the first switching element surface, the gate electrode and the source electrode are disposed on the second switching element surface, and the semiconductor light-emitting device further includes a capacitor electrically intervening between the drain electrode and the first element electrode.

Clause 6.

The semiconductor light-emitting device according to clause 5, wherein the second layer covers the second switching element surface and has a third cavity extending to the source electrode in the thickness direction, and the conductor includes a third embedded portion received in the third cavity and connected to the source electrode and the second interconnecting portion.

Clause 7.

The semiconductor light-emitting device according to clause 6, wherein the capacitor is disposed on a first side of the first resin surface in the thickness direction, the conductor includes a third interconnecting portion electrically connected to the drain electrode and extending in the direction perpendicular to the thickness direction, and the first interconnecting portion and the third interconnecting portion are disposed at a same position in the thickness direction.

Clause 8.

The semiconductor light-emitting device according to clause 7, wherein the sealing resin includes a third layer disposed on the first side of the first layer in the thickness direction and having a third surface facing in the first sense of the thickness direction and a fourth surface facing in the second sense of the thickness direction, the third layer covers the first element surface and the first switching element surface and has a first cavity extending to the first element electrode in the thickness direction and a fourth cavity extending to the drain electrode in the thickness direction, the first interconnecting portion and the third interconnecting portion are disposed along the third surface of the third layer, the conductor includes a first embedded portion and a fourth embedded portion, the first embedded portion is received in the first cavity and connected to the first element electrode and the first interconnecting portion, and the fourth embedded portion is received in the fourth cavity and connected to the drain electrode and the third interconnecting portion.

Clause 9.

The semiconductor light-emitting device according to clause 7 or 8, wherein the sealing resin includes a fourth layer disposed on the second side of the second layer in the thickness direction, and the second interconnecting portion is disposed between the second layer and the fourth layer.

Clause 10.

The semiconductor light-emitting device according to clause 6, wherein the sealing resin covers at least a portion of the capacitor, the sealing resin includes a third layer disposed on the first side of the first layer in the thickness direction and having a third surface facing in the first sense of the thickness direction and a fourth surface facing in the second sense of the thickness direction, and the capacitor is disposed between the third surface and the fourth surface in the thickness direction.

Clause 11.

The semiconductor light-emitting device according to clause 10, wherein the third layer covers the first element surface and has a first cavity extending to the first element electrode in the thickness direction and a fifth cavity extending to the capacitor in the thickness direction,
- the first interconnecting portion is disposed along the third surface of the third layer,
- the conductor includes a first embedded portion and a fifth embedded portion,
- the first embedded portion is received in the first cavity and connected to the first element electrode and the first interconnecting portion, and
- the fifth embedded portion is received in the fifth cavity and connected to the capacitor and the first interconnecting portion.

Clause 12.

The semiconductor light-emitting device according to clause 11, wherein the third layer has a sixth cavity extending to the drain electrode and the capacitor in the thickness direction, and
- the conductor includes a sixth embedded portion received in the sixth cavity and connected to the drain electrode and the capacitor.

Clause 13.

The semiconductor light-emitting device according to clause 11, wherein the capacitor is bonded and electrically connected to the drain electrode.

Clause 14.

The semiconductor light-emitting device according to any of clauses 10 to 13, wherein the capacitor is a silicon capacitor.

Clause 15.

The semiconductor light-emitting device according to any of clauses 3 to 14, wherein the semiconductor light-emitting element and the switching element are disposed apart from each other as viewed in the thickness direction.

Clause 16.

The semiconductor light-emitting device according to clause 2, wherein the switching element is disposed on a first side of the first resin surface in the thickness direction, and
- the gate electrode, the source electrode, and the drain electrode are disposed on the second switching element surface.

Clause 17.

The semiconductor light-emitting device according to clause 16, further comprising a capacitor electrically intervening between the source electrode and the first element electrode or the second element electrode, wherein
- the sealing resin covers at least a portion of the capacitor, and
- the capacitor is disposed between the first resin surface and the second resin surface in the thickness direction.

Clause 18.

The semiconductor light-emitting device according to clause 17, wherein the sealing resin includes a first layer and a second layer, the first layer having a first surface facing in the first sense of the thickness direction and overlapping with the semiconductor light-emitting element as viewed in a direction perpendicular to the thickness direction, the second layer being disposed on a second side of the first layer in the thickness direction and having a second surface facing in the second sense of the thickness direction, and
- the second interconnecting portion is disposed along the second surface of the second layer.

Clause 19.

The semiconductor light-emitting device according to clause 18, wherein the semiconductor light-emitting element and the capacitor are disposed apart from each other as viewed in the thickness direction, and the switching element is disposed between a position of the semiconductor light-emitting element and a position of the capacitor as viewed in the thickness direction.

Clause 20.

The semiconductor light-emitting device according to clause 19, wherein the sealing resin includes a third layer disposed on the first side of the first layer in the thickness direction and having a third surface facing in the first sense of the thickness direction and a fourth surface facing in the second sense of the thickness direction,
- the third layer covers the first element surface and has a first cavity extending to the first element electrode in the thickness direction,
- the first interconnecting portion is disposed along the third surface of the third layer, and
- the conductor includes a first embedded portion received in the first cavity and connected to the first element electrode and the first interconnecting portion.

Clause 21.

The semiconductor light-emitting device according to clause 20, wherein the sealing resin has a seventh cavity extending from the second surface of the second layer to the capacitor in the thickness direction, and an eighth cavity extending from the third surface of the third layer to the capacitor in the thickness direction,
- the first interconnecting portion is electrically connected to the drain electrode,
- the conductor includes a fourth interconnecting portion, a seventh embedded portion, and an eighth embedded portion,
- the fourth interconnecting portion is disposed along the third surface of the third layer and electrically connected to the source electrode,
- the seventh embedded portion is received in the seventh cavity and connected to the capacitor and the second interconnecting portion, and
- the eighth embedded portion is received in the eighth cavity and connected to the capacitor and the fourth interconnecting portion.

Clause 22.

The semiconductor light-emitting device according to clause 20, wherein the sealing resin includes a fifth layer disposed on the first side of the third layer in the thickness direction and has the first resin surface,
- the sealing resin has a ninth cavity extending from the second surface of the second layer to the capacitor in the thickness direction, a tenth cavity extending from the third surface of the third layer to the capacitor in the thickness direction, and an eleventh cavity and a twelfth cavity each extending from the first resin surface to the second surface of the second layer in the thickness direction,
- the conductor includes a fifth interconnecting portion, a sixth interconnecting portion, a seventh interconnecting portion, a ninth embedded portion, a tenth embedded portion, an eleventh embedded portion, and a twelfth embedded portion,
- the fifth interconnecting portion is disposed along the second surface of the second layer,
- the sixth interconnecting portion is disposed along the first resin surface and electrically connected to the source electrode,
- the seventh interconnecting portion is disposed along the first resin surface and electrically connected to the drain electrode, the ninth embedded portion is received in the ninth cavity and connected to the capacitor and the fifth interconnecting portion, the tenth embedded portion is received in the tenth cavity and connected to the capacitor and the first interconnecting portion, the eleventh embedded portion is received in the eleventh cavity and connected to the fifth interconnecting portion and the sixth interconnecting portion, and the twelfth embedded portion is received in the twelfth cavity and connected to the second interconnecting portion and the seventh interconnecting portion.

Clause 23.

The semiconductor light-emitting device according to clause 22, wherein the switching element overlaps with an entirety of each of the eleventh embedded portion and the twelfth embedded portion as viewed in the thickness direction.

Clause 24.

The semiconductor light-emitting device according to any of clauses 17 to 23, wherein the capacitor is a silicon capacitor.

Clause 25.

The semiconductor light-emitting device according to any of clauses 1 to 24, wherein the sealing resin is made of a material including a thermosetting synthetic resin and an additive containing a metal element forming a part of the conductor.

Clause 26.

The semiconductor light-emitting device according to clause 25, wherein the conductor includes a base layer in contact with the sealing resin and a plating layer in contact with the base layer, and the base layer is composed of a metal element contained in the additive.

LIST OF REFERENCE CHARACTERS

A1, A2, A3, A4, A5, A6: Semiconductor light-emitting device
B1: Semiconductor light-emitting system
1: Semiconductor light-emitting element
11: First element surface 12: Second element surface
13: First element electrode 14: Second element electrode
2: Switching element 21: First switching element surface
22: Second switching element surface 231: Drain electrode
232: Gate electrode 233: Source electrode
29: Conductive bonding material 3: Capacitor 31, 32: Electrode
39: Conductive bonding material 4: Conductor 40a: Base layer
40b: Plating layer 401: First interconnecting portion
401a: Opening 402: Second interconnecting portion
403: Third interconnecting portion
404: Fourth interconnecting portion
405: Fifth interconnecting portion
406: Sixth interconnecting portion
407: Seventh interconnecting portion
412, 413, 414, 415, 416, 417, 418, 419, 420, 421, 422, 423, 424,
425, 426: Interconnecting portion
451: First embedded portion 452: Second embedded portion
453: Third embedded portion 454: Fourth embedded portion
455: Fifth embedded portion 456: Sixth embedded portion
457: Seventh embedded portion 458: Eighth embedded portion
459: Ninth embedded portion 460: Tenth embedded portion
461: Eleventh embedded portion 462: Twelfth embedded portion
471, 472, 473, 474, 475, 476, 477, 478, 479, 480, 481, 482, 483: Embedded portion
6: Sealing resin 601: First resin surface
602: Second resin surface
61: First layer 611: First surface 62: Second layer
621: Second surface 623, 624, 625, 626: Groove
63: Third layer 63A: Lower layer 63B: Upper layer
631: Third surface 632: Fourth surface 635, 636: Groove
64: Fourth layer 65: Fifth layer 51: First cavity
652: Second cavity 653: Third cavity
654: Fourth cavity 655: Fifth cavity
656: Sixth cavity 657: Seventh cavity
658: Eighth cavity 659: Ninth cavity
660: Tenth cavity 661: Eleventh cavity
662: Twelfth cavity
671, 672, 673, 674, 675, 676, 677, 678, 679, 680, 681, 682, 683: Cavity
7: light-transmittable resin 91: Gate driver
92: DC power supply
93: Resistor 94: Diode

The invention claimed is:

1. A semiconductor light-emitting device comprising:
a semiconductor light-emitting element having a first element surface and a second element surface facing away from each other in a thickness direction, a first element electrode disposed on the first element surface, and a second element electrode disposed on the second element surface;
a sealing resin having a first resin surface and a second resin surface, the first resin surface facing in a first sense of the thickness direction in which the first element surface faces, the second resin surface facing in a second sense of the thickness direction in which the second element surface faces, the sealing resin covering at least the second element surface of the semiconductor light-emitting element; and
a conductor forming a conduction path to the semiconductor light-emitting element,
wherein the sealing resin has a second cavity extending to the second element electrode in the thickness direction,
the conductor includes a first interconnecting portion, a second embedded portion, and a second interconnecting portion,
the first interconnecting portion is electrically connected to the first element electrode, is offset from the first element surface in the first sense of the thickness direction, and extends along a direction perpendicular to the thickness direction,
the second embedded portion is received in the second cavity and connected to the second element electrode, and
the second interconnecting portion is connected to the second embedded portion, is offset from the second element surface in the second sense of the thickness direction, and extends along the direction perpendicular to the thickness direction.

2. The semiconductor light-emitting device according to claim 1, wherein the semiconductor light-emitting element is a semiconductor laser element, the semiconductor light-emitting device further includes a switching element including a first switching element surface facing in the first sense of the thickness direction, a second switching element surface facing in the second sense of the thickness direction, a gate electrode, a source electrode, and a drain electrode, and the conductor forms a conduction path to the switching element.

3. The semiconductor light-emitting device according to claim 2, wherein the sealing resin covers at least a portion of the switching element, and the switching element is disposed between the first resin surface and the second resin surface in the thickness direction.

4. The semiconductor light-emitting device according to claim 3, wherein the sealing resin includes a first layer and a second layer, the first layer having a first surface facing in the first sense of the thickness direction and overlapping with the semiconductor light-emitting element as viewed in a direction perpendicular to the thickness direction, the second layer being disposed on a second side of the first layer in the thickness direction and having a second surface facing in the second sense of the thickness direction, the switching element is disposed across the first layer and the second layer, and the second interconnecting portion is disposed along the second surface of the second layer.

5. The semiconductor light-emitting device according to claim 4, wherein the drain electrode is disposed on the first switching element surface, the gate electrode and the source electrode are disposed on the second switching element surface, and the semiconductor light-emitting device further includes a capacitor electrically intervening between the drain electrode and the first element electrode.

6. The semiconductor light-emitting device according to claim 5, wherein the second layer covers the second switching element surface and has a third cavity extending to the source electrode in the thickness direction, and the conductor includes a third embedded portion received in the third cavity and connected to the source electrode and the second interconnecting portion.

7. The semiconductor light-emitting device according to claim 6, wherein the capacitor is disposed on a first side of the first resin surface in the thickness direction, the conductor includes a third interconnecting portion electrically connected to the drain electrode and extending in the direction perpendicular to the thickness direction, and the first interconnecting portion and the third interconnecting portion are disposed at a same position in the thickness direction.

8. The semiconductor light-emitting device according to claim 7, wherein the sealing resin includes a third layer disposed on the first side of the first layer in the thickness direction and having a third surface facing in the first sense of the thickness direction and a fourth surface facing in the second sense of the thickness direction, the third layer covers the first element surface and the first switching element surface and has a first cavity extending to the first element electrode in the thickness direction and a fourth cavity extending to the drain electrode in the thickness direction, the first interconnecting portion and the third interconnecting portion are disposed along the third surface of the third layer, the conductor includes a first embedded portion and a fourth embedded portion, the first embedded portion is received in the first cavity and connected to the first element electrode and the first interconnecting portion, and the fourth embedded portion is received in the fourth cavity and connected to the drain electrode and the third interconnecting portion.

9. The semiconductor light-emitting device according to claim 7, wherein the sealing resin includes a fourth layer disposed on the second side of the second layer in the thickness direction, and the second interconnecting portion is disposed between the second layer and the fourth layer.

10. The semiconductor light-emitting device according to claim 6, wherein the sealing resin covers at least a portion of the capacitor, the sealing resin includes a third layer disposed on the first side of the first layer in the thickness direction and having a third surface facing in the first sense of the thickness direction and a fourth surface facing in the second sense of the thickness direction, and the capacitor is disposed between the third surface and the fourth surface in the thickness direction.

11. The semiconductor light-emitting device according to claim 10, wherein the third layer covers the first element surface and has a first cavity extending to the first element electrode in the thickness direction and a fifth cavity extending to the capacitor in the thickness direction, the first interconnecting portion is disposed along the third surface of the third layer, the conductor includes a first embedded portion and a fifth embedded portion, the first embedded portion is received in the first cavity and connected to the first element electrode and the first interconnecting portion, and the fifth embedded portion is received in the fifth cavity and connected to the capacitor and the first interconnecting portion.

12. The semiconductor light-emitting device according to claim 11, wherein the third layer has a sixth cavity extending to the drain electrode and the capacitor in the thickness direction, and the conductor includes a sixth embedded portion received in the sixth cavity and connected to the drain electrode and the capacitor.

13. The semiconductor light-emitting device according to claim 11, wherein the capacitor is bonded and electrically connected to the drain electrode.

14. The semiconductor light-emitting device according to claim 10, wherein the capacitor is a silicon capacitor.

15. The semiconductor light-emitting device according to claim 3, wherein the semiconductor light-emitting element and the switching element are disposed apart from each other as viewed in the thickness direction.

16. The semiconductor light-emitting device according to claim 2, wherein the switching element is disposed on a first side of the first resin surface in the thickness direction, and the gate electrode, the source electrode, and the drain electrode are disposed on the second switching element surface.

17. The semiconductor light-emitting device according to claim 16, further comprising a capacitor electrically intervening between the source electrode and the first element electrode or the second element electrode, wherein the sealing resin covers at least a portion of the capacitor, and the capacitor is disposed between the first resin surface and the second resin surface in the thickness direction.

18. The semiconductor light-emitting device according to claim 17, wherein the sealing resin includes a first layer and a second layer, the first layer having a first surface facing in the first sense of the thickness direction and overlapping with the semiconductor light-emitting element as viewed in a direction perpendicular to the thickness direction, the second layer being disposed on a second side of the first layer in the thickness direction and having a second surface facing in the second sense of the thickness direction, and the second interconnecting portion is disposed along the second surface of the second layer.

19. The semiconductor light-emitting device according to claim 18, wherein the semiconductor light-emitting element and the capacitor are disposed apart from each other as viewed in the thickness direction, and the switching element is disposed between a position of the semiconductor light-emitting element and a position of the capacitor as viewed in the thickness direction.

20. The semiconductor light-emitting device according to claim 19, wherein the sealing resin includes a third layer disposed on the first side of the first layer in the thickness direction and having a third surface facing in the first sense of the thickness direction and a fourth surface facing in the second sense of the thickness direction, the third layer covers the first element surface and has a first cavity extending to the first element electrode in the thickness direction, the first interconnecting portion is disposed along the third surface of the third layer, and the conductor includes a first embedded portion received in the first cavity and connected to the first element electrode and the first interconnecting portion.

* * * * *